US011797630B2

(12) United States Patent
Yahata et al.

(10) Patent No.: US 11,797,630 B2
(45) Date of Patent: Oct. 24, 2023

(54) METHOD FOR PROVIDING INFORMATION, METHOD FOR CONTROLLING COMMUNICATION TERMINAL, COMMUNICATION TERMINAL, AND NON-TRANSITORY COMPUTER-READABLE RECORDING MEDIUM STORING PROGRAM

(71) Applicant: Panasonic Intellectual Property Management Co., Ltd., Osaka (JP)

(72) Inventors: Hiroshi Yahata, Osaka (JP); Takahiro Nishi, Nara (JP); Tadamasa Toma, Osaka (JP); Toshiyasu Sugio, Osaka (JP); Christopher John Wright, London (GB); Bernadette Elliott Bowman, London (GB); David Michael Duffy, Zurich (CH)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 72 days.

(21) Appl. No.: 17/468,741

(22) Filed: Sep. 8, 2021

(65) Prior Publication Data
US 2021/0406330 A1    Dec. 30, 2021

Related U.S. Application Data

(63) Continuation of application No. PCT/JP2020/029915, filed on Aug. 5, 2020.

(30) Foreign Application Priority Data

Jun. 19, 2020    (JP) .................................. 2020-106431

(51) Int. Cl.
*G06F 16/9537*    (2019.01)
*H04W 4/021*    (2018.01)
(Continued)

(52) U.S. Cl.
CPC .... *G06F 16/9537* (2019.01); *G06F 16/24578* (2019.01); *G06F 16/9535* (2019.01);
(Continued)

(58) Field of Classification Search
CPC .......... G06F 16/9537; G06F 16/24578; G06F 16/9535; G06F 16/9538; G06F 16/9536;
(Continued)

(56) References Cited

U.S. PATENT DOCUMENTS 9,792,330 B1 * 10/2017 Hawkins ........... G06F 16/24573
2015/0254357 A1 * 9/2015 Thota .................. G06F 16/9535
707/706
(Continued)

FOREIGN PATENT DOCUMENTS

JP    1-173672 U    12/1989

OTHER PUBLICATIONS

International Search Report of PCT application No. PCT/JP2020/029915 dated Oct. 27, 2020.

*Primary Examiner* — Kris E Mackes
(74) *Attorney, Agent, or Firm* — GREENBLUM & BERNSTEIN, P.L.C.

(57) ABSTRACT

The management server obtains address information indicating a user's address and evaluation information indicating evaluation of a food or a restaurant performed by the user. A food search screen is provided with, as one of search filters, a search filter for filtering foods or restaurants on the basis of results of evaluation of foods or restaurants performed by residents of a certain area. If the user's address indicated by the address information is included in the certain area, the evaluation information indicating the evaluation of the food or the restaurant performed by the user is included in the results of the evaluation of the foods or the restaurants performed by the residents of the certain area.

19 Claims, 40 Drawing Sheets

(51) Int. Cl.
*G06F 16/2457* (2019.01)
*G06F 16/9535* (2019.01)
*G06Q 50/12* (2012.01)
*H04W 4/35* (2018.01)
*G06F 16/9538* (2019.01)

(52) U.S. Cl.
CPC ......... *G06F 16/9538* (2019.01); *G06Q 50/12* (2013.01); *H04W 4/021* (2013.01); *H04W 4/35* (2018.02)

(58) Field of Classification Search
CPC ..... G06F 16/951; G06Q 50/12; H04W 4/021; H04W 4/35
See application file for complete search history.

(56) References Cited

U.S. PATENT DOCUMENTS

| | | | |
|---|---|---|---|
| 2015/0287120 A1* | 10/2015 | Davidson | G06F 16/954 705/26.7 |
| 2017/0053022 A1* | 2/2017 | Chan | G06F 16/29 |
| 2019/0012715 A1* | 1/2019 | Lan | G06F 16/9535 |

* cited by examiner

FIG. 3

| TEST MEAL KIT ID | TABLET A1 | TABLET A2 | TABLET A3 | ... | TABLET F9 |
|---|---|---|---|---|---|
| 001000 | LEVEL 7 SWEET | LEVEL 3 SALTY | LEVEL 5 SOUR | ... | LEVEL 1 SALTY |
| 001001 | LEVEL 2 UMAMI | LEVEL 9 BITTER | TASTELESS | ... | LEVEL 3 UMAMI |
| : | : | : | : | : | : |

FIG. 14

TASTE TEST
(TASTE PERCEPTION THRESHOLD TEST)

TAKE FOLLOWING TABLETS
ONE BY ONE AND ANSWER
WHETHER TABLETS HAVE SAME TASTE AND,
IF NOT, SELECT TASTE THAT IS DIFFERENT.

B2 AND E8

| SAME TASTE | UMAMI |
| SWEET | SALTY |
| SOUR | BITTER |

TEST PROGRESS

FIG. 17

| | TABLET A3 | TABLET A6 | TABLET C3 | TABLET D4 | DIFFERENCE FROM CORRECT ANSWER |
|---|---|---|---|---|---|
| CORRECT ORDER | 1 | 4 | 3 | 2 | — |
| USER'S ORDER | 1 | 2 | 3 | 4 | 8 |

FIG. 19

| TABLET E3 | SWEET LEVEL | SALTY LEVEL | SOUR LEVEL | BITTER LEVEL | UMAMI LEVEL |
|---|---|---|---|---|---|
| | 2 | 3 | 1 | 0 (NOT CONTAINED) | 0 (NOT CONTAINED) |
| USER'S ANSWERS | NO | YES | YES | NO | YES |
| POINTS | -2 | 2 | 4 | 0 | -2 |

FIG. 20

| TASTE LEVEL | 0 (NOT CONTAINED) | 1 | 2 | 3 | 4 |
|---|---|---|---|---|---|
| CORRECT ANSWER POINTS | 0 | 4 | 3 | 2 | 1 |
| INCORRECT ANSWER POINTS | -2 | -1 | -2 | -3 | -4 |

FIG. 23

| EVALUATION DATABASE | | |
|---|---|---|
| RESTAURANT NAME | USER ID | SCORE |
| RESTAURANT S | 1010 | 4 |
| FOOD T OF RESTAURANT S | 1010 | 5 |
| RESTAURANT S | 7367 | 4 |
| ⋮ | ⋮ | ⋮ |

FIG. 24

| USER INFORMATION | |
|---|---|
| USER ID | 1010 |
| TASTE SCORE | 684 |
| TASTE CHARACTERISTICS | 76, 43, 41, 62, 60 |
| COUNTRY/AREA | JAPAN |
| PREFECTURE | OSAKA |
| ⋮ | ⋮ |

METHOD FOR PROVIDING INFORMATION, METHOD FOR CONTROLLING COMMUNICATION TERMINAL, COMMUNICATION TERMINAL, AND NON-TRANSITORY COMPUTER-READABLE RECORDING MEDIUM STORING PROGRAM

BACKGROUND

1. Technical Field

The present disclosure relates to techniques for evaluating a user's sense of taste.

2. Description of the Related Art

Japanese Unexamined Utility Model Registration Application Publication No. 1-173672, for example, discloses a taste test film for easily and accurately examining a person's taste discrimination ability. A certain amount of sample paste is printed or applied on the taste test film, which is a plastic film, disclosed in this example of the related art.

SUMMARY

In the above example of the related art, however, further improvements are necessary.

In one general aspect, the techniques disclosed here feature a method for providing information used in an information management system that provides a food search screen, the food search screen being provided with, as one of search filters, a search filter for filtering foods or restaurants on a basis of results of evaluation of the foods or the restaurants performed by a resident of a certain area. The method includes obtaining, over a network, address information indicating an address of a user of a communication terminal, obtaining, from the communication terminal, evaluation information indicating evaluation of a food or a restaurant performed by the user, and including, if the address indicated by the address information is included in the certain area, the evaluation information indicating the evaluation of the food or the restaurant performed by the user in the results of the evaluation of the foods or the restaurants performed by the resident of the certain area.

According to the present disclosure, further improvements can be achieved.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 3 is an example of a table on which tablet identifiers (IDs), tastes, and levels of taste are associated with one another for each test meal kit ID;

FIG. 14 is a diagram illustrating an example of a taste perception threshold measurement test screen displayed on the display of the communication terminal according to a second modification of the first embodiment;

FIG. 17 is a diagram illustrating an example of the amount of difference between correct order and order created by the user according to the third modification of the first embodiment;

FIG. 19 is an example of a table where the amount of taste ingredients contained in a test meal, answers input by the user for tastes, and points for the tastes are associated with one another according to the fourth example of the first embodiment;

FIG. 20 is an example of a table where the amount of a taste ingredient contained, points gained when an answer is correct, and points gained when an answer is incorrect are associated with one another according to the fourth example of the first embodiment;

FIG. 23 is a diagram illustrating an example of an evaluation database;

FIG. 24 is a diagram illustrating an example of a user information;

DETAILED DESCRIPTION

Figure 1:
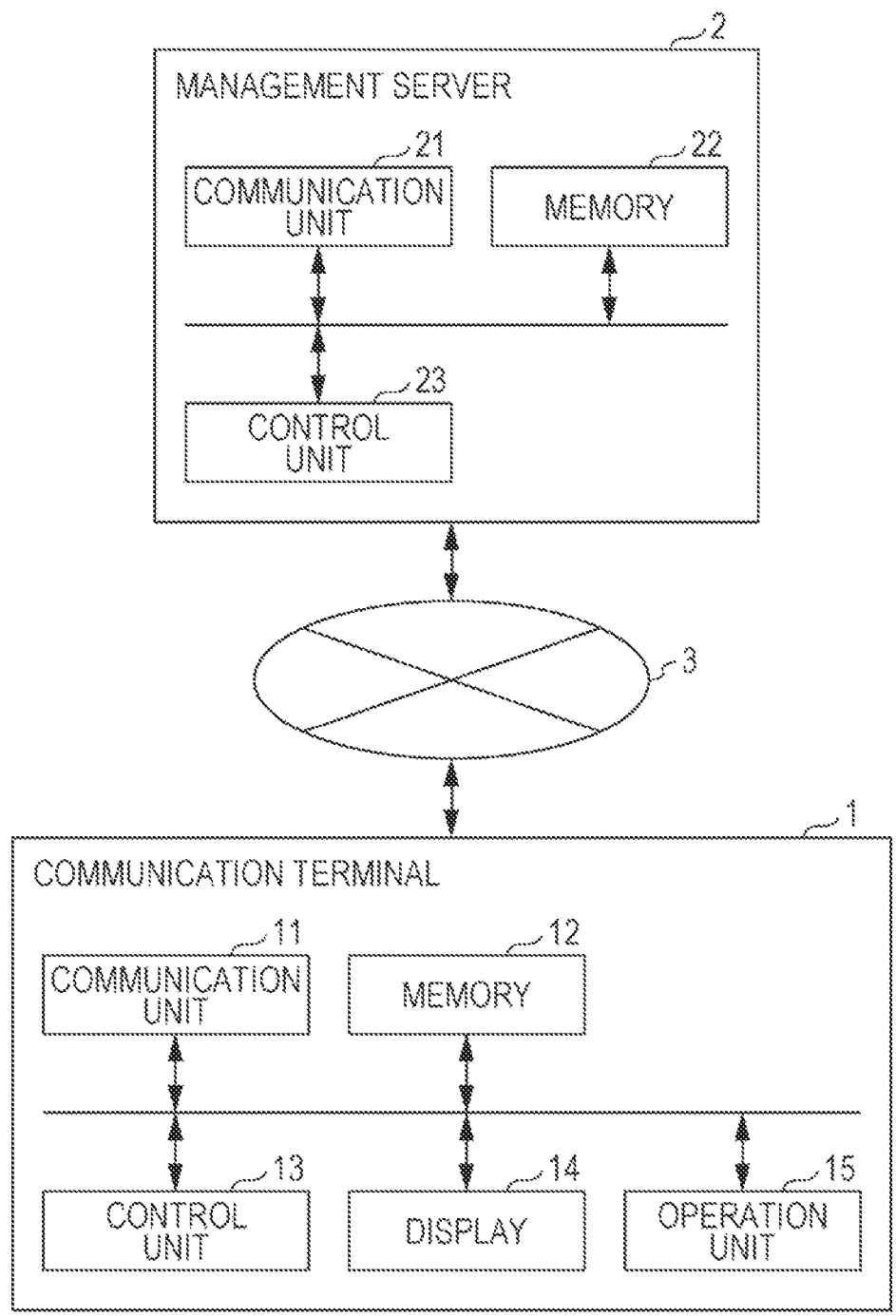
FIG. 1 is a diagram illustrating the configuration of an information management system according to a first embodiment of the present disclosure.

Underlying Knowledge Forming Basis of Present Disclosure

It has conventionally been difficult to evaluate a human's taste objectively. That is, it has been difficult to objectify each person's sense of taste, which is a subjective sensation. It has also been difficult, therefore, to provide a service based on the taste.

Furthermore, people have different senses of taste depending on an area where they grew up. A service that takes into consideration this fact, however, does not exist.

Japanese Unexamined Utility Model Registration Application Publication No. 1-173672 discloses measurement of a human's sense of taste based on a taste test film.

In this example of the related art, however, further improvements are necessary to measure a user's sense of taste accurately and easily and collect information regarding the user's sense of taste.

One non-limiting and exemplary embodiment provides techniques for accurately and easily measuring a user's sense of taste and collecting information regarding the user's sense of taste.

The present inventors have conceived the following aspects of the present disclosure on the basis of the above knowledge.

A method for providing information according to an aspect of the present disclosure is a method for providing information used in an information management system that provides a food search screen, the food search screen being provided with, as one of search filters, a search filter for filtering foods or restaurants on a basis of results of evaluation of the foods or the restaurants performed by a resident of a certain area. The method includes obtaining, over a network, address information indicating an address of a user of a communication terminal, obtaining, from the communication terminal, evaluation information indicating evaluation of a food or a restaurant performed by the user; and including, if the address indicated by the address information is included in the certain area, the evaluation information indicating the evaluation of the food or the restaurant performed by the user in the results of the evaluation of the foods or the restaurants performed by the resident of the certain area.

With this configuration, if an address indicated by address information is included in a certain area, evaluation information indicating evaluation of a food or a restaurant performed by a user is included in results of evaluation of foods or restaurants performed by a resident of the certain area. A food search screen is provided with; as one of search filters, a search filter for filtering the foods or the restaurants on the basis of the results of the evaluation of the foods or the restaurants performed by the resident of the certain area. Foods or restaurants highly rated by the resident of the certain area, therefore, can be presented as search results.

In addition, in the above method, the certain area may include an area where the user of the communication terminal resides or lives.

With this configuration, foods or restaurants highly rated by a resident of an area where the user of the communication terminal resides or lives can be presented as search results.

A method for providing information according to another aspect of the present disclosure is a method for providing information used in an information management system that provides a food search screen, the food search screen being provided with, as one of search filters, a search filter for filtering foods or restaurants on a basis of results of evaluation of the foods or the restaurants performed by a certain evaluator. The method includes obtaining, over a network, address information indicating an address of a user of a communication terminal, obtaining, from the communication terminal, evaluation information indicating evaluation of a food or a restaurant performed by the user and including, if the address indicated by the address information is included in a certain country or area where the food or the restaurant exists, the evaluation information indicating the evaluation of the food or the restaurant performed by the user in the results of the evaluation of the foods or the restaurants performed by the certain evaluator.

With this configuration, if an address indicated by address information is included in a country or an area where there is a food or a restaurant, evaluation information indicating evaluation of the food or the restaurant performed by a user is included in results of evaluation of foods or restaurants performed by a certain evaluator. A food search screen is provided with, as one of search filters, a search filter for filtering foods or restaurants on the basis of the results of the evaluation of the foods or the restaurants performed by the certain evaluator. Foods or restaurants highly rated by the certain evaluator residing in the country or the area where the restaurant exists, therefore, can be presented as search results.

A method for providing information according to another aspect of the present disclosure is a method for providing information used in an information management system that provides a food search screen, the food search screen being provided with, as one of search filters, a search filter for filtering foods or restaurants on a basis of results of evaluation of the foods or the restaurants performed by a resident of a certain area. The method includes obtaining, over a network, address information indicating an address of a user of a communication terminal, obtaining, from the communication terminal, first data indicating a value input in a measurement test relating to the users sense of taste, the measurement test relating to the users sense of taste being conducted to measure the users taste sensitivity, obtaining, from the communication terminal, evaluation information indicating evaluation of a food or a restaurant performed by the user, generating a score of the users sense of taste on a basis of the address information and the first data and associating the score with the user and the address indicated by the address information, and including, if the address indicated by the address information is included in the certain area and if the score of the user's sense of taste satisfies a certain condition for taste high scorers residing in the certain area, the evaluation information indicating the evaluation of the food or the restaurant performed by the user in the results of the evaluation of the foods or the restaurants performed by the resident of the certain area.

With this configuration, a user's taste sensitivity is measured by a measurement test relating to a sense of taste, and a score of the user's sense of taste is generated on the basis of first data indicating a value input in the measurement test relating to the sense of taste while being associated with the user. The user's sense of taste, therefore, can be accurately and easily measured, and information regarding the user's sense of taste can be collected.

If an address indicated by address information is included in a certain area and the score of the user's sense of taste satisfies a certain condition for taste high scorers residing in the certain area, evaluation information indicating evaluation of a food or a restaurant performed by the user is included in results of evaluation of foods or restaurants performed by the resident of the certain area. A food search screen is provided with, as one of search filters, a search filter for filtering the foods or the restaurants on the basis of the results of the evaluation of the foods or the restaurants performed by the resident of the certain area. Foods or restaurants highly rated by the taste high scorers residing in the certain area, therefore, can be presented as search results.

A method for providing information according to another aspect of the present disclosure is a method for providing information used in an information management system that provides a food search screen, the food search screen being provided with, as one of search filters, a search filter for filtering foods or restaurants on a basis of results of evaluation of the foods or the restaurants performed by a resident of a certain area. The method includes obtaining, over a network, address information indicating an address of a user of a communication terminal, obtaining, from the communication terminal over the network, first data indicating a value input in a measurement test relating to the user's sense of taste, the measurement test relating to the user's sense of taste being conducted to measure the user's taste sensitivity, obtaining, from the communication terminal, evaluation information indicating evaluation of a food or a restaurant performed by the user, generating a score of the user's sense of taste on a basis of the address information and the first data and associating the score with the user and the address indicated by the address information, and including, if the address indicated by the address information is included in the certain area and if a taste characteristic indicated by the score of the user's sense of taste is similar to a taste characteristic of the resident of the certain area, the evaluation information indicating the evaluation of the food or the restaurant performed by the user in the results of the evaluation of the foods or the restaurants performed by the resident of the certain area.

With this configuration, a user's taste sensitivity is measured by a measurement test relating to a sense of taste, and a score of the user's sense of taste is generated on the basis of first data indicating a value input in the measurement test relating to the sense of taste while being associated with the user. The user's sense of taste, therefore, can be accurately and easily measured, and information regarding the user's sense of taste can be collected.

If an address indicated by address information is included in a certain area and a taste characteristic indicated by the score of the user's sense of taste is similar to a taste characteristic of a resident of the certain area, evaluation information indicating evaluation of a food or a restaurant performed by the user is included in results of evaluation of foods or restaurants performed by the resident of the certain area. A food search screen is provided with, as one of search filters, a search filter for filtering the foods or the restaurants on the basis of the results of the evaluation of the foods or the restaurants performed by the resident of the certain area. Foods or restaurants highly rated by the resident of the certain area, therefore, can be presented as search results.

In addition, in the above method, the measurement test relating to the user's sense of taste may be a test for measuring the user's taste resolution. The test for measuring the user's taste resolution may be conducted to measure a smallest difference between levels of at least one taste perceived by the user.

With this configuration, a smallest difference between levels of at least one taste perceived by the user is measured by a test for measuring the user's taste resolution, and a score of the user's sense of taste is generated on the basis of first data indicating a value input in the test for measuring the user's taste resolution while being associated with the user. The user's sense of taste, therefore, can be measured accurately and easily, and information regarding the user's sense of taste can be collected.

In addition, in the above method, the measurement test relating to the user's sense of taste may be a test for measuring the user's taste detection. The test for measuring the user's taste detection may be conducted to measure a lowest level at which the user tells a difference between absence of a certain taste and presence of the certain taste among a plurality of levels indicating from a small amount of the certain taste including no taste to a large amount of the certain taste.

With this configuration, a lowest level of at which the user tells a difference between absence of a certain taste and presence of the certain taste among a plurality of levels indicating from a small amount including no taste to a large amount of the certain taste is measured by a test for measuring the user's taste detection. A score of the user's sense of taste is then generated on the basis of first data indicating a value input in the test for measuring the user's taste detection. The user's sense of taste, therefore, can be measured more accurately, and more information regarding the user's sense of taste can be collected.

In addition, in the above method, the measurement test relating to the user's sense of taste may be a test for measuring the user's taste perception. The test for measuring the user's taste perception may be conducted to measure a lowest level at which the user tells a difference between absence of at least one taste and presence of the at least one taste among a plurality of levels indicating from a small amount of the certain taste including no taste to a large amount of the at least one taste.

With this configuration, a lowest level at which the user tells a difference between absence of at least one taste and presence of the at least one taste among a plurality of levels indicating from a small amount of the certain taste to a large amount of the at least one taste is measured by a test for measuring the user's taste perception. A score of the user's sense of taste is then generated on the basis of first data indicating a value input in the test for measuring the user's taste perception. The user's sense of taste, therefore, can be measured more accurately, and more information regarding the user's sense of taste can be collected.

In addition, in the above method, the measurement test relating to the user's sense of taste may be a test for measuring the user's taste strength. The test for measuring the user's taste strength may be conducted to measure whether the user correctly perceives three levels indicating from a small amount of the at least one taste to a large amount of at least one taste.

With this configuration, how accurately the user perceives three levels indicating from a small amount to a large amount of at least one taste is measured by the test for measuring the user's taste strength. A score of the user's sense of taste is then generated on the basis of first data indicating a value input in the test for measuring the user's taste strength. The user's sense of taste, therefore, can be measured more accurately, and more information regarding the user's sense of taste can be collected.

In addition, in the above method, the at least one taste may be at least one of sweetness, sourness, saltiness, bitterness, or umami.

With this configuration, a smallest difference between levels of at least one of sweetness, sourness, saltiness, bitterness, or umami perceived by the user can be measured.

A method for providing information according to another aspect of the present disclosure is a method for providing information used in an information management system that provides a food search screen, the food search screen being provided with, as one of search filters, a search filter for filtering foods or restaurants on a basis of results of evaluation of the foods or the restaurants performed by a resident of a certain area. The method includes obtaining, from a first communication terminal used by a first user over a network, a command indicating that the search filter has been selected, selecting, on a basis of the command, at least one food found through filtering based on the search filter or at least one restaurant found through the filtering based on the search filter, and outputting, to the first communication terminal over the network, information indicating the at least one selected food or the at least one selected restaurant to display the information on a display of the first communication terminal.

With this configuration, foods or restaurants are filtered using a search filter on the basis of results of evaluation of the foods or the restaurants performed by a resident of a certain area, and at least one food found through the filtering based on the search filter or at least one restaurant found through the filtering based on the search filter is displayed on a display of a first communication terminal At least one food or at least one restaurant highly rated by the resident of the certain area, therefore, can be presented to a first user as a search result.

In addition, the above method may further include obtaining, from a second communication terminal over the network, address information indicating an address of a second user of the second communication terminal, obtaining, from the second communication terminal, first data indicating a value input in a measurement test relating to the second user's sense of taste, the measurement test relating to the second user's sense of taste being conducted to measure the second user's taste sensitivity, obtaining, from the second communication terminal, evaluation information indicating evaluation of a food or a restaurant performed by the second user, generating a score of the second user's sense of taste on a basis of the address information and the first data and associating the score with the second user and the address indicated by the address information, and including, if the address indicated by the address information is included in the certain area and if the score of the second user's sense of taste satisfies a certain condition for taste high scorers residing in the certain area, the evaluation information indicating the evaluation of the food or the restaurant performed by the second user in the results of the evaluation of the foods or the restaurants performed by the resident of the certain area.

With this configuration, if a second user's address is included in the certain area and a score of the second user's sense of taste satisfies a certain condition for taste high scorers residing in the certain area, evaluation information indicating evaluation of a food or a restaurant performed by the second user is included in the results of the evaluation of the foods or the restaurants performed by the resident of the certain area. Foods or restaurants, therefore, can be filtered on the basis of a result of the evaluation performed by the second user, who is a taste high scorer residing in the certain area.

In addition, the above method may further include obtaining, from a second communication terminal over the network, address information indicating an address of a second user of the second communication terminal, obtaining, from the second communication terminal, first data indicating a value input in a measurement test relating to the second user's sense of taste, the measurement test relating to the second user's sense of taste being conducted to measure the second user's taste sensitivity, obtaining, from the second communication terminal, evaluation information indicating evaluation of a food or a restaurant performed by the second user, generating a score of the second user's sense of taste on a basis of the address information and the first data and associating the score with the second user and the address indicated by the address information, and including, if the address indicated by the address information is included in the certain area and if a taste characteristic indicated by the score of the second user's sense of taste is similar to a taste characteristic of the resident of the certain area, the evaluation information indicating the evaluation of the food or the restaurant performed by the second user in the results of the evaluation of the foods or the restaurants performed by the resident of the certain area.

With this configuration, if a second user's address is included in the certain area and a taste characteristic indicated by a score of the second user's sense of taste is similar to a taste characteristic of the resident of the certain area, evaluation information indicating evaluation of a food or a restaurant performed by the second user is included in the results of the evaluation of the foods or the restaurants performed by the resident of the certain area. Foods or restaurants, therefore, can be filtered on the basis of a result of the evaluation performed by the second user, whose taste characteristic is similar to that of the resident of the certain area.

A method for providing information according to another aspect of the present disclosure is a method for providing information used in an information management system that provides a food search screen, the food search screen being provided with, as one of search filters, a search filter for filtering foods or restaurants on a basis of results of evaluation of the foods or the restaurants performed by a certain evaluator. The method includes obtaining, from a first communication terminal used by a first user over a network, a command indicating that the search filter has been selected, selecting, on a basis of the command, at least one food found through filtering based on the search filter or at least one restaurant found through the filtering based on the search filter, and outputting, to the first communication terminal over the network, information indicating the at least one selected food or the at least one selected restaurant to display the information on a display of the first communication terminal. A country or an area where the certain evaluator resides is the same as a country or an area where at least one selected food or the at least one selected restaurant exists.

With this configuration, foods or restaurants are filtered using a search filter on the basis of results of evaluation of the foods or the restaurants performed by a certain evaluator, and at least one food found through the filtering based on the search filter or at least one restaurant found through the filtering based on the search filter is displayed on a display of a first communication terminal. At least one food or at least one restaurant highly rated by the certain evaluator residing in a certain country or area where the at least one restaurant exists, therefore, can be presented to the user as a search result.

A method for controlling a communication terminal according to another aspect of the present disclosure is a method for controlling a communication terminal that communicates with an information management system which provides a food search screen, a computer of the communication terminal being caused to perform processes including obtaining positional information indicating a position of the communication terminal, obtaining, from the information management system, map information including the position of the communication terminal, obtaining store information indicating a restaurant displayed on the map information, generating, on a basis of the map information and the store information, a search screen showing the restaurant indicated by the store information on a map indicated by the map information, the search screen being provided with, as one of search filters, a search filter for filtering foods or restaurants on a basis of results of evaluation of the foods or the restaurants performed by a resident of an area including the position indicated by the map information, displaying the search screen on a display of the communication terminal, obtaining address information indicating an area where a user of the communication terminal resides, and displaying, if the position indicated by the positional information is outside the area where the user resides, the search filter on the display.

With this configuration, if a position of a communication terminal is outside an area where a user resides, a search filter for filtering foods or restaurants on the basis of results of evaluation of the foods or the restaurants performed by a resident of an area including a position indicated by map information is automatically displayed on a display. A search filter, therefore, can be displayed in a search screen without a special operation performed by the user.

In addition, the above method may further include determining, if the position indicated by the positional information is outside a country where the user of the communication terminal resides, that the position indicated by the positional information is outside the area where the user resides.

With this configuration, if the position of the communication terminal is outside a country where the user of the communication terminal resides, the search filter can be automatically displayed in the search screen.

In addition, the above method may further include inhibiting, if the position indicated by the positional information is inside the area where the user of the communication terminal resides, the search filter from being displayed.

With this configuration, if the position of the communication terminal is inside the area where the user resides, the search filter is not displayed. It becomes possible, therefore, to prevent a search filter that is not necessary inside the area where the user resides, from being displayed.

A communication terminal according to another aspect of the present disclosure executes the above method for controlling a communication terminal.

A non-transitory computer-readable recording medium storing a program according to another aspect of the present disclosure causes a computer of a communication terminal to execute the above method for controlling a communication terminal.

Embodiments of the present disclosure will be described hereinafter with reference to the accompanying drawings. The following embodiments are specific examples of the

First Embodiment

FIG. 1 is a diagram illustrating the configuration of an information management system according to a first embodiment of the present disclosure.

The information management system illustrated in FIG. 1 includes a communication terminal 1 and a management server 2.

The communication terminal 1 is a smartphone, a tablet computer, or a personal computer, for example, and used by a user. The communication terminal 1 includes a communication unit 11, a memory 12, a control unit 13, a display 14, and an operation unit 15. The communication terminal 1 is communicably connected to the management server 2 over a network 3. The network 3 is, for example, the Internet.

The communication unit 11 receives various pieces of information from the management server 2 and transmits various pieces of information to the management server 2. The communication unit 11 receives information regarding a measurement test relating to a sense of taste transmitted from the management server 2. The measurement test relating to the sense of taste is conducted to measure a user's taste sensitivity. In the first embodiment, the measurement test relating to the sense of taste includes a taste resolution measurement test. The taste resolution measurement test is conducted to measure how a smallest difference between levels of at least one taste that can be perceived by the user. The at least one taste is at least one of sweetness, sourness, saltiness, bitterness, or umami.

The memory 12 is a semiconductor memory or a hard disk drive, for example, and stores various pieces of information.

The control unit 13 is a central processing unit (CPU), for example, and controls the entirety of the communication terminal 1.

The display 14 is a liquid crystal display, for example, and displays various pieces of information. The display 14 displays a measurement test relating to the sense of taste received by the communication unit 11.

The operation unit 15 is a touch panel, a keyboard, or a mouse, for example, and receives various pieces of information input by the user. The operation unit 15 receives answers input by the user in the measurement test relating to the sense of taste. The operation unit 15 is an example of an input device and provided for the communication terminal 1 owned by the user.

The communication unit 11 transmits first data indicating values input in the measurement test relating to the user's sense of taste to the management server 2. The communication unit 11 receives a score of the user's sense of taste generated by the management server 2. The display 14 displays information indicating the score of the user's sense of taste received by the communication unit 11.

The management server 2 is, for example, a web server. The management server 2 includes a communication unit 21, a memory 22, and a control unit 23.

The control unit 23 is a CPU, for example, and controls the entirety of the management server 2. The control unit 23 generates information regarding a measurement test relating to the sense of taste.

The communication unit 21 receives various pieces of information from the communication terminal 1 and transmits various pieces of information to the communication terminal 1. The communication unit 21 transmits, to the communication terminal 1, information regarding a measurement test relating to the sense of taste generated by the control unit 23. The communication unit 21 obtains first data indicating values input in a measurement test relating to the user's sense of taste using the operation unit 15 of the communication terminal 1. The communication unit 21 receives the first data transmitted from the communication terminal 1.

An example of the measurement test relating to the sense of taste is a taste resolution measurement test. Taste resolution refers to a smallest difference in the amount of a certain taste ingredient contained in a test mean that can be perceived by the user. Taste resolution is known to be different between examinees. Taste resolution is also known to be different even with the same examinee depending on the taste modality. Taste resolution may be expressed as a difference in density, instead of a difference in amount.

The control unit 23 generates a score of the user's sense of taste on the basis of first data received by the communication unit 21 while associating the score with the user. The control unit 23 registers information indicating the score to the memory 22. The communication unit 21 outputs the information indicating the score to the communication terminal 1 in order to display the information indicating the score on the display 14 of the communication terminal 1.

The memory 22 is a semiconductor memory or a hard disk drive, for example, and stores various pieces of information. The memory 22 stores user information in which user IDs for identifying users and scores of the users' senses of taste are associated with each other. The control unit 23 stores, in the memory 22, the user information in which user IDs and generated scores are associated with each other.

The user inputs, using the operation unit 15, values in the taste resolution measurement test based on at least a first test meal group including test meals corresponding to levels indicating light to strong sweetness or a second test meal group including test meals corresponding to levels indicating light to strong saltiness. The communication unit 21 outputs, to the communication terminal 1, a first instruction for asking the user to input an answer as to which of a first sweet test meal and a second sweet test meal, between which there is a first gap, which is two or more levels among the levels indicating light to strong sweetness, is sweeter among the test meals included in the first test meal group. The communication unit 21 obtains first data in response to the first instruction.

The control unit 23 outputs, to the communication terminal 1 through the communication unit 21, a second instruction for asking the user to input an answer as to which of a third sweet test meal and a fourth sweet test meal, between which there is a second gap, which is narrower than the first gap among the levels indicating light to strong sweetness, is sweeter among the test meals included in the first test meal group, in addition to the first and second sweet test meals. The control unit 23 outputs the second instruction through the communication unit 21 if it is determined that a response to the first instruction is correct. The control unit 23 obtains, through the communication unit 21, first data from the communication terminal 1 in response to the second instruction.

Furthermore, the control unit 23 outputs, to the communication terminal 1 through the communication unit 21, a third instruction for asking the user to input an answer as to which of a fifth sweet test meal and a sixth sweet test meal, between which there is a third gap, which is wider than the first gap among the levels indicating light to strong sweetness, is sweeter among the test meals included in the first test meal group, in addition to the first and second sweet test meals. The control unit 23 outputs the third instruction through the communication unit 21 if it is determined that a response to the first instruction is incorrect. The control unit 23 obtains, through the communication unit 21, first data in response to the third instruction.

The first and second test meal groups are managed using a common test meal kit ID.

Test meals will be described hereinafter. The test meals are stored in a test meal kit and provided for the user.

Figure 2:
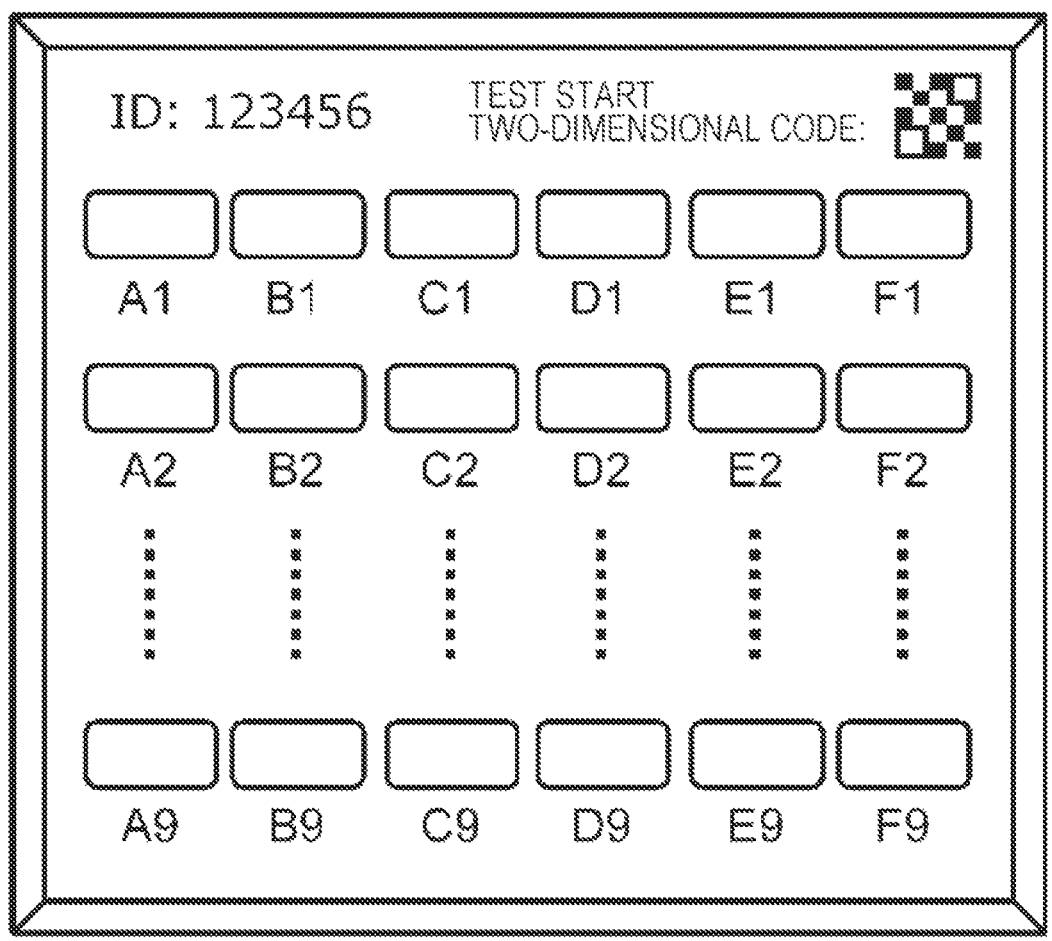
FIG. 2 is a diagram illustrating an example of a test meal kit according to the first embodiment.

FIG. 2 is a diagram illustrating an example of a test meal kit according to the first embodiment.

A test meal kit ID (common ID) for identifying the test meal kit and a two-dimensional code (common ID) for starting a test are printed on the test meal kit.

The test meal kit stores test meals, which are tablets. In the test meal kit, tablet IDs (individual IDs) for identifying the test meals are printed on a box and/or the corresponding tablets.

Humans are known to taste with a collection of taste cells called "taste buds", Sweetness, saltiness, sourness, bitterness, and umami are tastes sensed by the taste cells constituting the taste buds. In the example illustrated in FIG. 2, the test meal kit includes a total of 54 tablets to which tablet IDs of A1 to A9, B1 to B9, C1 to C9, D1 to D9, E1 to E9, and F1 to F9 are given. 45 out of the 54 tablets contain nine different amounts of a corresponding one of five taste ingredients. That is, for sweetness, for example, a total of nine tablets, that is, a level 1 sweet tablet containing a certain amount of a sweet ingredient compared to a tasteless tablet to a level 9 sweet tablet containing a largest amount of the sweet ingredient as a result of stepwise increases in the amount of the sweet ingredient contained, are used. For each of the other four taste modalities, too, nine tablets containing different amounts of a corresponding taste ingredient are prepared. The remaining nine tablets are tasteless. This set of 54 tablets may be used in a single test, or a single test meal kit may include different sets of tablets to be used in different taste tests.

A test meal kit ID and/or a two-dimensional code are issued for each test meal kit. The user can smoothly start a taste test (a taste resolution measurement test, etc.) by inputting a test meal kit ID on a website or reading a two-dimensional code storing a uniform resource locator (URL) of a website with a camera (not illustrated) included in the communication terminal 1.

Common IDs (a test meal kit ID and/or a two-dimensional code) and individual IDs (tablet IDs) are used by a computer system that conducts a measurement test relating to the user's sense of taste to identify taste ingredients and amounts of the taste ingredients contained in test meals. The individual IDs (tablet IDs) are also used by the computer system to specify test meals for the user when conducting a measurement test relating to the user's sense of taste. The common ID may be a two-dimensional code including URL information for starting the measurement test relating to the user's sense of taste.

Every test meal kit stores the same combination of test meals. Correspondence between tablet IDs and taste ingredients, however, are different depending on the test meal kit ID and the two-dimensional code. In this example, the 54 tablet IDs, namely A1 to F9, are used for identification. This set of 54 tablets is invariably used for every test meal kit. The 54 tablet IDs, however, are given to tablets containing different taste ingredients depending on the test meal kit. That is, a certain tablet ID can identify a tablet containing a different taste ingredient depending on the test meal kit ID.

In a test meal kit, tablets containing the same taste ingredient may be identified by the same tablet ID or different tablet IDs.

This is firstly because the same test meals can be used in different taste tests and manufacturing cost can be suppressed through mass production. The tablet IDs, therefore, are not printed on the tablets but presented to users using a medium other than the tablets, such as boxes of test meal kits. For example, the tablet IDs may be printed immediately below packages storing corresponding tablets. The tablets may be fabricated in such a way as to have the same appearance and become visually indistinguishable from one another.

A second reason is that cheating can be prevented by conducting a taste test while distributing different test meal kits to examinees, instead distributing the same test meal kit to every examinee. Even with test meal kits on which the same tablet IDs are printed, the tablet IDs are associated with tablets containing different taste ingredients depending on the test meal kit ID.

Furthermore, in the taste test according to the first embodiment, the amount of difference between an answer input by an examinee and a correct answer is determined and a next question is dynamically generated. That is, a taste test is separately generated for each examinee. It is therefore difficult to know whether the same taste test will be conducted for every examinee, which makes cheating even more difficult.

Although the test meals are tablets in the above description, the present disclosure is not limited to this. For example, the test meals may be powder or paste, instead of tablets, and examinees may directly taste the powder or the paste. Alternatively, examinees may taste tablets, powder, or paste dissolved in a certain amount of water. Alternatively, examinees may taste tablets, powder, or paste with a certain food. The certain food is a tasteless food for assisting swallowing, such as tasteless bread or tasteless biscuits.

FIG. 3 is an example of a table on which tablet IDs, tastes, and levels of taste are associated with one another for each test meal kit ID.

The memory 22 of the management server 2 stores a table on which tablet IDs, tastes, and levels of tastes are associated with one another for each test meal kit ID. The control unit 23 can identify, in accordance with a test meal kit ID input by the user, a level of taste of a tablet having each of the tablet IDs by referring to table at a beginning of a test. Level 1 of taste indicates the smallest amount of a taste ingredient, that is, a lightest taste. Level 9 of taste indicates the largest amount of a taste ingredient, that is, a strongest taste.

When generating a taste test, the control unit 23 can correctly specify different tablets to be used in the taste test for each test meal kit ID.

Although each tablet contains one taste ingredient in the first embodiment, the present disclosure is not particularly limited to this. Each tablet may contain two or more tastes, instead. For example, tablet A2 illustrated in FIG. 3 may contain a level 9 bitter ingredient and a level 4 salty ingredient.

Next, a process for evaluating the user's sense of taste according to the first embodiment of the present disclosure will be described.

Figure 4:
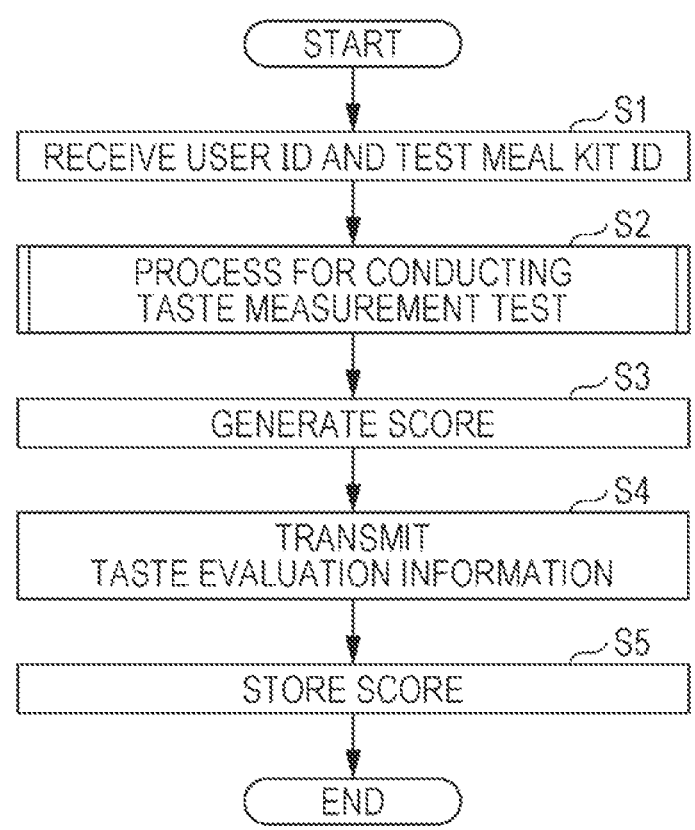
FIG. 4 is a flowchart illustrating a process for evaluating a user's sense of taste performed by a management server according to the first embodiment of the present disclosure.

FIG. 4 is a flowchart illustrating the process for evaluating the user's sense of taste performed by the management server 2 according to the first embodiment of the present disclosure.

First, in step S1, the communication unit 21 receives a user ID and a test meal kit ID transmitted from the communication terminal 1. Here, the communication terminal 1 receives a test meal kit ID printed on a test meal kit and a user ID input by the user. The communication terminal 1 displays an input screen provided by the management server 2 on a web browser and receives a user ID and a test meal kit ID input on the input screen. The input screen is specified with a certain URL. The communication terminal 1 transmits the input user ID and test meal kit ID to the management server 2.

The communication terminal 1 may include a two-dimensional code reader. The two-dimensional coder reader may read a two-dimensional code printed on a test meal kit. A two-dimensional code includes the URL of the management server 2. The communication terminal 1 may display the input screen provided by the management server 2 by reading a two-dimensional code and receive a user ID input on the input screen and, if necessary, also receive a test meal kit ID.

Next, in step S2, the control unit 23 performs a process for conducting a taste measurement test. In the process for conducting a taste measurement test, a taste measurement test for measuring the user's sense of taste is generated, and first data indicating input values in the taste measurement test is obtained, A process for conducting a taste resolution measurement test will be described with reference to FIGS. 5 and 6.

Next, in step S3, the control unit 23 generates a score of the user's sense of taste on the basis of the first data while associating the score with the user.

Next, in step S4, the control unit 23 transmits taste evaluation information indicating the generated score to the communication terminal 1. The communication unit 11 of the communication terminal 1 receives the taste evaluation information transmitted from the management server 2. The display 14 of the communication terminal 1 displays the taste evaluation information received by the communication unit 11.

Next, in step S5, the control unit 23 stores the generated score in the memory 22 while associating the score with the user ID.

Next, the process for conducting a taste resolution measurement test, which is an example of the process for conducting a taste measurement test in step S2 illustrated in FIG. 4, will be described.

Figure 5:
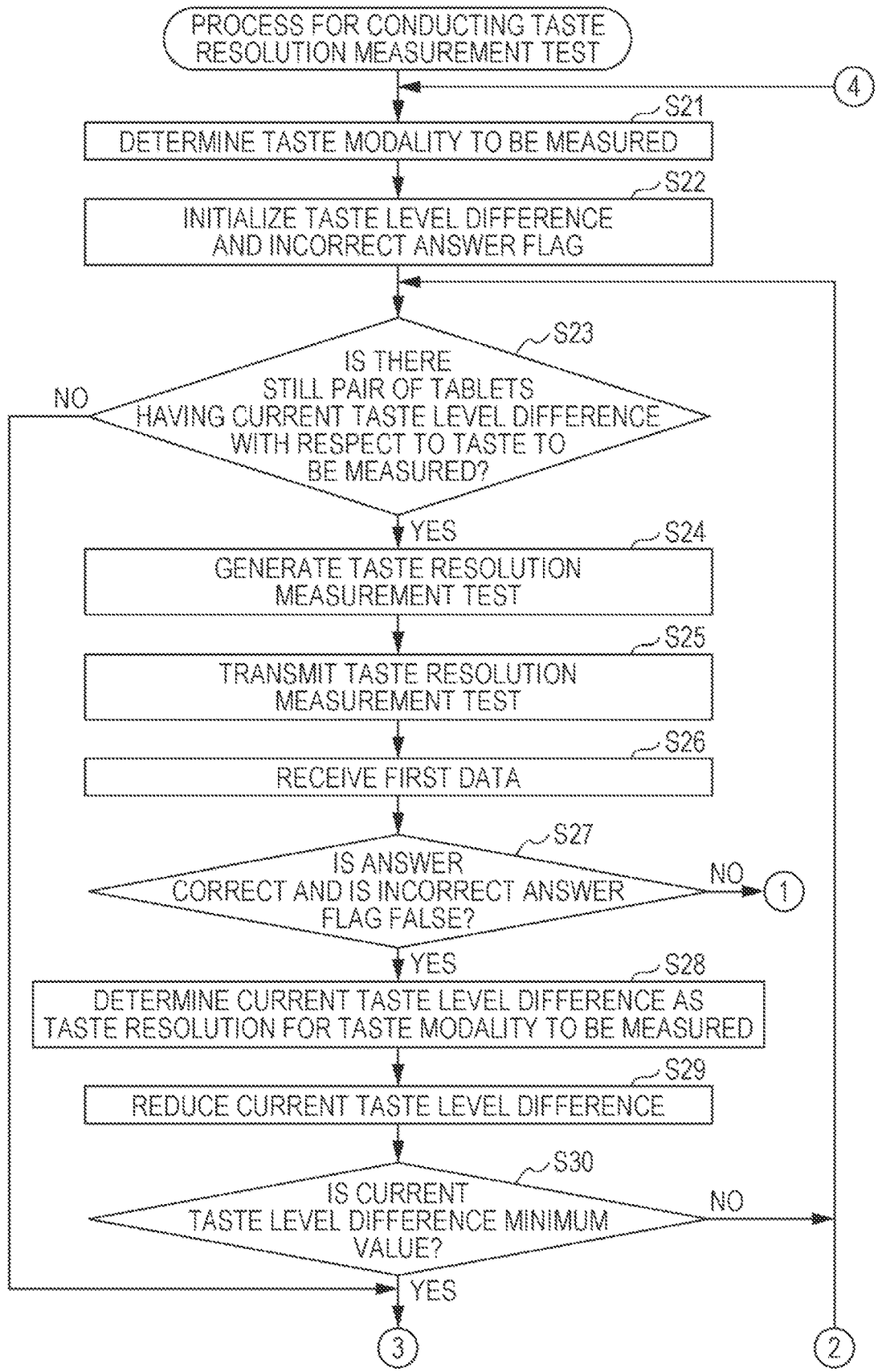
FIG. 5 is a first flowchart illustrating a process for conducting a taste resolution measurement test, which is an example of a process for conducting a taste measurement test in step S2 illustrated in FIG. 4.
Figure 6:
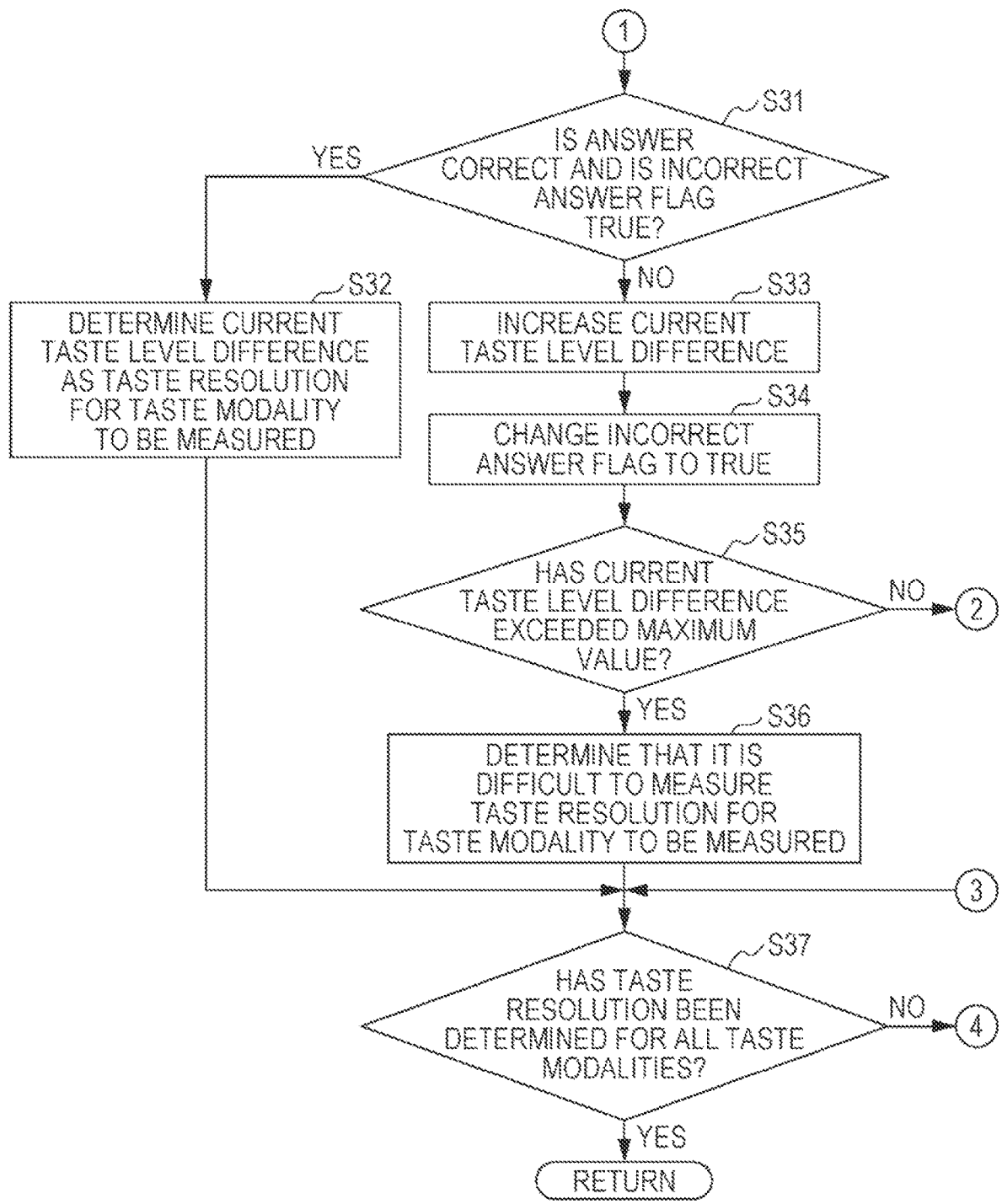
FIG. 6 is a second flowchart illustrating the process for conducting a taste resolution measurement test, which is an example of the process for conducting a taste measurement test in step S2 illustrated in FIG. 4.

FIG. 5 is a first flowchart illustrating the process for conducting a taste resolution measurement test, which is an example of the process for conducting a taste measurement test in step S2 illustrated in FIG. 4. FIG. 6 is a second flowchart illustrating the process.

First, in step S21, the control unit 23 determines a taste modality to be measured in the taste resolution measurement test. The control unit 23 determines, among the five taste modalities, namely sweetness, saltiness, sourness, bitterness, and umami, a taste modality for which a test has not been conducted as a taste modality to be measured. In the first embodiment, the control unit 23 measures taste resolution for each of the five taste modalities.

Next, in step S22, the control unit 23 initializes a taste level difference and an incorrect answer flag (set to false). The taste level difference after the initialization is, for example, 4.

Next, in step S23, the control unit 23 determines whether there is still a pair of tablets having the current taste level difference with respect to the taste modality to be measured. If the control unit 23 determines that there is no longer a pair of tablets having the current taste level of the taste modality to be measured (NO in step S23), the process proceeds to step S37.

If determining that there is still a pair of tablets having the current taste level difference with respect to the taste modality to be measured (YES in step 323), on the other hand, the control unit 23 specifies, in step S24, two tablets having the current taste level difference with respect to the taste modality to be measured and generates a taste resolution measurement question for obtaining an answer as to whether the two specified tablets have the same taste.

When taste resolution for sweetness is measured first, for example, the control unit 23 examines whether the user can perceive a difference in sweetness (sweetness level difference=4) using a level 3 sweet tablet and a level 7 sweet tablet.

Next, in step S25, the communication unit 21 transmits the taste resolution measurement question generated by the control unit 23 to the communication terminal 1. The communication unit 11 of the communication terminal 1 receives the taste resolution measurement question. The display 14 of the communication terminal 1 displays the taste resolution measurement question received by the communication unit 11. In the taste resolution measurement question, the user is asked to take the two tablets having the current taste level difference with respect to the taste modality to be measured and an answer as to whether the two tablets have the same taste is received. The two tablets are specified with tablet IDs. The user takes the two specified tablets and inputs an answer as to whether the two tablets are the same taste. The communication unit 11 transmits first data indicating a value (answer) input by the user for the taste resolution measurement question to the management server 2.

Next, in step S26, the communication unit 21 receives the first data transmitted from the communication terminal 1.

Next, in step S27, the control unit 23 determines whether the value (answer) input by the user for the taste resolution measurement question is correct and whether the incorrect answer flag is false. If determining that the input value (answer) is correct and that the incorrect answer flag is false (YES in step S27), the control unit 23 determines, in step S28, the current taste level difference as taste resolution for the taste modality to be measured (i.e., a taste resolution score of the user for the taste modality).

Next, in step S29, the control unit 23 reduces the current taste level difference. When the current taste level difference is 4, for example, the control unit 23 reduces the current taste level difference to 2. When a previous question was asked using a level 3 tablet and a level 7 tablet, for example, the control unit 23 asks a question using a level 4 tablet and a level 6 tablet.

Next, in step S30, the control unit 23 determines whether the current taste level difference is a minimum value. If the control unit 23 determines that the current taste level difference is a minimum value (YES in step S30), the process proceeds to step S37.

If the control unit 23 determines that the current taste level difference is not a minimum value (NO in step S30), on the other hand, the process returns to step S23. When the current taste level difference is 2, for example, the control unit 23 examines whether the user can perceive a difference in sweetness (sweetness level difference=2) using a level 4 sweet tablet and a level 6 sweet tablet.

If determining in step S27 that the input value (answer) is not correct and/or that the incorrect answer flag is not false (NO in step S27), the control unit 23 determines, in step S31, whether the input value (answer) is correct and the incorrect answer flag is true. If determining that the input value (answer) is correct and the incorrect answer flag is true (YES in step S31), the control unit 23 determines, in step S32, the current taste level difference as taste resolution for the taste modality to be measured (i.e., the taste resolution score of the user for the taste modality).

If the control unit 23 determines that the input value (answer) is not correct and/or that the incorrect answer flag is not true, that is, if the user has given an incorrect answer for a first time in the taste resolution measurement test (the answer is incorrect and the incorrect answer flag is false) or if the user has given two consecutive incorrect answers (the answer is incorrect and the incorrect answer flag is true) (NO in step S31), on the other hand, the control unit 23 increases, in step S33, the current taste level difference. When the current taste level difference is 4, for example, the control unit 23 sets the current taste level difference to 6. When a previous question was asked using a level 3 tablet and a level 7 tablet, for example, the control unit 23 asks a question with a taste level difference of 6 using a level 2 tablet and a level 8 tablet.

Next, in step S34, the control unit 23 changes the incorrect answer flag to true.

Next, in step S35, the control unit 23 determines whether the current taste level difference has exceeded a maximum value. If the control unit 23 determines that the current taste level difference has not exceeded a maximum value (NO in step S35), the process returns to step S23.

If determining that the current taste level difference has exceeded a maximum value (YES in step S35), on the other hand, the control unit 23 determines, in step S36, that it is difficult to measure taste resolution for the taste modality to be measured. Alternatively, the control unit 23 may determine that taste resolution for the taste modality to be measured is the current taste level difference, a difference larger than the current taste level difference, a maximum taste level difference that can be measured with the test meal kit, or a difference larger than the maximum taste level difference that can be measured with the test meal kit.

Next, in step S37, the control unit 23 determines whether taste resolution for all the taste modalities has been determined. If the control unit 23 determines that taste resolution for all the taste modalities has not been determined (NO in step S37), the process returns to step S21.

If the determines that taste resolution for all the taste modalities has been determined (YES in step S37), on the other hand, the process for conducting a taste resolution measurement test ends.

As described above, in a taste resolution measurement test, the control unit 23 increases a taste level difference stepwise if an answer is incorrected and reduces the taste level difference stepwise if an answer is correct. A smallest taste level difference achieved by the user is then determined as the user's taste resolution. Taste resolution is also measured for other tastes. When tablets to be used for the measurement run out, the taste resolution measurement test ends. When the taste resolution measurement test reaches a measurement limit, too, the taste resolution measurement test ends. Taste level differences smaller than one with which the user has failed are not used in order to maintain measurement accuracy by preventing the user from giving a correct answer by chance.

Figure 7:
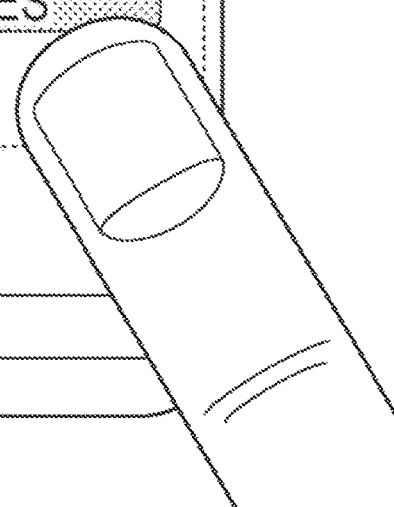
FIG. 7 is a diagram illustrating an example of a taste resolution measurement test screen displayed on a display of a communication terminal according to the first embodiment.

FIG. 7 is a diagram illustrating an example of a taste resolution measurement test screen displayed on the display 14 of the communication terminal 1 according to the first embodiment.

The display 14 of the communication terminal 1 displays the taste resolution measurement test screen illustrated in FIG. 7. The taste resolution measurement test screen includes tablet IDs of two tablets to be taken by the user, a first answer button indicating that the two tablets have the same taste, and a second answer button indicating that the two tablets have different tastes. The user takes the two specified tablets and answers whether the two tablets have the same taste. If the user feels that the two tablets have the same taste, the user touches the first answer button. If the user feels that the two tablets have different tastes, the user touches the second answer button.

Figure 8:
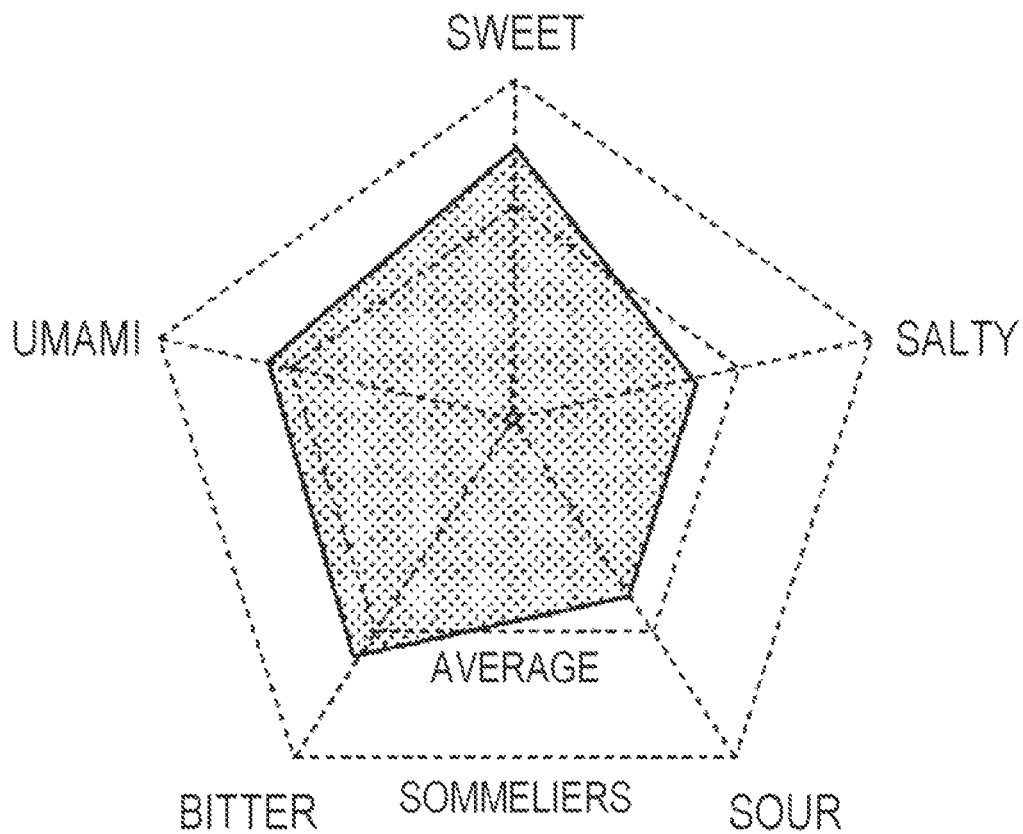
FIG. 8 is a diagram illustrating an example of taste evaluation information displayed on the display of the communication terminal according to the first embodiment.

FIG. 8 is a diagram illustrating an example of taste evaluation information displayed on the display 14 of the communication terminal 1 according to the first embodiment.

The display 14 of the communication terminal 1 displays the taste evaluation information illustrated in FIG. 8. The taste evaluation information includes an overall score (taste score) of at least one taste modality and a radar chart indicating a score of each of the at least one taste modality. The taste evaluation information is an example of information indicating a score of the user's sense of taste.

In the case of taste resolution, for example, a higher score is given as the taste level difference in taste resolution becomes smaller. If the taste level difference is 2, for example, a score of 200 is given, and if the taste level difference is 4, a score of 150 is given.

An inner broken line in the radar chart may indicate an average score of all examinees of a taste resolution measurement test. Alternatively, the inner broken line in the radar chart may indicate an average score of examinees of a taste resolution measurement test of the same age as the user. An outer broken line in the radar chart may indicate an average score of a top group of examinees of a taste resolution measurement test. Alternatively, the outer broken line of the radar chart may indicate an average score of a certain group of examinees (e.g., qualified sommeliers, restaurant owners, or hotel restaurant chefs). When an average score of a certain group of examinees is displayed, "sommeliers", "restaurant owners", "hotel restaurant chefs", or the like may be displayed as an explanation of the outer broken line of the radar chart so that the certain group of examinees can be identified. The taste score need not be a value but may be a level such as level 1, level 2, or level 3, instead.

Similarly, the taste score need not be a value but may be one of stages defined in accordance with original standards, instead. For example, the taste score may be "master sommelier", "senior sommelier", "sommelier", "quasi-sommelier", or "assistant sommelier", Alternatively, the taste score may be "three-star cook", "two-star cook", "one-star cook", "local cook", or "house cook", Alternatively, the taste score may be "first-class cook", "second-class cook", "third-class cook", or "assistant cook". Alternatively, characters in novels, comic books, or the like may be used to express the taste score stepwise.

According to the first embodiment, a smallest difference between levels of at least one taste modality that can be perceived by the user is measured using a taste resolution measurement test, and a score of the user's sense of taste is generated on the basis of first data indicating input values in the taste resolution measurement test while associating the score with the user. The user's sense of taste, therefore, can be accurately and easily measured, and information regarding the user's sense of taste can be collected. Furthermore, a new service, such as introduction of restaurants or foods that suit the user's sense of taste or health management through dietary improvement instructions based on the user's sense of taste, can be offered on the basis of the collected information regarding the user's sense of taste.

Next, a process for evaluating the user's sense of taste performed by the management server according to a first modification of the first embodiment will be described.

In the first embodiment, the communication unit 21 of the management server 2 obtains first data indicating input values in a taste resolution measurement test. In the first modification of the first embodiment, on the other hand, the communication unit 21 of the management server 2 obtains, from the communication terminal 1, second data indicating values input in a test for measuring the user's taste detection threshold (taste detection threshold measurement test). The taste detection threshold measurement test is conducted to measure a lowest level at which the user can detect a certain taste among levels indicating light to strong tastes. The control unit 23 of the management server 2 then generates a score of the user's sense of taste on the basis of at least the first data and the second data.

In the first modification of the first embodiment, the communication unit 21 transmits, to the communication terminal 1, information regarding a taste detection threshold measurement test generated by the control unit 23. The communication unit 21 obtains second data indicating values input in the test for measuring the user's taste detection threshold using the operation unit 15 of the communication terminal 1. The communication unit 21 receives the second data transmitted from the communication terminal 1.

A taste detection threshold refers to a smallest amount of a certain taste ingredient with which the user can perceive that a test meal is no longer tasteless after the amount of the certain taste ingredient contained in a test meal is gradually increased. The taste detection threshold is known to be different between examinees. The taste detection threshold is also known to be different even with the same examinee depending on the taste modality.

The control unit 23 generates a score of the user's sense of taste on the basis of first data and second data received by the communication unit 21 while associating the score with the user. The control unit 23 registers information indicating the score to the memory 22. The communication unit 21 outputs the information indicating the score to the communication terminal 1 in order to display the information indicating the score on the display 14 of the communication terminal 1.

The user inputs, using the operation unit 15, values in a taste detection threshold measurement test based on at least a first test meal group including test meals corresponding to levels indicating light to strong sweetness, a second test meal group including test meals corresponding to levels indicating light to strong saltiness, and a third test meal group including tasteless test meals. The communication unit 21 outputs, to the communication terminal 1, a fourth instruction for asking the user to sequentially input answers as to whether the test meals included in the first test meal group or the second test meal group are tasteless in order from levels indicating lighter tastes using the first and third test meal groups or the second and third test meal groups. The communication unit 21 obtains second data in response to the fourth instruction.

The first to third test meal groups are managed using a common test meal kit ID.

In the first modification of the first embodiment, too, a taste detection threshold measurement test is conducted using the same test meal kit in the first embodiment.

Figure 9:
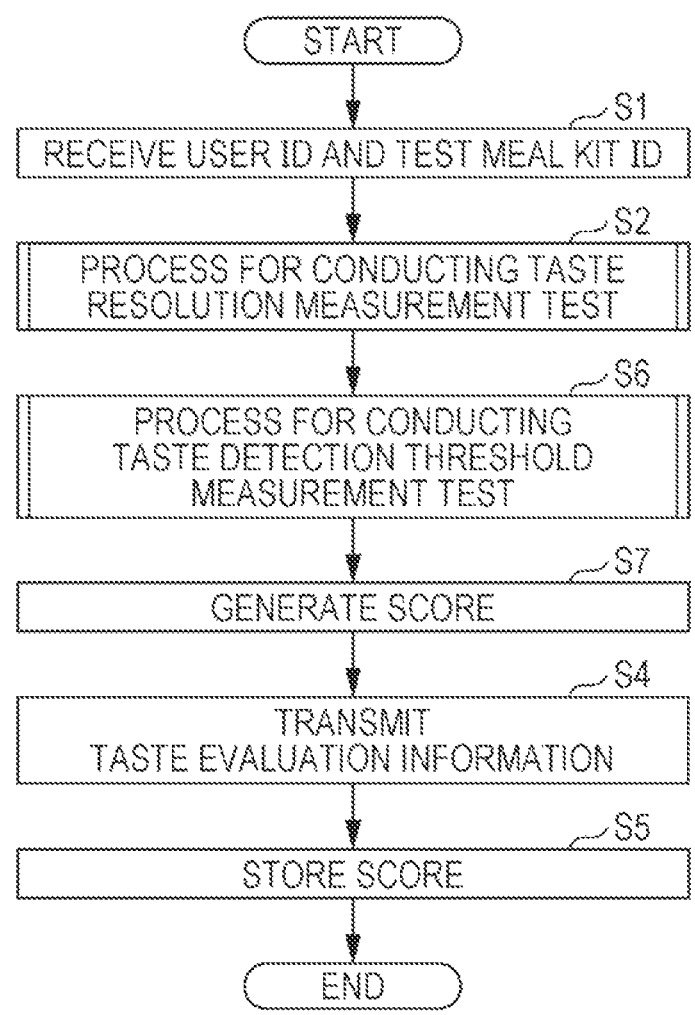
FIG. 9 is a flowchart illustrating a process for evaluating the user's sense of taste performed by the management server according to a first modification of the first embodiment of the present disclosure.

FIG. 9 is a flowchart illustrating the process for evaluating the user's sense of taste performed by the management server 2 according to the first modification of the first embodiment of the present disclosure.

In FIG. 9, the same steps as in the process for evaluating the user's sense of taste illustrate in FIG. 4 are given the same reference numerals, and description thereof is omitted.

In step S6, the control unit 23 performs a process for conducting a taste detection threshold measurement test. In the process for conducting a taste detection threshold measurement test, taste detection threshold measurement questions for measuring the user's taste detection threshold are generated, and second data indicating input values in the taste detection threshold measurement test is obtained. The process for conducting a taste detection threshold measurement test will be described with reference to FIG. 10.

Next, in step S7, the control unit 23 generates a score of the user's sense of taste on the basis of the first data and the second data while associating the score with the user.

Next, the process for conducting a taste detection threshold measurement test in step S6 illustrated in FIG. 9 will be described.

Figure 10:
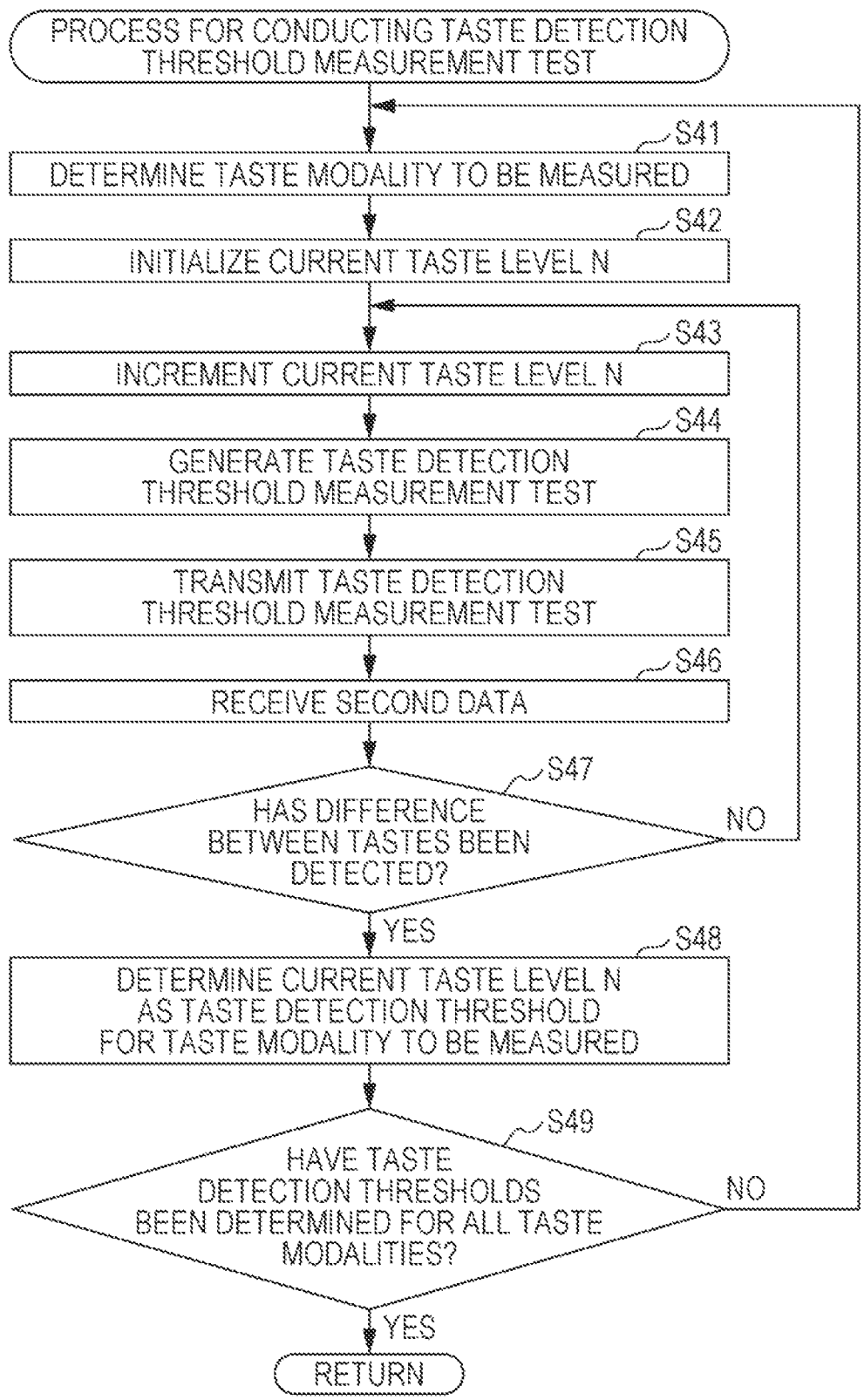
FIG. 10 is a flowchart illustrating a process for conducting a taste detection threshold measurement test in step S6 illustrated in FIG. 9.

FIG. 10 is a flowchart illustrating the process for conducting a taste detection threshold measurement test in step S6 illustrated in FIG. 9.

First, in step S41, the control unit 23 determines a taste modality to be measured. The control unit 23 determines, among the five taste modalities, namely sweetness, saltiness, sourness, bitterness, and umami, a taste modality that has not been measured as a taste modality to be measured. In the first modification of the first modification, the control unit 23 measures a taste detection threshold for each of the five taste modalities.

Next, in step S42, the control unit 23 initializes a current taste level N. The taste level N after the initialization is 0.

Next, in step S43, the control unit 23 increments the current taste level N.

Next, in step S44, the control unit 23 specifies a tasteless tablet and a tablet having the current taste level N of the taste modality to be measured and generates a taste detection threshold measurement question for obtaining an answer as to whether there is a difference between tastes of the two specified tablets.

When a taste detection threshold for sweetness is measured first, the control unit 23 examines whether the user can perceive a difference between a taste of a tasteless tablet and a taste of a level 1 sweet tablet.

Next, in step S45, the communication unit 21 transmits the taste detection threshold measurement question generated by the control unit 23 to the communication terminal 1. The communication unit 11 of the communication terminal 1 receives the taste detection threshold measurement question. The display 14 of the communication terminal 1 displays the taste detection threshold measurement test received by the communication unit 11. In the taste detection threshold measurement question, the user is asked to take a tasteless tablet and a tablet having the current taste level N of the taste modality to be measured, and an answer as to whether there is a difference between tastes of the two tablets is received. The two tablets are specified with tablet IDs. The user takes the two specified tablets and inputs an answer as to whether there is a difference between the tastes of the two tablets. The communication unit 11 transmits, to the management server 2, second data indicating a value (answer) input by the user for the taste detection threshold measurement question.

Next, in step S46, the communication unit 21 receives the second data transmitted from the communication terminal 1.

Next, in step S47, the control unit 23 determines whether the user has detected the difference between the tastes. If the control unit 23 determines that the user has not detected the difference between the tastes (NO in step S47), the process returns to step S43.

If determining that the user has detected the difference between the tastes (YES in step S47), on the other hand, the control unit 23 determines, in step S48, the current taste level N as a taste detection threshold for the taste modality to be measured.

If the user has not detected the difference between the taste of the tasteless tablet and the taste of the level 1 sweet tablet, for example, the control unit 23 examines whether the user can detect a difference between the taste of the tasteless tablet and a taste of a level 2 sweet tablet. The control unit 23 then keeps incrementing a sweetness level N of one of two tablets until the user can detect a difference between the two tablets and determines the sweetness level N at which the user has detected a difference between tastes for a first time as a taste detection threshold for sweetness.

Next, in step S49, the control unit 23 determines whether taste detection thresholds have been determined for all the taste modalities. If the control unit 23 determines that taste detection thresholds have not been determined for all the taste modalities (NO in step S49), the process returns to step S41.

If the control unit 23 determines that taste detection thresholds have been determined for all the taste modalities (YES in step S49), on the other hand, the process for conducting a taste detection threshold measurement test ends.

Figure 11:
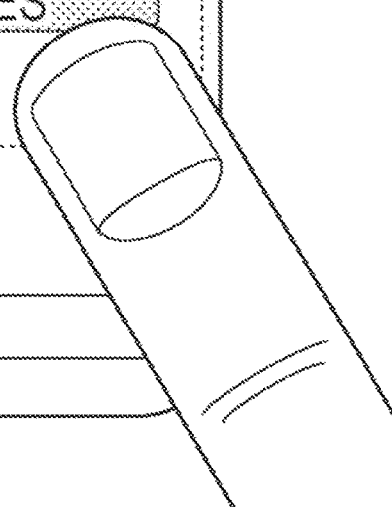
FIG. 11 is a diagram illustrating an example of a taste detection threshold measurement test screen displayed on the display of the communication terminal according to the first modification of the first embodiment.

FIG. 11 is a diagram illustrating an example of a taste detection threshold measurement test screen displayed on the display 14 of the communication terminal 1 according to the first modification of the first embodiment.

The display 14 of the communication terminal 1 displays the taste detection threshold measurement test screen illustrated in FIG. 11. The taste detection threshold measurement test screen includes tablet IDs of two tablets to be taken by the user, a first answer button indicating that the two tablets have the same taste, and a second answer button indicating the two tablets have different tastes. One of the two tablets is a tasteless tablet and the other is a tablet having the taste level N. The user takes the two specified tablets and answers whether the two tablets have the same taste. If the user feels that the two tablets have the same taste, the user touches the first answer button. If the user feels that the two tablets have different tastes, the user touches the second answer button.

The control unit 23 converts taste resolution for each of the taste modalities into a score and a taste detection threshold of each of the tastes into a score. The control unit 23 then adds up the score of taste resolution and the score of the taste detection threshold for each of the taste modalities and determines a sum as a score for the taste. Furthermore, the control unit 23 adds up the scores for all the taste modalities and determines a sum as an overall taste score. The control unit 23 then generates taste evaluation information similar to that illustrated in FIG. 8.

In the description of the first modification of the first embodiment of the present disclosure with reference to FIG. 9, the user's sense of taste is evaluated using two measurement tests, namely the taste resolution measurement test and the taste detection threshold measurement test. The present disclosure, however, is not limited to this. A score of the user's sense of taste may be generated by conducting only the taste detection threshold measurement test (step S6) without conducting the taste resolution measurement test (step S2). In this case, in step S7, the control unit 23 converts a taste detection threshold for each of the tastes into a score. The control unit 23 then determines the score obtained from the taste detection threshold for each of the tastes as a score for the taste. Furthermore, the control unit 23 adds up the scores for all the tastes and determines a sum as an overall taste score. The control unit 23 then generates taste evaluation information similar to that illustrated in FIG. 8. A score of the user's sense of taste for at least one taste modality may thus be obtained on the basis of only a taste detection threshold or a combination of taste resolution and a taste detection threshold.

Next, a process for evaluating the user's sense of taste performed by the management server 2 according to a second modification of the first embodiment will be described.

In the first embodiment, the communication unit 21 of the management server 2 obtains first data indicating input values in a taste resolution measurement test. In the second modification of the first embodiment, on the other hand, the communication unit 21 of the management server 2 obtains third data indicating values input in a test for measuring the user's taste perception threshold (taste perception threshold measurement test) from the communication terminal 1. The taste perception threshold measurement test is conducted to measure a lowest level of at least one taste at which the user can perceive the at least one taste among levels indicating no taste and light to strong tastes. The control unit 23 of the management server 2 then generates a score of the user's sense of taste on the basis of at least the first data and the third data.

In the second modification of the first embodiment, the communication unit 21 transmits, to the communication terminal 1, information regarding a taste perception threshold measurement test generated by the control unit 23, The communication unit 21 obtains third data indicating values input in the test for measuring the user's taste perception threshold using the operation unit 15 of the communication terminal 1. The communication unit 21 receives the third data transmitted from the communication terminal 1.

A taste perception threshold refers to a smallest amount of a certain taste ingredient with which the user can perceive that a test meal contains the certain taste ingredient after the amount of the certain taste ingredient contained in a test meal is gradually increased. The taste detection threshold is known to be different between examinees. The taste perception threshold is also known to be different even with the same examinee depending on the taste modality.

The control unit 23 generates a score of the user's sense of taste on the basis of first data and third data received by the communication unit 21 while associating the score with the user. The control unit 23 registers information indicating the score to the memory 22. The communication unit 21 outputs the information indicating the score to the communication terminal 1 in order to display the information indicating the score on the display 14 of the communication terminal 1.

The user inputs, using the operation unit 15, values in a taste perception threshold measurement test based on at least a first test meal group including test meals corresponding to levels indicating light to strong sweetness and a second test meal group including tasteless test meals. The communication unit 21 outputs, to the communication terminal 1, a fifth instruction for asking the user to sequentially input answers as to whether the test meals included in the first test meal group are tasteless or sweet in order from levels indicating lighter tastes using the first and second test meal groups. The communication unit 21 obtains third data in response to the fifth instruction.

The first and second test meal groups are managed using a common test meal kit ID.

In the second modification of the first embodiment, too, a taste perception threshold measurement test is conducted using the same test meal kit as in the first embodiment.

Figure 12:
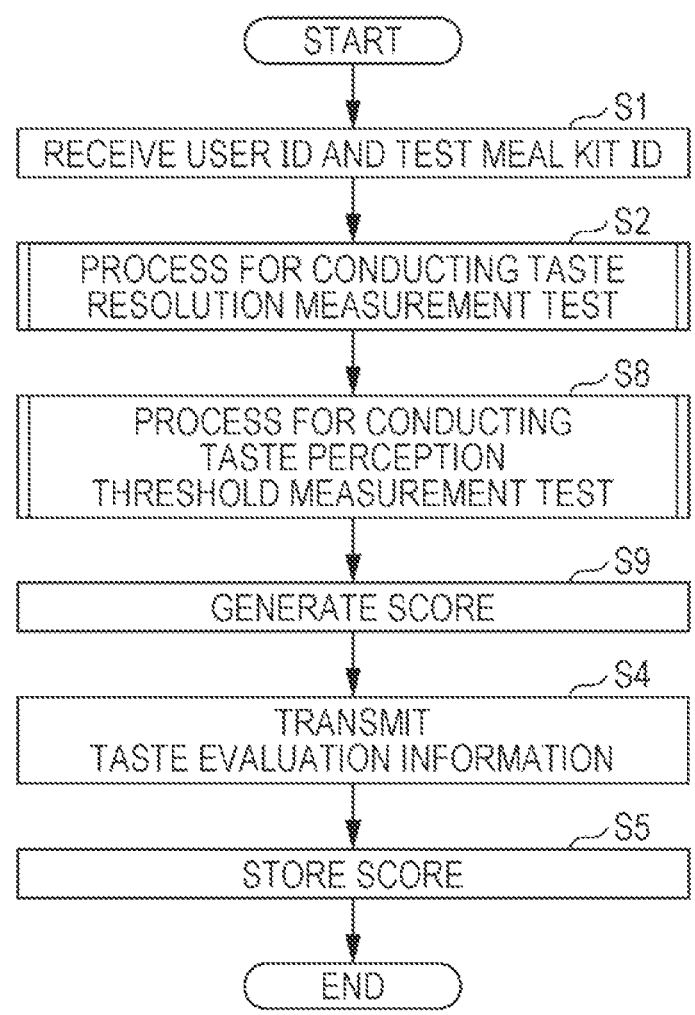
FIG. 12 is a flowchart illustrating a process for evaluating the user's sense of taste performed by the management server according to a second modification of the first embodiment of the present disclosure.

FIG. 12 is a flowchart illustrating the process for evaluating the user's sense of taste performed by the management server 2 according to the second modification of the first embodiment of the present disclosure.

In FIG. 12, the same steps as in the process for evaluating the user's sense of taste illustrated in FIG. 4 are given the same reference numerals, and description thereof is omitted.

In step S8, the control unit 23 performs a process for conducting a taste perception threshold measurement test. In the process for conducting a taste perception threshold measurement test, taste perception threshold measurement questions for measuring the user's taste perception threshold are generated, and third data indicating values for the taste perception threshold measurement questions is obtained. The process for conducting a taste perception threshold measurement test will be described with reference to FIG. 13.

Next, in step S9, the control unit 23 generates a score of the user's sense of taste on the basis of the first data and the third data while associating the score with the user.

Next, the process for conducting a taste perception threshold measurement test in step S8 illustrated in FIG. 12 will be described.

Figure 13:
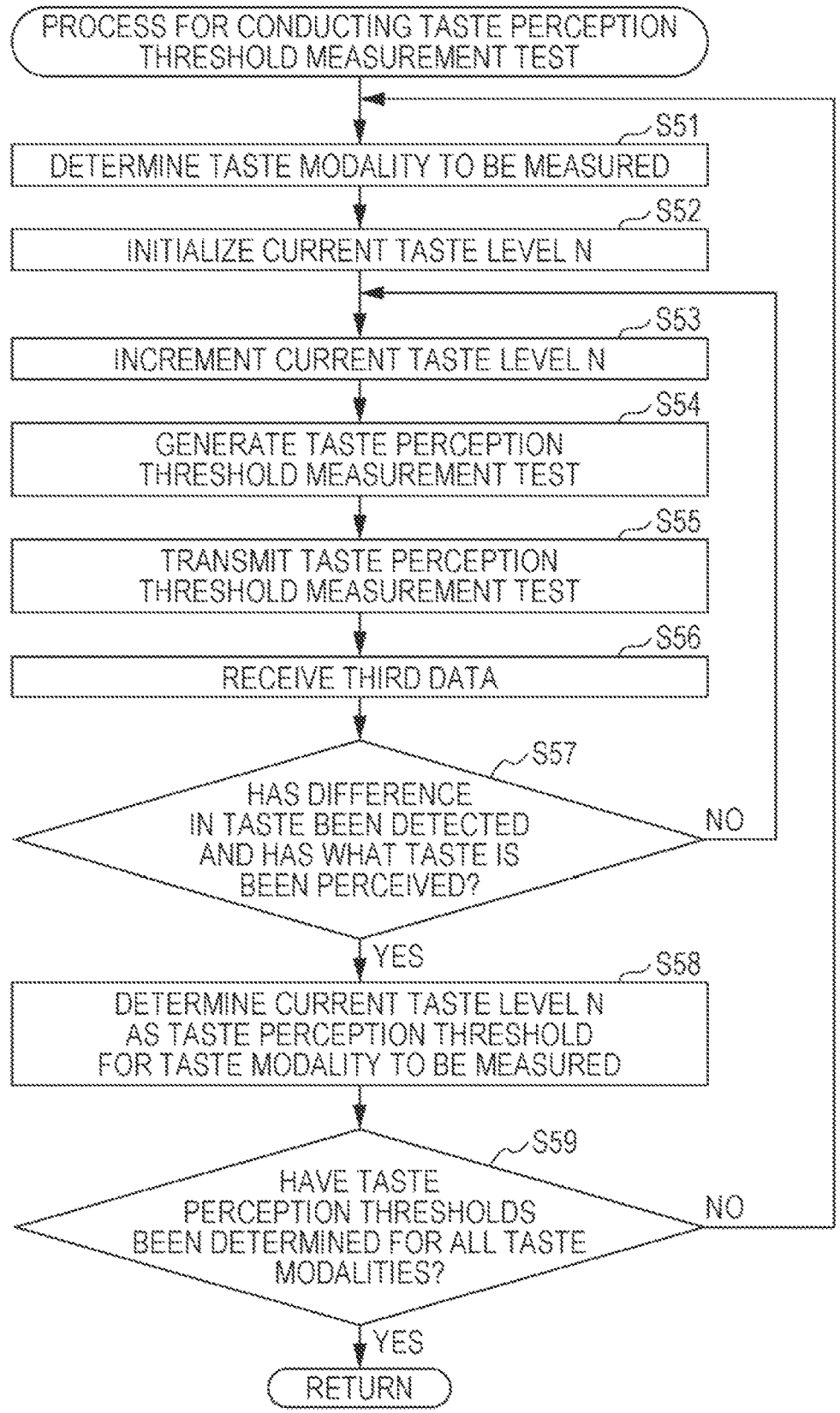
FIG. 13 is a flowchart illustrating a process for conducting a taste perception threshold measurement test in step S8 illustrated in FIG. 12.

FIG. 13 is a flowchart illustrating the process for conducting a taste perception threshold measurement test in step S8 illustrated in FIG. 12.

First, in step S51, the control unit 23 determines a taste modality to be measured. The control unit 23 determines, among the five taste modalities, namely sweetness, saltiness, sourness, bitterness, and umami, a taste modality that has not been measured as a taste modality to be measured. In the second modification of the first embodiment, the control unit 23 measures a taste perception threshold for each of the five taste modalities.

Next, in step S52, the control unit 23 initializes the current taste level N. The taste level N after the initialization is 0.

Next, in step S53, the control unit 23 increments the current taste level N.

Next, in step S54, the control unit 23 specifies a tasteless tablet and a tablet having the current taste level N of the taste modality to be measured and generates a taste perception threshold measurement question for obtaining an answer as to whether there is a difference between tastes of the two specified tablets and an answer as to what the taste is.

When a taste perception threshold for sweetness is measured first, for example, the control unit 23 examines whether the user can perceive a difference between a tasteless tablet and a level 1 sweet tablet and whether the user can perceive that the taste modality to be measured is sweet.

Next, in step S55, the communication unit 21 transmits the taste perception threshold measurement question generated by the control unit 23 to the communication terminal 1. The communication unit 11 of the communication terminal 1 receives the taste perception threshold measurement question. The display 14 of the communication terminal 1 displays the taste perception threshold measurement question received by the communication unit 11. In the taste perception threshold measurement question, the user is asked to take a tasteless tablet and a tablet having the current taste level N of the taste modality to be measured. An answer as to whether there is a difference between tastes of the two tablets is received, and, if there is a difference, an answer as to what the taste is also received. The two tablets are specified with tablet IDs. The user takes two specified tablets and inputs an answer as to whether there is a difference between tastes of the two tablets and, if there is a difference, an answer as to what the taste is. The communication unit 11 transmits, to the management server 2, third data indicating the values (answers) input by the user in the taste perception threshold measurement test.

Next, in step S56, the communication unit 21 receives the third data transmitted from the communication terminal 1.

Next, in step S57, the control unit 23 determines whether the user has detected the difference in taste and whether the user has perceived what the taste is. If the user has not detected the difference in taste and/or the user has not perceived what the taste is (NO in step S57), the process returns to step S53.

If the user has detected the difference in taste and the user has correctly perceived what the taste is (YES in step S57), on the other hand, the control unit 23 determines, in step S58, the current taste level N as a taste perception threshold for the taste modality to be measured.

If the user has not detected the difference between a taste of the tasteless tablet and a taste of the level 1 sweet tablet, for example, the control unit 23 examines whether the user can detect a difference between a taste of a tasteless tablet and a taste of a level 2 sweet tablet, Even if the user has detected the difference between the taste of the tasteless tablet and the taste of the level 1 sweet tablet, the control unit 23 examines whether the user can detect a difference between a taste of a tasteless tablet and a taste of a level 2 sweet tablet unless the user has correctly perceived that the taste is sweetness. The control unit 23 keeps incrementing the sweetness level N of one of two tablets until the user can perceive a difference between tastes of the two tablets and what the taste is. The control unit 23 then determines the sweetness level N at which the user has perceived that the taste is sweetness for a first time as a taste perception threshold for sweetness.

Next, in step S59, the control unit 23 determines whether taste perception thresholds have been determined for all the tastes. If the control unit 23 determines that taste perception thresholds have not been determined for all the tastes (NO in step S59), the process returns to step S51.

If the control unit 23 determines that taste perception thresholds have been determined for all the tastes (YES in step S59), on the other hand, the process for conducting a taste perception threshold measurement test ends.

FIG. 14 is a diagram illustrating an example of a taste perception threshold measurement test screen displayed on the display 14 of the communication terminal 1 according to the second modification of the first embodiment.

The display 14 of the communication terminal 1 displays the taste perception threshold measurement test screen illustrated in FIG. 14. When the user is informed that one of two tablets to be taken thereby is tasteless, the taste perception threshold measurement test screen includes tablet IDs of the two tablets, a first answer button indicating that the two tablets have the same taste, a second answer button indicating that one of the two tablets contains a sweet ingredient, a third answer button indicating that one of the two tablets contains a sour ingredient, a fourth answer button indicating that one of the two tablets contains an umami ingredient, a fifth answer button indicating that one of the two tablets contains a salty ingredient, and a sixth answer button indicating that one of the two tablets contains a bitter ingredient, One of the two tablets is a tasteless tablet, and the other is a tablet having the taste level N.

When the user is not informed that one of two tablets to be taken thereby is tasteless, the taste perception threshold measurement test screen includes tablet IDs of the two tablets, a first answer indicating that the two tablets have the same taste, a second answer button indicating that the two tablets contain different amounts of a sweet ingredient, a third answer button indicating that the two tablets contain different amounts of a sour ingredient, a fourth answer button indicating different amounts of an umami ingredient, a fifth answer button indicating different amounts of a salty ingredient, and a sixth answer button indicating different amounts of a bitter ingredient. Both of the tablets need not be tasteless. The two tablets may be any tablets that contain different amounts of an ingredient corresponding to a taste modality to be measured but that contain the same amounts of other ingredients.

The user takes two specified tablets and answers whether the two tablets have the same tastes, if the user feels that the two tablets do not have the same tastes, the user also answers what a taste contained in one of the two tablets is or what a taste different between the two tablets is. If the user feels that the two tablets have the same taste, the user touches the first answer button. If the user feels that the two tablets have different tastes, the user touches one of the second to sixth answer buttons. A taste detection threshold measurement test may also be conducted in parallel with a taste perception threshold measurement test. In this case, a seventh answer button to be selected when the user feels that two tablets have different tastes but does not know what the taste is may also be displayed. As a result, since two or more measurement tests relating to the sense of taste, namely a taste detection threshold measurement test and a taste perception threshold measurement test, can be simultaneously conducted, the user's sense of taste can be efficiently evaluated with a small number of tests.

The control unit 23 converts taste resolution for each of the taste modalities into a score and a taste perception threshold of each of the taste modalities into a score. The control unit 23 then adds up the score of taste resolution and the score of the taste perception threshold for each of the taste modalities and determines a sum as a score for the taste modality. Furthermore, the control unit 23 adds up the scores for all the taste modalities and determines a sum as an overall taste score. The control unit 23 then generates taste evaluation information similar to that illustrated in FIG. 8.

In the description of the second modification of the first embodiment of the present disclosure with reference to FIG. 12, the user's sense of taste is evaluated using two measurement tests, namely the taste resolution measurement test and the taste perception threshold measurement test. The present disclosure, however, is not limited to this. A score of the user's sense of taste may be generated by conducting only the taste perception threshold measurement test (step S8) without conducting the taste resolution measurement test (step S2). In this case, in step S9, the control unit 23 converts a taste perception threshold for each of the taste modalities into a score. The control unit 23 then determines the score obtained from the taste perception threshold for each of the taste modalities as a score for the taste modality. Furthermore, the control unit 23 adds up the scores for all the taste modalities and determines a sum as an overall taste score. The control unit 23 then generates taste evaluation information similar to that illustrated in FIG. 8. A score of the user's sense of taste for at least one taste modality may thus be obtained on the basis of only a taste perception threshold. Alternatively, the user's sense of taste may be evaluated using a combination of at least two of taste resolution (first data), a taste detection threshold (second data), and a taste perception threshold (third data) for at least one taste modality.

Next, a process for evaluating the user's sense of taste performed by the management server 2 according to a third modification of the first embodiment will be described.

In the first embodiment, the communication unit 21 of the management server 2 obtains first data indicating input values in a taste resolution measurement test. In the third modification of the first embodiment, on the other hand, the communication unit 21 of the management server 2 obtains, from the communication terminal 1, fourth data indicating input values in a taste strength measurement test conducted on the user. The taste strength measurement test is conducted to measure whether the user can correctly and relatively perceive at least three levels, which indicate light to strong tastes, of at least one taste. The control unit 23 of the management server 2 then generates a score of the user's sense of taste on the basis of at least the first data and the fourth data.

In the third modification of the first embodiment, the communication unit 21 transmits, to the communication terminal 1, information regarding a taste strength measurement test generated by the control unit 23. The communication unit 21 obtains fourth data indicating values input in the test for measuring the user's taste strength using the operation unit 15 of the communication terminal 1. The communication unit 21 receives the fourth data transmitted from the communication terminal 1.

The control unit 23 generates a score of the user's sense of taste on the basis of first data and fourth data received by the communication unit 21 while associating the score with the user. The control unit 23 registers information indicating the score to the memory 22. The communication unit 21 outputs the information indicating the score to the communication terminal 1 in order to display the information indicating the score on the display 14 of the communication terminal 1.

The user inputs, using the operation unit 15, values in the taste strength measurement test based on at least a first test meal group including, for example, test meals corresponding to levels indicating light to strong sweetness. The communication unit 21 outputs, to the communication terminal 1, a sixth instruction for asking the user to sequentially input at least three of the test meals included in the first test meal group in descending order of the strength of taste. The communication unit 21 obtains fourth data in response to the sixth instruction.

In the third modification of the first embodiment, too, a taste strength meal test is conducted using the same test meal kit as in the first embodiment.

Figure 15:
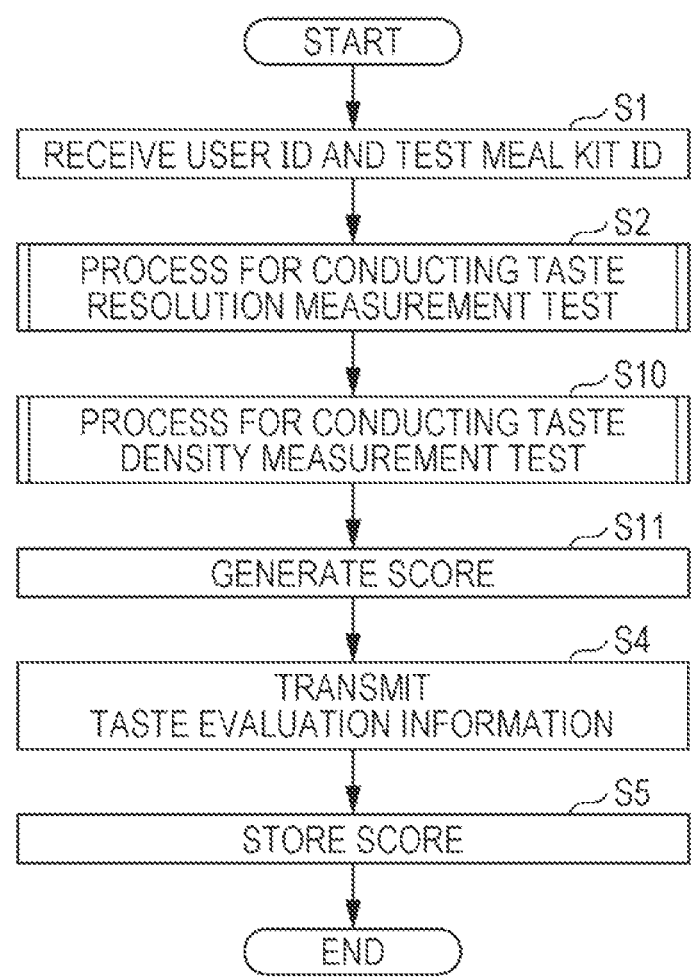
FIG. 15 is a flowchart illustrating a process for evaluating the user's sense of taste performed by the management server according to a third modification of the first embodiment of the present disclosure.

FIG. 15 is a flowchart illustrating a process for evaluating the user's sense of taste performed by the management server 2 according to the third modification of the first embodiment of the present disclosure.

In FIG. 15, the same steps as in the process for evaluating the user's sense of taste illustrated in FIG. 4 are given the same reference numerals, and description thereof is omitted.

In step S10, the control unit 23 performs a process for conducting a taste strength measurement test. In the process for conducting a taste strength measurement test, taste strength measurement questions for measuring the user's taste strength is generated, and fourth data indicating input values for the taste strength measurement questions are obtained. The process for conducting a taste strength measurement test will be described with reference to FIGS. 16 and 17.

Next, in step S11, the control unit 23 generates a score of the user's sense of taste on the basis of first data and fourth data while associating the score with the user.

Next, the process for conducting a taste strength measurement test in step S10 illustrated in FIG. 15 will be described.

First, the control unit 23 determines a taste modality to be measured. The control unit 23 determines, among the five taste modalities, namely sweetness, saltiness, sourness, bitterness, and umami, a taste modality that has not been measured as a taste modality to be measured. In the third modification of the first embodiment, the control unit 23 measures taste strength for each of the five taste modalities.

Next, the control unit 23 selects four taste levels, for example, among currently remaining taste levels.

Next, the control unit 23 specifies tablets having the four taste levels corresponding to the taste modality to be measured and generates a taste strength measurement question for obtaining an answer where the user has tried to arrange the four specified tablets in descending order of the strength of taste.

When the taste strength of bitterness is to be measured first, for example, the control unit 23 asks the user to arrange tablets having bitter levels 3, 5, 7, and 9 in descending order of the strength of taste.

Next, the communication unit 21 transmits the taste strength measurement question generated by the control unit 23 to the communication terminal 1. The communication unit 11 of the communication terminal 1 receives the taste strength measurement question. The display 14 of the communication terminal 1 displays the taste strength measurement question received by the communication unit 11. In the taste strength measurement question, the user is asked to take the tablets having the four taste levels corresponding to the taste modality to be measured, and an answer where the user has tried to arrange the four tablets in, as specified, descending order of the strength of taste is received. The four tablets are specified with tablet IDs. The user takes the four specified tablets and tries to arrange the four tablets in descending order of the strength of taste. The communication unit 11 transmits, to the management server 2, fourth data indicating a value (answer) input by the user in the taste strength measurement test.

Figure 16:
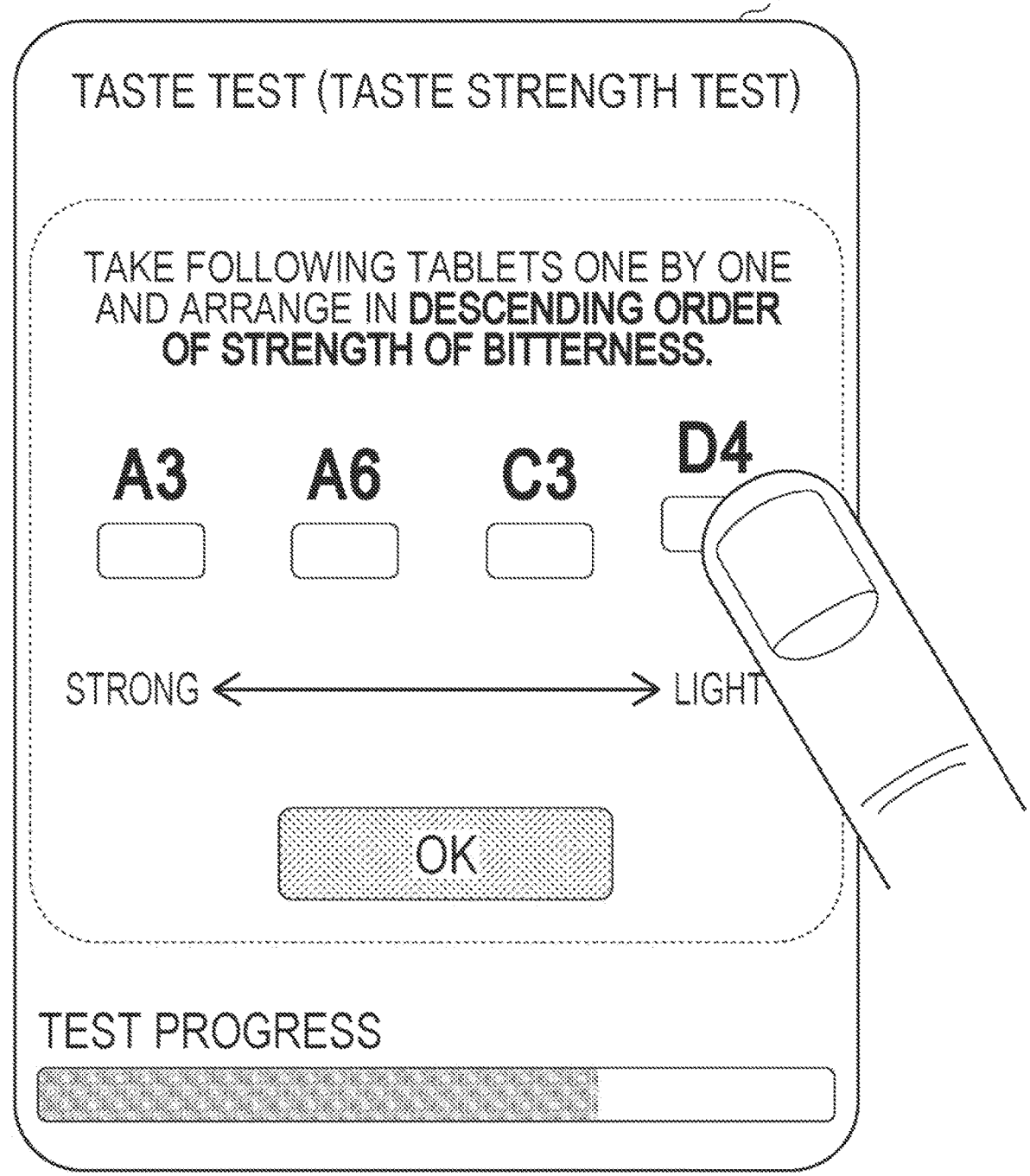
FIG. 16 is a diagram illustrating an example of a taste strength measurement test screen displayed on the display of the communication terminal according to the third modification of the first embodiment.

FIG. 16 is a diagram illustrating an example of a taste strength measurement test screen displayed on the display 14 of the communication terminal 1 according to the third modification of the first embodiment.

The display 14 of the communication terminal 1 displays the taste strength measurement test screen illustrated in FIG. 16. The taste strength measurement test screen includes icons indicating the tablet IDs of the four tablets to be taken by the user and an answer button for confirming order of the icons that the user has tried to arrange in descending order of the strength of taste. The user can move the four icons. As specified, the user tries to arrange the four icons in descending order of the strength of taste.

The user takes the four specified tablets and tries to arrange the icons indicating the four tablets in descending order of bitterness. After finishing arranging the four icons, the user touches the answer button.

Next, the communication unit 21 receives fourth data transmitted from the communication terminal 1.

Next, the control unit 23 calculates the amount of difference between the order created by the user and correct order.

Next, the control unit 23 determines whether another question can be generated with remaining tablets. When the amount of difference is small, the control unit 23 generates a more difficult question. When the amount of difference is large, the control unit 23 generates an easier question. When taste level differences of the tablets are small, for example, the question becomes more difficult. When taste level differences between the tablets are large, the question becomes easier.

If determining that another taste strength measurement question can be generated with remaining tablets and that it is necessary to generate a next question, the control unit 23 generates a next taste strength measurement question.

If determining that it is difficult to make another taste strength measurement question with remaining tablets or that a next question need not be generated, on the other hand, the control unit 23 determines a current amount of difference as taste strength for the taste modality to be measured.

Next, the control unit 23 determines whether taste strength has been determined for all the taste modalities. If determining that taste strength has not been determined for all the taste modalities, the control unit 23 determines a taste modality that has not been measured as a taste modality to be measured.

If the control unit 23 determines that taste strength has been determined for all the taste modalities, on the other hand, the process for conducting a taste strength measurement test ends.

FIG. 17 is a diagram illustrating an example of the amount of difference between correct order and order created by the user according to the third modification of the first embodiment.

The control unit 23 calculates the amount of difference between the correct order and the order created by the user by adding up squares of differences between positions of the tablets in the correct order and positions of the same tablets in the order created by the user.

In the example illustrated in FIG. 17, the correct order is tablet A3, tablet D4, tablet C3, and tablet A6. The order created by the user is tablet A3, tablet A6, tablet C3, and tablet D4. In this case, the control unit 23 calculates the amount of difference as follows.

$$\text{Amount of difference} = (1-1)^2 + (4-2)^2 + (3-3)^2 + (2-4)^2 = 8$$

The control unit 23 changes the difficulty of a next taste strength measurement question or a score of the user's taste strength in accordance with the calculated amount of difference.

As the amount of difference becomes larger, for example, the difficulty of a next taste strength measurement question and/or another taste measurement question decreases more largely. As the amount of difference becomes smaller, the difficulty of a next taste strength measurement question and/or another taste measurement question decreases more slightly (or increases). That is, when $X_n$ denotes the amount of difference and $Y_n$ denotes a decrease in the difficulty of a next taste strength measurement question and/or another taste measurement question, $X_1 > X_2$ results in $Y_1 > Y_2$. $X_n$ is always larger than or equal to 0, but $Y_n$ can be positive or negative. When the difficulty of a next taste strength measurement question and/or another taste measurement question increases, $Y_n$ is a negative value.

A next taste strength measurement question is generated with currently remaining tablets. When only tablets having four sweetness levels, namely sweetness levels 1, 2, 4, and 8, for example, a taste strength measurement question where a taste level difference is 1, 2, 3, 4, 6, or 7 can be asked, but it is difficult to ask a question with a taste level difference other than these. The control unit 23 determines a next taste strength measurement question and/or another taste measurement question and two or more tablets to be used in the question on the basis of the difficulty of the next taste strength measurement question and a combination of taste levels of the remaining tablets.

As the amount of difference becomes larger, a score of the taste strength measurement test increases more slightly (or decreases). As the amount of difference becomes smaller, the score increases more largely. A higher score of the taste strength measurement test indicates a more sensitive sense of taste.

When Xn denotes the amount of difference and Zn denotes an increase in the score of the taste strength measurement test, X1>X2 results in Z1<Z2. Xn is always larger than or equal to 0, but Zn can be positive or negative. When the score decreases, Zn is a negative value.

The control unit 23 generates the score of the taste strength measurement test in accordance with the amount of difference. The control unit 23 decreases the score as the amount of difference increases, and increases the score as the amount of difference decreases.

The control unit 23 converts taste resolution for each of the taste modalities into a score and taste strength for each of the taste modalities into a score. The control unit 23 then adds up the score of taste resolution and the score of taste strength for each of the taste modalities and determines a sum as a score for the taste modality. Furthermore, the control unit 23 adds up the scores for all the taste modalities to calculate an overall taste score. The control unit 23 then generates taste evaluation information similar to that illustrated in FIG. 8.

In the description of the third modification of the first embodiment of the present disclosure with reference to FIG. 15, the user's sense of taste is evaluated using two measurement tastes, namely the taste resolution measurement test and the taste strength measurement test. The present disclosure, however, is not limited to this. The control unit 23 may generate a score of the user's sense of taste by conducting only the taste strength measurement test (step S10) without conducting the taste resolution measurement test (step S2), instead. In this case, in step S11, the control unit 23 converts taste strength for each of the taste modalities into a score. The control unit 23 determines the score of taste strength for each of the taste modalities as a score for the taste. Furthermore, the control unit 23 adds up the scores for all the taste modalities to calculate an overall taste score. The control unit 23 then generates taste evaluation information similar to that illustrated in FIG. 8. The user's sense of taste may thus be evaluated on the basis of only taste strength for at least one taste modality. Alternatively, the user's sense of taste may be evaluated on the basis of a combination of at least two of taste resolution (first data), a taste detection threshold (second data), a taste perception threshold (third data), and taste strength (fourth data) for at least one taste modality.

Next, a process for evaluating the user's sense of taste performed by the management server 2 according to a fourth modification of the first embodiment will be described.

Figure 18:
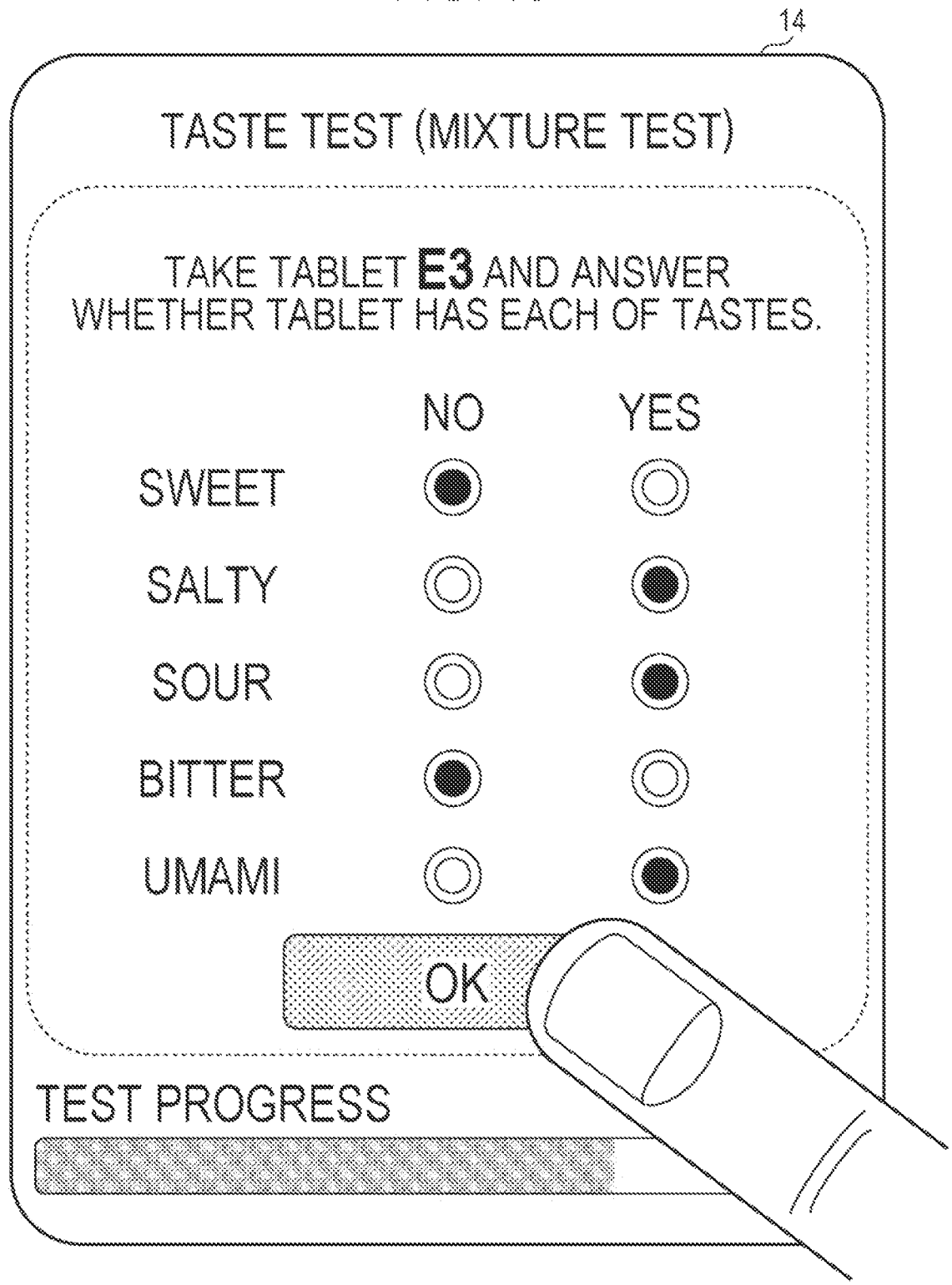
FIG. 18 is a diagram illustrating an example of a taste mixture measurement test screen displayed on the display of the communication terminal according to a fourth modification of the first embodiment.

In the fourth example of the first embodiment, a measurement test relating to the user's sense of taste is conducted using a certain test meal. The test meal used in the fourth example of the first embodiment contains at least one taste ingredient. The user tastes the test meal and inputs answers as to whether the user has perceived the five tastes. The control unit 23 calculates a score of the user's taste sensitivity on the basis of whether the answers are correct and the amount of difference from correct answers, FIG. 18 is a diagram illustrating an example of a taste mixture measurement test screen displayed on the display 14 of the communication terminal 1 according to the fourth modification of the first embodiment. FIG. 19 is an example of a table where the amount of taste ingredients contained in a test meal, answers input by the user for the tastes, and points for the tastes are associated with one another according to the fourth example of the first embodiment. FIG. 20 is an example of a table where the amount of a taste ingredient contained, points gained when an answer is correct, and points gained when an answer is incorrect are associated with one another according to the fourth example of the first embodiment.

Tablet E3, for example, contains taste ingredients corresponding to sweetness level 2, saltiness level 3, and sourness level 1. Tablet E3 does not contain taste ingredients corresponding to bitterness and umami. A bitterness level and an umami level, therefore, are 0 on the table of FIG. 19. The taste test according to the fourth modification of the first embodiment is conducted to measure taste sensitivity to different tastes simultaneously.

The display 14 of the communication terminal 1 displays the taste mixture measurement test screen illustrated in FIG. 18. The taste mixture measurement test screen includes a tablet ID of a tablet to be taken by the user and radio buttons for allowing the user to input answers as to whether the tablet contains taste ingredients corresponding to sweetness, saltiness, sourness, bitterness, and umami. The user takes the specified tablet and inputs answers as to whether the tablet contains the taste ingredients corresponding to sweetness, saltiness, sourness, bitterness, and umami. If the user feels that the tablet does not contain a sweet ingredient, the user touches a radio button corresponding to "NO". If the user feels that the tablet contains a sweet ingredient, the user touches a radio button corresponding to "YES", The user inputs an answer for each of the tastes.

In the taste mixture measurement test screen illustrated in FIG. 18, the user is asked to input answers as to whether tablet E3 contains the taste ingredients. The user takes tablet E3 and inputs, using the operation unit 15 of the communication terminal 1, answers as to presence of absence of the five tastes, that is, presence or absence of the five taste ingredients.

As illustrated in FIG. 20, the control unit 23 adds a score for each of the five taste modalities in accordance with whether the user's answer is correct on the basis of a corresponding taste level, that is, the amount of a corresponding taste ingredient contained.

If the tablet taken by the user does not contain a certain taste ingredient (if the taste level is 0) and the user correctly answers that the tablet does not contain the certain taste ingredient, for example, 0 is added to a score for a corresponding taste modality. If the user incorrectly answers that the tablet contains the certain taste ingredient, −2 is added to the score for the corresponding taste modality as a penalty.

Furthermore, if the tablet taken by the user contains a certain taste ingredient (if the taste level is 1 or higher) and the user correctly answers that the tablet contains the certain taste ingredient, more points (e.g., 4) are added as the taste level becomes lower and less points (e.g., 1) are added as the taste level becomes higher. If the tablet taken by the user contains a certain taste ingredient (the taste level is 1 or higher) and the user incorrectly answers that the tablet does not contain the certain taste ingredient, less negative points (e.g., −1) are added as the taste level becomes lower and more negative points (e.g., −4) are added as the taste level becomes higher. More accurate evaluation can thus be performed by changing points to be added for each of the taste modalities in accordance with whether the amount of a taste ingredient contained is large (a high taste level) or small (a low taste level).

In the example illustrated in FIG. 19, an answer input by the user for sweetness level 2 is incorrect, and −2 is added to a score for sweetness. An answer input by the user for saltiness level 3 is correct, and 2 is added to a score for saltiness. Similarly, 4, 0, and −2 are added to scores for sourness, bitterness, and umami, respectively. These scores are examples, and may be different values, instead.

In a taste sensitivity measurement test according to the fourth modification of the first embodiment, the user is asked to input an answer as to whether a test meal containing a certain amount or more (level 1 or higher) of at least one taste ingredient contains each of the five taste ingredients. The user's taste sensitivity to the five tastes can thus be quantitatively measured at the same time. The user's taste sensitivity, therefore, can be accurately measured by asking a certain number of taste questions (taste mixture measurement test).

In addition, since the number of test meals used in taste questions is small and the number of taste questions is small, not only cost but also a burden on the user is reduced. In the first embodiment, identification information (an ID and/or a two-dimensional code) given to a test meal kit is as illustrated in FIG. 2, but identification information (tablet IDs) given to test meals may be numbers, such as 1, 2, and 3, according to order of the test meals used in a measurement test. In the fourth modification of the first embodiment, too, as in the first embodiment, a person who conducts a measurement test recognizes types of taste ingredients contained in each test meal and the amount of the taste ingredients contained in the test meal with identification information (common ID) given to a test meal kit and identification information (individual ID) given to the test meal.

A measurement test relating to the sense of taste according to the fourth modification of the first embodiment of the present disclosure may be conducted in step S2, for example, illustrated in FIG. 4.

In step S2, at least one of the taste resolution measurement test according to the first embodiment, the taste detection threshold measurement test according to the first modification of the first embodiment, the taste perception threshold measurement test according to the second modification of the first embodiment, the taste strength measurement test according to the third modification of the first embodiment, and the taste mixture measurement test according to the fourth modification of the first embodiment may be performed.

Although the information management system according to the first embodiment includes the communication terminal 1 and the management server 2, the present disclosure is not particularly limited to this. The information management system may include only the communication terminal 1, and the communication terminal 1 may have the functions of the management server 2, instead. In this case, the communication terminal 1 performs steps S2 to S5 illustrated in FIG. 4.

Second Embodiment

An information management system according to a second embodiment provides a food search screen. The food search screen is provided with, as one of search filters, a search filter for filtering foods or restaurants on the basis of results of evaluation of the foods or the restaurants performed by taste high scorers.

The configuration of the information management system according to the second embodiment is the same as that of the information management system according to the first embodiment illustrated in FIG. 1. The configuration of the information management system according to the second embodiment, therefore, will be described with reference to FIG. 1.

The display 14 of the communication terminal 1 displays the food search screen. The food search screen is provided with, as one of search filters, a search filter for filtering foods or restaurants on the basis of results of evaluation of the foods or the restaurants performed by taste high scorers.

The operation unit 15 receives evaluation of a food or a restaurant performed by the user. The operation unit 15 also receives selection of one of the search filters performed by the user on the food search screen.

The communication unit 11 transmits evaluation information indicating evaluation of a food or a restaurant performed by the user to the management server 2. The communication unit 11 also transmits, to the management server 2, a command indicating that one of the search filter has been selected.

The communication unit 21 of the management server 2 obtains, from the communication terminal 1 over the network 3, first data indicating values input in a measurement test relating to the sense of taste of the user of the communication terminal 1. The measurement test relating to the sense of taste is conducted to measure the user's taste sensitivity to at least one of the taste modalities.

The measurement test relating to the sense of taste according to the second embodiment may be conducted in the same manner as that according to the first embodiment.

The communication unit 21 obtains, from the communication terminal 1, evaluation information indicating evaluation of a food or a restaurant performed by the user. Furthermore, the communication unit 21 obtains, from the communication terminal 1 over the network 3, a command indicating one of the search filters has been selected.

The control unit 23 may generate a score of the user's sense of taste on the basis of first data while associating the score with the user.

If the score of the user's sense of taste satisfies a certain condition for taste high scorers, evaluation information indicating evaluation of a food or a restaurant performed by the user is included in results of evaluation of foods or restaurants performed by taste high scorers. The taste high scorers include a certain percentage of highest scorers based on scores of the sense of taste, a certain number of highest scorers based on scores of the sense of taste, or persons whose scores of the sense of taste are higher than or equal to a certain value.

The control unit 23 selects, on the basis of a command obtained by the communication unit 21, at least one food or at least one restaurant found through filtering based on a search filter. The control unit 23 selects, on the basis of the command obtained by the communication unit 21, the at least one food found through the filtering based on the search filter and first restaurants that serve the at least one food or at least one second restaurant found through the filtering based on the search filter.

The communication unit 21 outputs information indicating the at least one selected food or the at least one selected restaurant to the communication terminal 1 over the network 3 in order to display the information on the display 14 of the communication terminal 1. The communication unit 21 outputs information indicating the at least one selected food and the first restaurants or the at least one second restaurant to the communication terminal 1 over the network 3 in order to display the information on the display 14 of the communication terminal 1.

Next, a process for evaluating the user's sense of taste according to the second embodiment of the present disclosure will be described.

Figure 21:
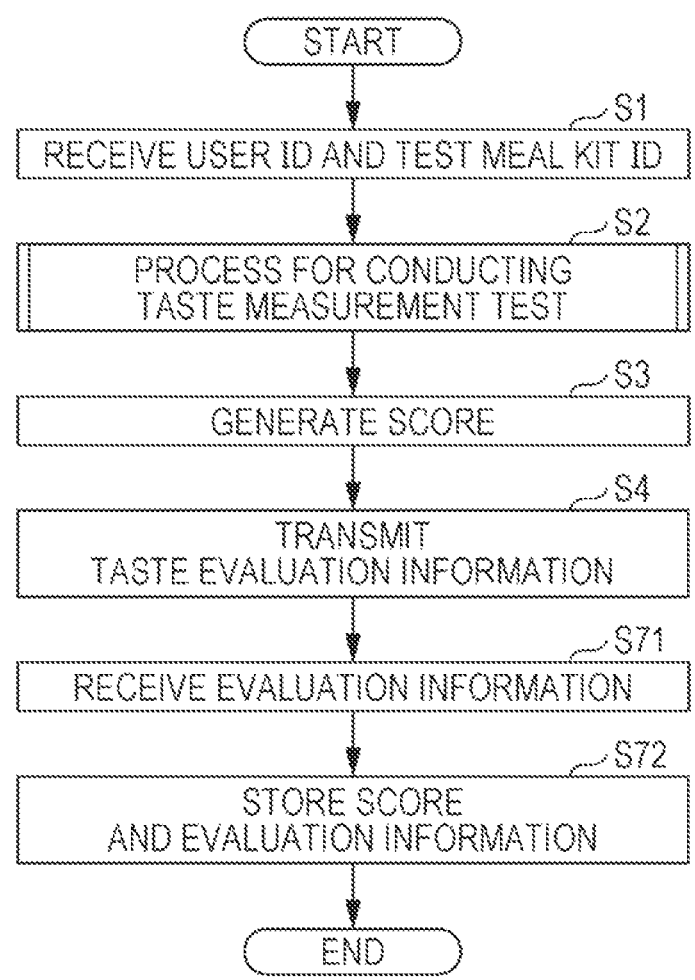
FIG. 21 is a flowchart illustrating a process for evaluating the user's sense of taste performed by the management server according to a second embodiment of the present disclosure.

FIG. 21 is a flowchart illustrating the process for evaluating the user's sense of taste performed by the management server 2 according to the second embodiment of the present disclosure.

In FIG. 21, the same steps as in the process for evaluating the user's sense of taste illustrated in FIG. 4 are given the same reference numerals, and description thereof is omitted.

In step S71, the communication unit 21 receives, from the communication terminal 1, evaluation information indicating evaluation of a food or a restaurant performed by the user. A food or a restaurant is evaluated, for example, on a five-point scale. The operation unit 15 of the communication terminal 1 receives the evaluation of a food or a restaurant performed by the user. The user gives a score of 5 to 1, for example, to a food or a restaurant. A score of 5 is a highest rating, and a score of 1 is a lowest rating. The communication unit 11 of the communication terminal 1 transmits the evaluation information to the management server 2.

Next, in step S72, the control unit 23 stores a score generated in step S3 and the evaluation information received in step S72 in the memory 22 while associating the score and the evaluation information with a user ID.

In the second embodiment, too, at least one of the measurement tests relating to the sense of taste described in the first embodiment may be conducted in step S2 illustrated in FIG. 21. A process for conducting a taste resolution measurement test according to the second embodiment is the same as that according to the first embodiment, and description thereof is omitted.

In the second embodiment, too, as in the first modification of the first embodiment, a taste detection threshold measurement test may also be conducted in addition to a taste resolution measurement test. In this case, the process for conducting a taste detection threshold measurement test in step S6 illustrated in FIG. 9 is performed after the process for conducting a taste resolution measurement test in step S2 illustrated in FIG. 21. A process for conducting a taste detection threshold measurement test according to the second embodiment is the same as that according to the first embodiment, and description thereof is omitted.

In the second embodiment, too, as in the second modification of the first embodiment, a taste perception threshold measurement test may also be conducted in addition to a taste resolution measurement test. In this case, the process for conducting a taste perception threshold measurement test in step S8 illustrated in FIG. 12 is performed after the process for conducting a taste resolution measurement test in step S2 illustrated in FIG. 21. A process for conducting a taste perception threshold measurement test according to the second embodiment is the same as that according to the second modification of the first embodiment, description thereof is omitted.

In the second embodiment, too, as in the third modification of the first embodiment, a taste strength measurement test may be conducted in addition to a taste resolution measurement test. In this case, the process for conducting a taste strength measurement test in step S10 illustrated in FIG. 15 is performed after the process for conducting a taste resolution measurement test in step S2 illustrated in FIG. 21. A process for conducting a taste strength measurement test is the same as that according to the third modification of the first embodiment, and description thereof is omitted.

Furthermore, in the second embodiment, too, at least one of the taste resolution measurement test according to the first embodiment, the taste detection threshold measurement test according to the first modification of the first embodiment, the taste perception threshold measurement test according to the second modification of the first embodiment, the taste strength measurement test according to the third modification of the first embodiment, and the taste mixture measurement test according to the fourth modification of the first embodiment may be conducted.

Furthermore, the second embodiment of the present disclosure can be implemented using a method different from the measurement tests relating to the sense of taste described in the present disclosure, insofar as step S2 illustrated in FIG. 21 is a measurement test relating to the sense of taste with which taste high scorers can be identified.

Next, a method for registering evaluation information input by the user will be described. The management server 2 may obtain evaluation information when the process for evaluating the user's sense of taste is performed or, if the process for evaluating the user's sense of taste has already been performed, simply obtain and register evaluation information.

Figure 22:
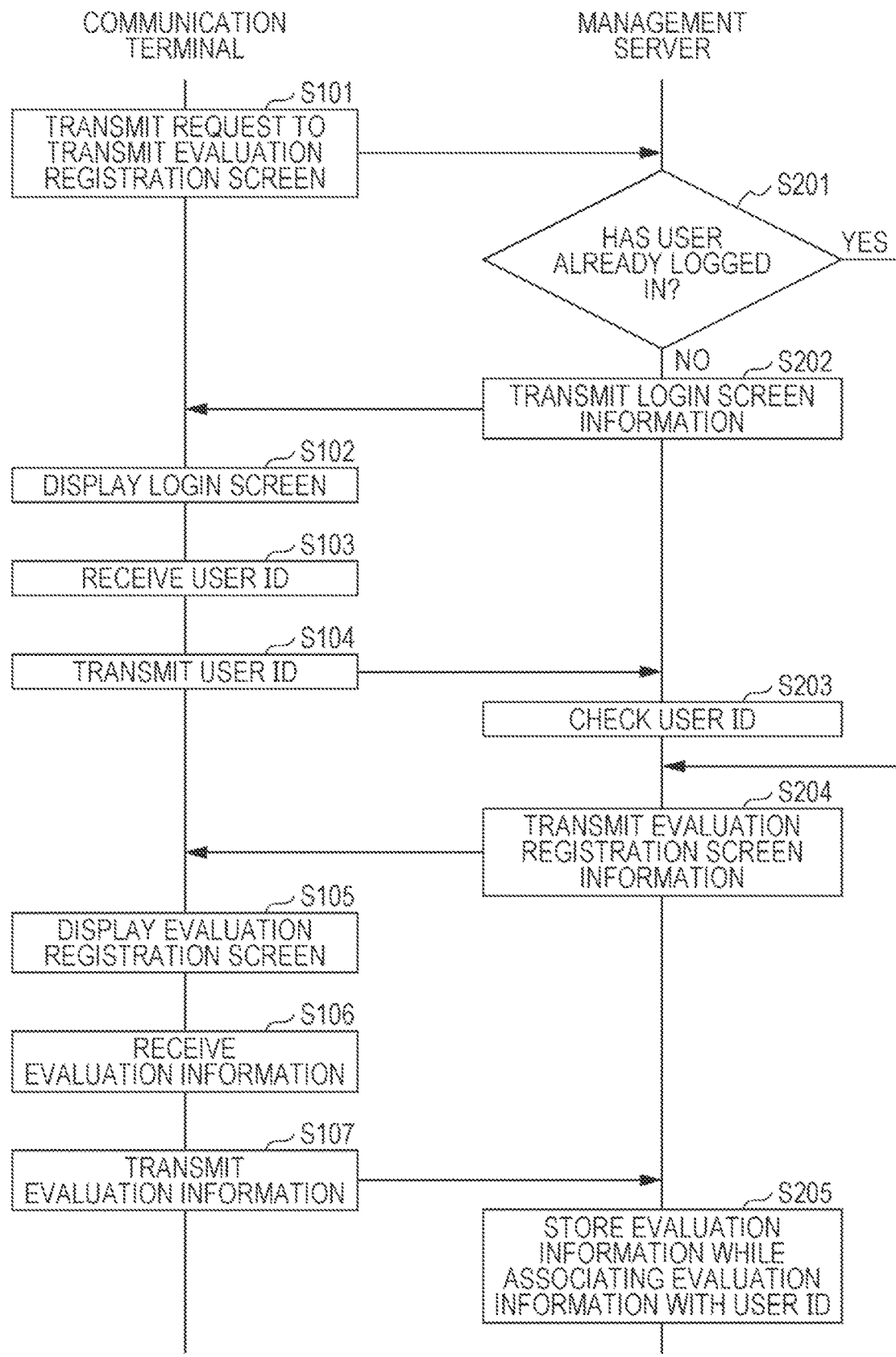
FIG. 22 is a sequence diagram illustrating an example of a method for registering evaluation information according to the second embodiment of the present disclosure.

FIG. 22 is a sequence diagram illustrating an example of the method for registering evaluation information according to the second embodiment of the present disclosure.

First, in step S101, the communication unit 11 of the communication terminal 1 transmits, to the management server 2, a request to transmit an evaluation registration screen for registering evaluation information. The communication unit 21 of the management server 2 receives the request from the communication terminal 1.

Next, in step S201, the control unit 23 determines whether the user of the communication terminal 1 has already logged in. If the control unit 23 determines that the user has already logged in (YES in step S201), the process proceeds to step S204.

If the control unit 23 determines that the user has not logged in (NO in step S201), the communication unit 21 transmits, in step S202 to the communication terminal 1, login screen information for allowing the user to log in. The communication unit 11 of the communication terminal 1 receives the login screen information.

Next, in step S102, the display 14 of the communication terminal 1 displays a login screen.

Next, in step S103, the operation unit 15 receives a user ID input on the login screen. The user inputs the user ID on the login screen. The operation unit 15 may also receive a password for authentication as well as the user ID.

Next, in step S104, the communication unit 11 transmits, to the management server 2, the user ID received by the operation unit 15. The communication unit 21 of the management server 2 receives the user ID transmitted from the communication terminal 1.

Next, in step S203, the control unit 23 checks whether the user ID received by the communication unit 21 matches a user ID registered in advance.

If the received user ID matches a user ID registered in advance, the communication unit 21 transmits, in step S204 to the communication terminal 1, evaluation registration screen information indicating an evaluation registration screen. The communication unit 11 of the communication terminal 1 receives the evaluation registration screen information transmitted from the management server 2.

If the received user ID does not match a user ID registered in advance, the communication unit 21 transmits, to the communication terminal 1, error screen information for notifying the user that the user ID is incorrect.

Next, in step S105, the display 14 displays the evaluation registration screen.

Next, in step S106, the operation unit 15 receives, on the evaluation registration screen, evaluation information indicating evaluation of a food or a restaurant performed by the user. The user inputs the evaluation information on the evaluation registration screen. The user gives a score to a restaurant or a food served by a restaurant.

Next, in step S107, the communication unit 11 transmits the input evaluation information to the management server 2. The communication unit 21 of the management server 2 receives the evaluation information transmitted from the communication terminal 1.

Next, in step S205, the control unit 23 stores the evaluation information received by the communication unit 21 in an evaluation database of the memory 22 while associating the evaluation information with the user ID. The memory 22 stores the evaluation database and the user information.

FIG. 23 is a diagram illustrating an example of the evaluation database.

The evaluation database stores names of restaurants, or names of restaurants and names of foods served by the restaurants, user IDs, and scores given to the restaurants or the foods while associating the names, the user IDs, and the scores with one another.

FIG. 24 is a diagram illustrating an example of the user information.

In the user information, user IDs, taste scores, taste characteristics, countries or areas where the users reside, and prefectures where the users reside are associated with one another. A taste score indicates a score of the user's taste sensitivity. Taste characteristics are a vector based on scores of taste sensitivity to the taste modalities, namely sweetness, sourness, saltiness, bitterness, and umami.

In order to filter restaurants or foods during a search on the basis of evaluation information input by taste high scorers, evaluation information regarding the restaurants or the foods and attribute information (taste scores) regarding evaluators need to be associated with each other. Alternatively, association between evaluation information and attribute information regarding evaluators need to be obtained during the search.

For this reason, when receiving evaluation information regarding a restaurant or a food is received, the management server 2 associates a user ID of an evaluator and the evaluation information with each other.

Furthermore, the management server 2 refers to attribute information (taste score) included in the user information on the basis of the user D. Using the evaluation database and the user information, the management server 2 can easily and flexibly determine whether to use a search filter or a condition to be used when searching for restaurants or foods. The management server 2 may use these two databases when searching for restaurants or foods.

Next, a process for searching for foods or restaurants according to the second embodiment will be described.

Figure 25:
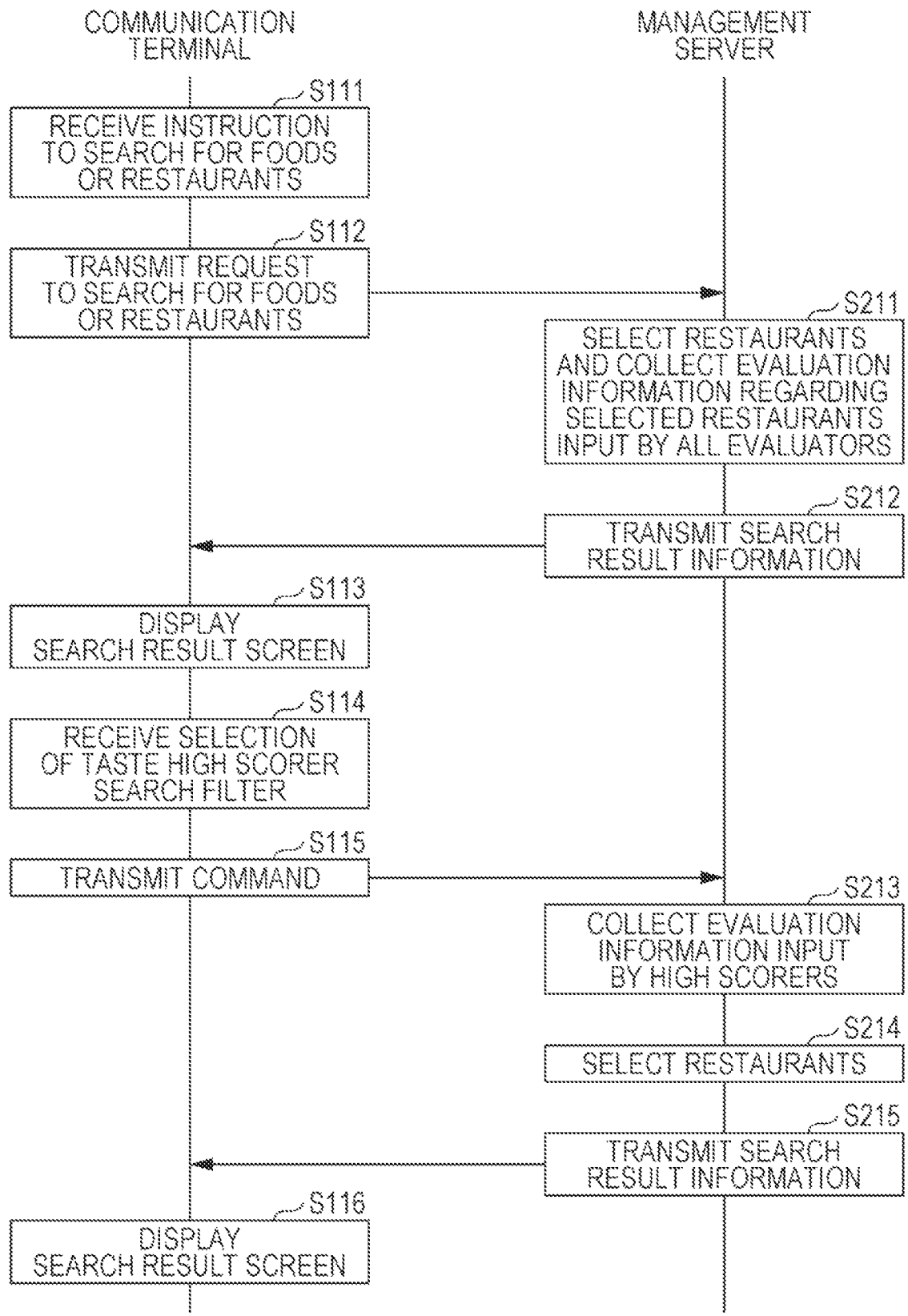
FIG. 25 is a sequence diagram illustrating an example of a process for searching for foods or restaurants according to the second embodiment of the present disclosure.

FIG. 25 is a sequence diagram illustrating an example of the process for searching for foods or restaurants according to the second embodiment of the present disclosure.

First, in step S111, the operation unit 15 of the communication terminal 1 receives an instruction to search for foods or restaurants from the user. For example, the user instructs, by sound or text, the operation unit 15 to search for restaurants that serve meat dishes or restaurants near a current position of the communication terminal 1.

Next, in step S112, the communication unit 11 transmits, to the management server 2, a request to search for foods or restaurants. The communication unit 21 of the management server 2 receives the request from the communication terminal 1. The request may include a search condition. The search condition is, for example, used to specify a type of food to be searched for, such as meat dishes, fish dishes, or Japanese food, or an area where restaurants are to be searched for, such as an area near the current position of the communication terminal 1 or a certain area.

Next, in step S211, the control unit 23 selects restaurants that satisfy the search condition and collects evaluation information regarding the selected restaurants input by all evaluators. The control unit 23 selects, in accordance with the search condition specified by the user, for example, restaurants within a radius of 1 km from the current position of the communication terminal 1. The control unit 23 also calculates averages of scores given by all the evaluators to the selected restaurants.

Next, in step S212, the communication unit 21 transmits, to the communication terminal 1, search result information including information regarding the selected restaurants and the collected evaluation information. The communication unit 11 of the communication terminal 1 receives the search result information transmitted from the management server 2.

Next, in step S113, the display 14 displays a search result screen indicating search results. The restaurants that satisfy the search condition specified by the user are displayed in the search result screen.

Steps S111 to S113 correspond to a conventional search process for displaying restaurants that satisfy a search condition specified by a user.

Next, in step S114, the operation unit 15 receives selection of, among search filters, a search filter (taste high scorer search filter) for narrowing search results down to foods or restaurants highly rated by persons who have gotten high taste scores, the selection being made by the user. The taste high scorer search filter is used to filter foods or restaurants on the basis of results of evaluation of the foods or the restaurants performed by taste high scorers. For example, the user selects the taste high scorer search filter by sound or text, or by using a graphical user interface (GUI) displayed on the display 14, which will be described later. The search filters may also include, for example, a search filter based on a type of food, a search filter based on averages of the amount of payment at restaurants, and a search filter based on opening hours, as well as the taste high scorer search filter.

Next, in step S115, the communication unit 11 transmits, to the management server 2, a command indicating that the taste high scorer search filter has been selected. The communication unit 21 of the management server 2 receives the command transmitted from the communication terminal 1.

Next, in step S213, the control unit 23 collects evaluation information input by the taste high scorers. The control unit 23 calculates an average of scores given by the taste high scorers to each of restaurants around the current position of the communication terminal 1.

Next, in step S214, the control unit 23 selects, among the restaurants around the current position of the communication terminal 1, foods and/or restaurants whose averages of scores given by the taste high scorers are higher than or equal to a certain value.

Next, in step S215, the communication unit 21 transmits, to the communication terminal 1, search result information including information regarding the selected foods and/or restaurants. The communication unit 11 of the communication terminal 1 receives the search result information transmitted from the management server 2.

Next, in step S116, the display 14 displays a search result screen (search screen) indicating results of filtering based on the taste high scorer search filter, Only foods and/or restaurants found through the filtering based on the taste high scorer search filter are displayed in the search result screen, That is, only foods and/or restaurants whose averages of scores given by the taste high scorers are higher than or equal to the certain value are displayed in the search result screen among the foods and/or the restaurants around the current position of the user.

Figure 26:
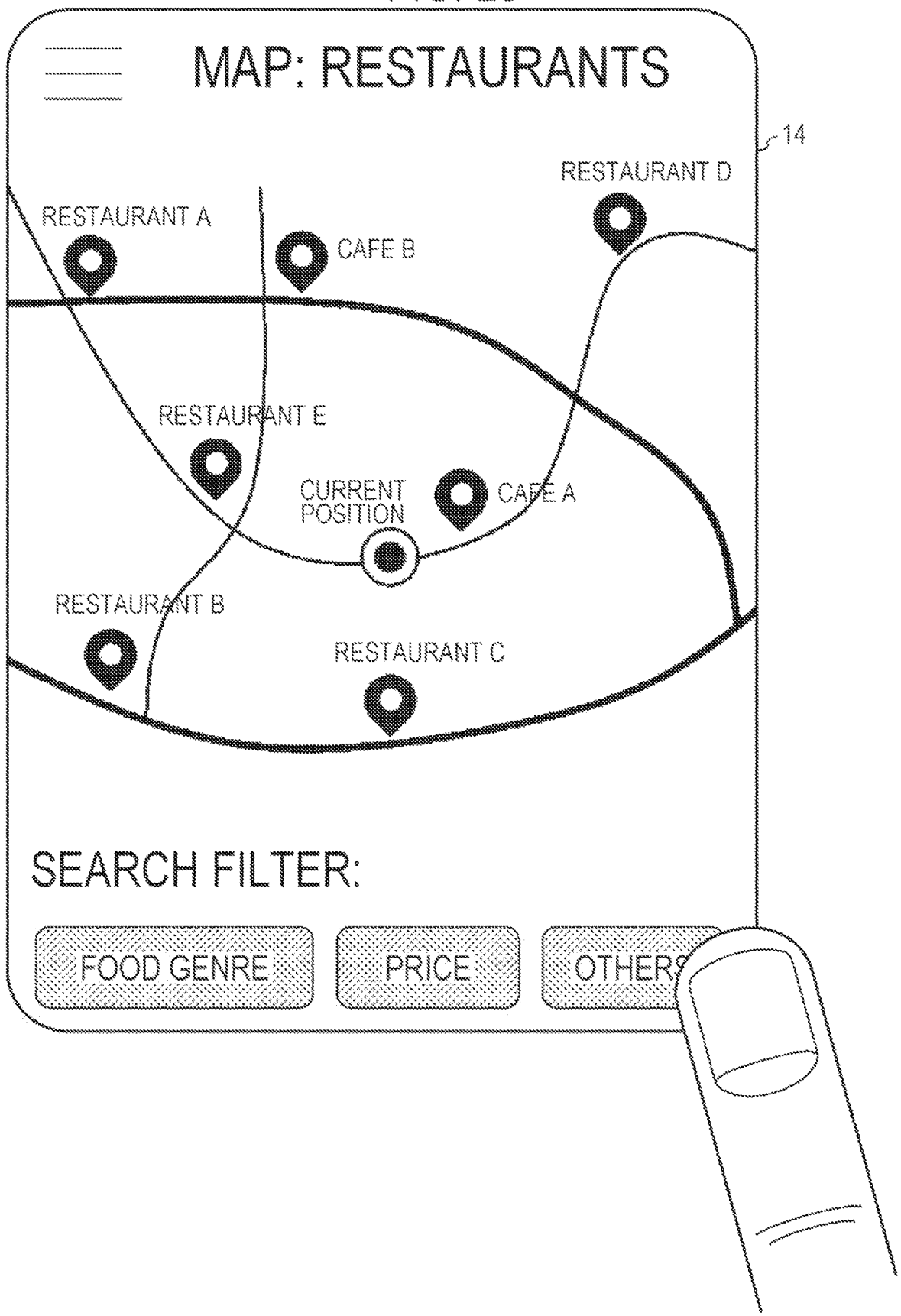
FIG. 26 is a diagram illustrating an example of a search result screen displayed on the display of the communication terminal according to the second embodiment.
Figure 27:
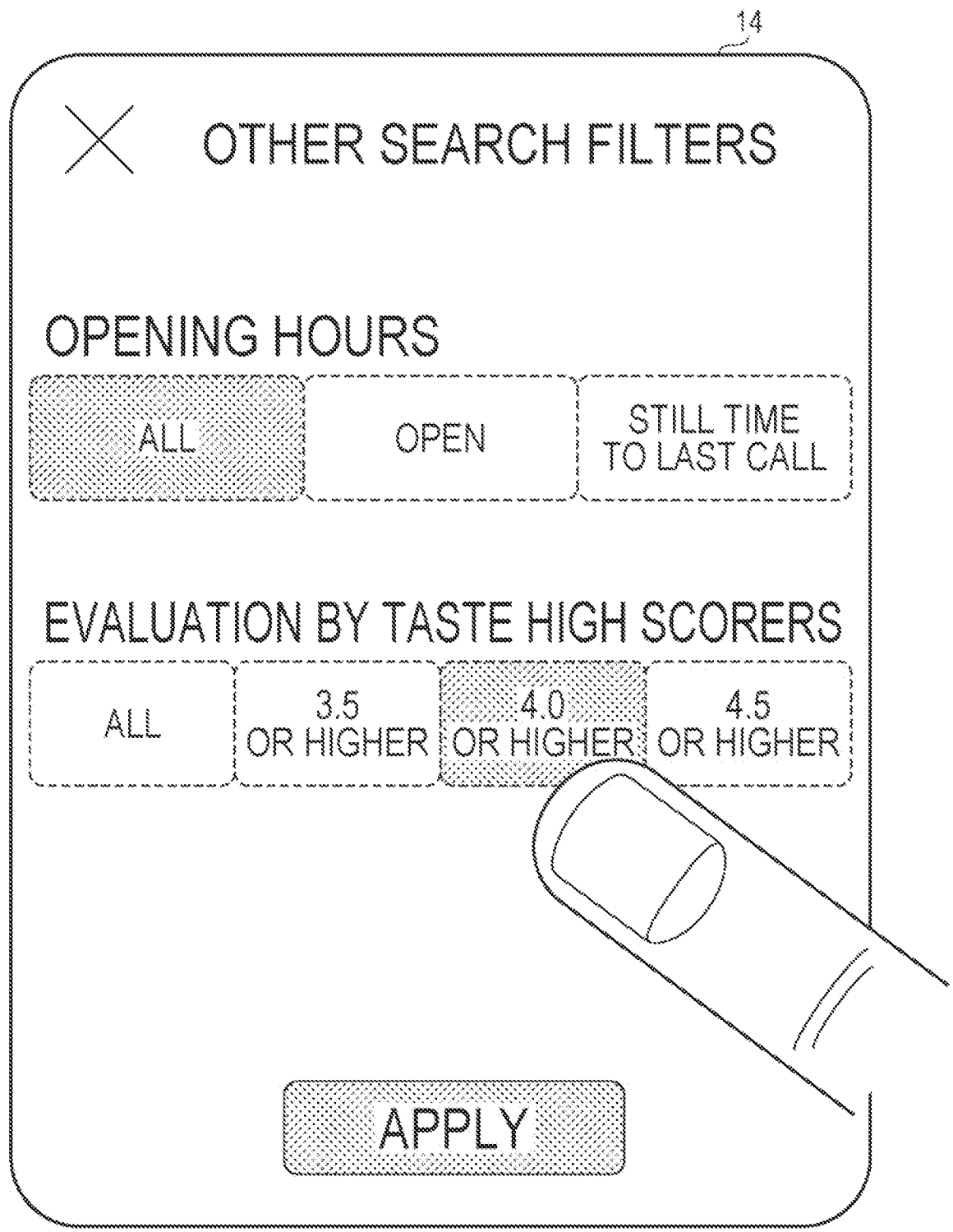
FIG. 27 is a diagram illustrating an example of a taste high scorer search filter displayed on the display of the communication terminal according to the second embodiment.

FIG. 26 is a diagram illustrating an example of the search result screen displayed on the display 14 of the communication terminal 1 according to the second embodiment. FIG. 27 is a diagram illustrating an example of the taste high scorer search filter displayed on the display 14 of the communication terminal 1 according to the second embodiment.

As illustrated in FIG. 26, the display 14 of the communication terminal 1 displays the search result screen. In the search result screen, restaurants within a radius of 1 km from the current position of the communication terminal 1 are displayed on a map. Buttons for selecting at least one of the search filters are displayed at a bottom of the search result screen. If the user touches a button "others", a search filter screen illustrated in FIG. 27 is displayed.

Other search filters that can be selected by the user are displayed in the search filter screen illustrated in FIG. 27. In the search filter screen illustrated in FIG. 27, the search filter for specifying opening hours and the taste high scorer search filter for filtering foods or restaurants on the basis of results of evaluation of the foods or the restaurants performed by taste high scorers are displayed.

When the management server 2 is to search for restaurants around the user on the map and the user has specified the taste high scorer search filter, for example, the management server 2 extracts only foods and/or restaurants highly rated by taste high scorers.

The taste high scorers include, among all examinees of a taste test, persons whose taste scores are included in a certain percentage of highest scores, persons whose taste scores are among a certain number of highest scores, or persons whose taste scores are higher than or equal to a certain value. For example, the certain percentage is 10%, the certain number is 100, and the certain value is 800. Alternatively, the management server 2 may select restaurants that satisfy one of four conditions, namely "all", "poorly rated", "average", and "highly rated", based on results of evaluation performed by the taste high scorers.

Alternatively, as illustrated in FIG. 27, the management server 2 may select restaurants on the basis of scores (averages of scores given by the taste high scorers) on a five-point scale. If the user selects "all", all restaurants evaluated by the taste high scorers are searched for. If the user selects "3.5 or higher", all restaurants whose averages of scores (on a five-point scale) given by the taste high scorers are higher than or equal to 3.5 are searched for. If the user selects "4.0 or higher", all restaurants whose averages of scores (on a five-point scale) given by the taste high scorers are higher than or equal to 4.0 are searched for. If the user selects "4.5 or higher", all restaurants whose averages of scores (on a five-point scale) given by the taste high scorers are higher than or equal to 4.5 are searched for. The user then presses an "apply" button to apply the taste high scorer search filter and display a search result screen that reflects the taste high scorer search filter.

Figure 28:
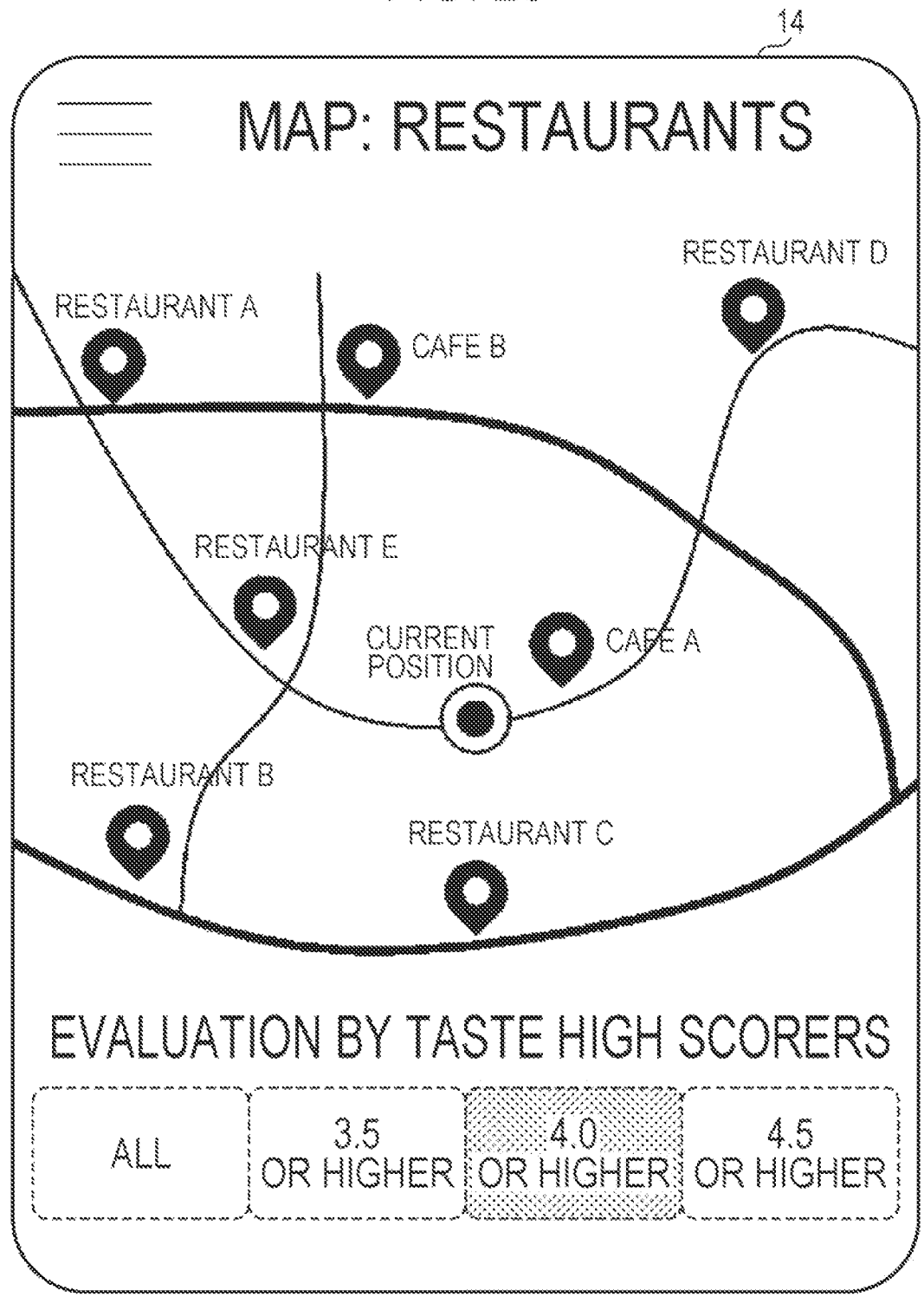
FIG. 28 is a diagram illustrating another example of the search result screen displayed on the display of the communication terminal according to the second embodiment.

FIG. 28 is a diagram illustrating another example of the search result screen displayed on the display 14 of the communication terminal 1.

Whereas the taste high scorer search filter is displayed in a screen different from the search result screen in FIG. 27, the taste high scorer search filter is superimposed upon the search result screen in FIG. 28.

When the number of restaurants to be searched for and displayed on a map is larger than a certain value, the restaurants may be narrowed down by performing filtering on the basis of scores given by the taste high scorers. When the number of restaurants to be searched for and displayed on a map is larger than the certain value, search conditions for the taste high scorer search filter may be displayed, as illustrated in FIG. 28, at a bottom of the search result screen as a search filter effective in further reducing the number of restaurants to be searched for, instead. The search conditions for the taste high scorer search filter may always be displayed in the search result screen, instead.

Figure 29:
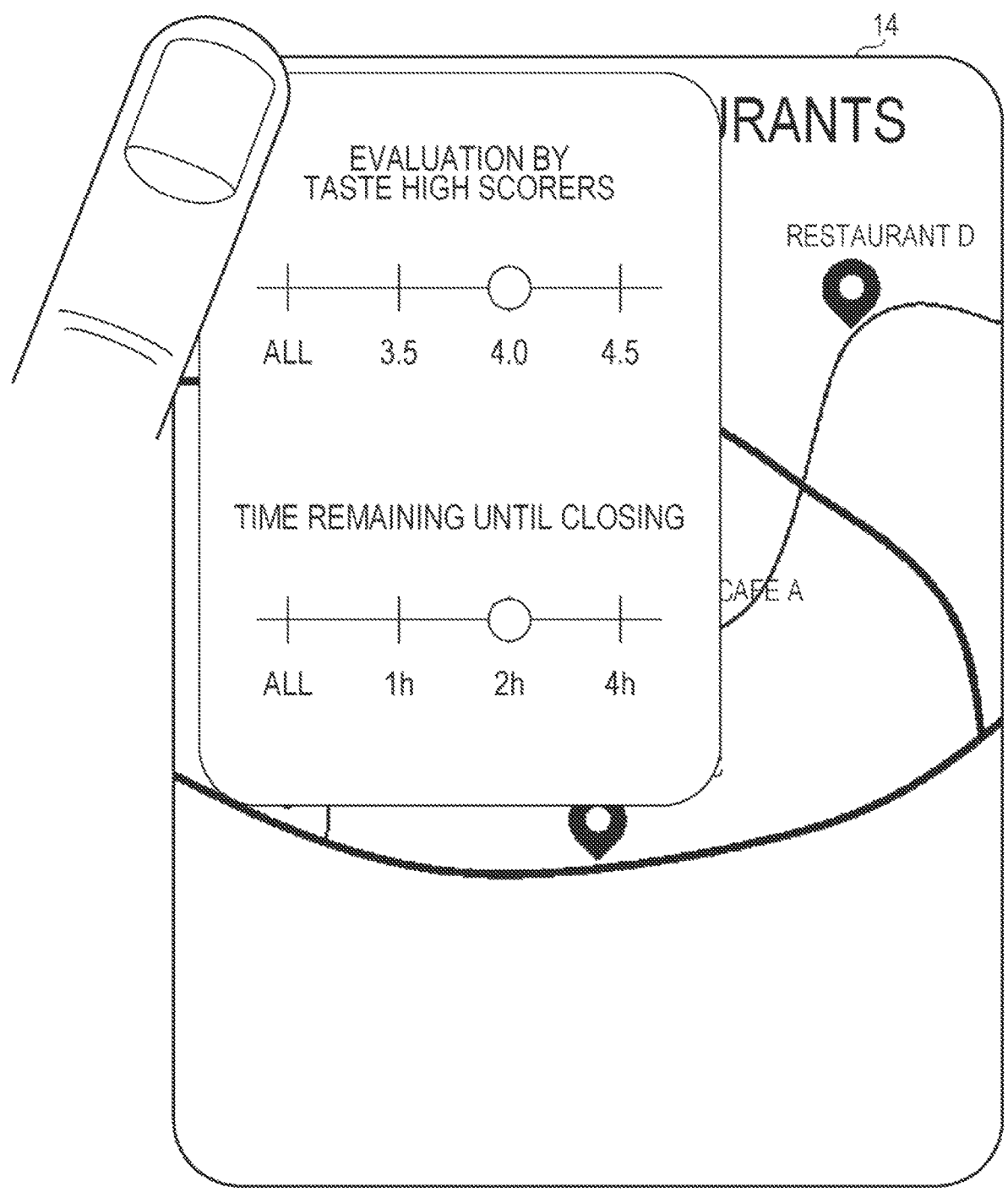
FIG. 29 is a diagram illustrating yet another example of the search result screen displayed on the display of the communication terminal according to the second embodiment.

FIG. 29 is a diagram illustrating yet another example of the search result screen displayed on the display 14 of the communication terminal 1.

For example, the display 14 may display a menu button (hamburger button) in an upper-left corner of the search result screen. When the user selects the menu button, an image for receiving a search condition for the taste high scorer search filter may be displayed.

As illustrated in FIG. 29, when the user touches the menu button, a menu image is superimposed upon the search result screen, and the search conditions for the taste high scorer search filter are displayed in the menu image.

Here, the user has selected a search condition for searching for restaurants whose averages of scores given by the taste high scorers are 4.0 or higher and that will not close in at least two hours from present time as restaurants to be displayed on the map.

Although a high scorer search filter with which the user can set a condition relating to evaluation of foods or restaurants performed by the taste high scorers is provided in the above description, the present disclosure is not particularly limited to this. For example, an ON/OFF button "restaurants popular among taste high scorers" may be provided as the taste high scorer search filter, instead.

According to the second embodiment, if a score obtained as a result of a measurement test relating to the user's sense of taste satisfies a certain condition for high scorers, evaluation information indicating evaluation of a food or a restaurant performed by the user is included in results of evaluation of foods or restaurants performed by the taste high scorers. A food search screen is provided with a search filter for filtering results of a search for foods or restaurants on the basis of results of evaluation of the foods or the restaurants performed by the taste high scorers. Foods or restaurants highly rated by the taste high scorers, therefore, can be clearly presented to the user as search results.

In addition, according to the second embodiment, foods or restaurants are filtered using a search filter on the basis of results of evaluation of the foods or the restaurants performed by the taste high scorers, and first restaurants that serve foods found through the filtering based on the search filter or second restaurants found through the filtering based on the search filter are displayed on the display 14 of the communication terminal 1. Foods or restaurants highly rated by the taste high scorers, therefore, can be presented to the user as search results.

Furthermore, the user logs in without inputting a score of the user's sense of taste when evaluating a food or a restaurant, and the score (the taste score illustrated in FIG. 24) of the user's sense of taste and the evaluation database (FIG. 23) are associated with each other using a user ID used during the login. As a result, evaluation information regarding a food or a restaurant can be registered and used while being associated with information regarding an evaluator's taste sensitivity without causing an extra burden upon the evaluator.

Furthermore, if a score of the user's sense of taste satisfies a certain condition for taste high scorers, evaluation information indicating evaluation of a food or a restaurant performed by the user is included in results of evaluation of foods or restaurants performed by taste high scorers. Foods or restaurants, therefore, can be filtered on the basis of results of evaluation performed by a user whose score of the sense of taste satisfies the certain condition for taste high scorers.

Third Embodiment

An information management system according to a third embodiment provides a food search screen. The food search screen is provided with, as one of search filters, a search filter for filtering foods or restaurants on the basis of results of evaluation of the foods or the restaurants performed by residents of a certain area.

The configuration of the information management system according to the third embodiment is the same as that of the information management system according to the first embodiment illustrated in FIG. 1. The configuration of the information management system according to the third embodiment, therefore, will be described with reference to FIG. 1.

The display 14 of the communication terminal 1 displays a food search screen. The food search screen is provided with, as one of search filters, a search filter for filtering foods or restaurants on the basis of results of evaluation of the foods or the restaurants performed by residents of a certain area.

The residents of the certain area are residents around the current position of the communication terminal 1. That is, the search filter is used to filter foods or restaurants on the basis of results of evaluation of the foods or the restaurants performed by the residents around the current position of the communication terminal 1. When the user of the communication terminal 1 is traveling, for example, the search filter is used to filter foods or restaurants on the basis of results of evaluation of the foods or the restaurants performed by local residents.

Another search filter is used to filter foods or restaurants on the basis of results of evaluation of the foods or the restaurants performed by certain evaluators.

The operation unit 15 receives evaluation of a food or a restaurant performed by the user. The operation unit 15 also receives selection of one of the search filters on the food search screen performed by the user.

The communication unit 11 transmits, to the management server 2, address information indicating an address of the user of the communication terminal 1. The address information may be stored in the memory 12 in advance or input by the user using the operation unit 15. The communication unit 11 also transmits, to the management server 2, evaluation information indicating evaluation of a food or a restaurant performed by the user. The communication unit 11 also transmits, to the management server 2, a command indicating that one of the search filter has been selected.

The communication unit 21 of the management server 2 obtains address information indicating the address of the user of the communication terminal 1 from the communication terminal 1 over the network 3. The communication unit 21 obtains, from the communication terminal 1 over the network 3, first data indicating values input in a measurement test relating to the sense of taste of the user of the communication terminal 1. The measurement test relating to the sense of taste is conducted to measure the user's taste sensitivity to at least one taste.

The measurement test relating to the sense of taste according to the third embodiment may be conducted in the same manner as described in the first embodiment.

The communication unit 21 obtains, from the communication terminal 1, evaluation information indicating evaluation of a food or a restaurant performed by the user. The communication unit 21 also obtains, from the communication terminal 1 over the network 3, a command indicating that one of the search filters has been selected.

The control unit 23 may generate a score of the user's sense of taste on the basis of first data while associating the score with the user. The control unit 23 may also identify the user's address on the basis of address information while associating the user's address with the user.

If an address indicated by address information is included in a certain area, evaluation information indicating evaluation of a food or a restaurant performed by the user is included in results of evaluation of foods or restaurants performed by residents of the certain area. If an address indicated by address information is included in a country or an area where the food or the restaurant exists, evaluation information indicating evaluation of the food or the restaurant performed by the user is included in results of evaluation of foods or restaurants performed by certain evaluators.

The control unit 23 selects, on the basis of the command obtained by the communication unit 11, at least one food or at least one restaurant found through filtering based on the search filter. The control unit 23 selects, on the basis of the command obtained by the communication unit 11, first restaurants that serve the at least one food found through the filtering based on the search filter or at least one second restaurant found through the filtering based on the search filter.

The communication unit 21 outputs information indicating the at least one selected food or the at least one selected restaurant to the display 14 of the communication terminal 1 over the network 3 in order to display the information on the display 14 of the communication terminal 1. The communication unit 21 outputs information indicating the at least one selected food and the first restaurants or the at least one selected second restaurant to the communication terminal 1 over the network 3 in order to display the information on the display 14 of the communication terminal 1.

Next, a process for evaluating the user's sense of taste according to the third embodiment of the present disclosure will be described.

Figure 30:
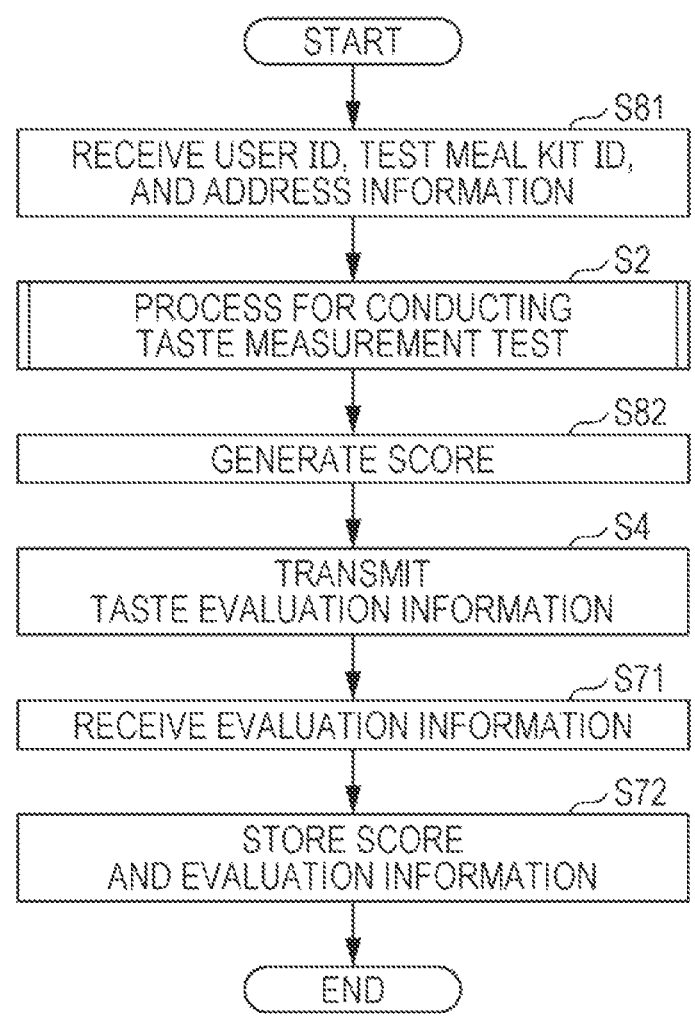
FIG. 30 is a flowchart illustrating a process for evaluating the user's sense of taste performed by the management server according to a third embodiment of the present disclosure.

FIG. 30 is a flowchart illustrating the process for evaluating the user's sense of taste performed by the management server 2 according to the third embodiment of the present disclosure.

In FIG. 30, the same steps as in the process for evaluating the users sense of taste illustrated in FIG. 4 or 21 are given the same reference numerals, and description thereof is omitted.

First, in step S81, the communication unit 21 receives a user ID, a test meal kit ID, and address information transmitted from the communication terminal 1. Here, the communication terminal 1 receives a test meal kit ID printed on a test meal kit, a user ID, and address information indicating the user's address input by the user. The communication terminal 1 displays an input screen provided by the management server 2 on a web browser and receives the user ID, the test meal kit ID, and the address information input on the input screen. The input screen is specified with a certain URL. The communication terminal 1 transmits the received user ID, test meal kit ID, and address information to the management server 2.

The communication terminal 1 may display the input screen provided by the management server 2 on the web browser by reading a two-dimensional code printed on the test meal kit, instead, and receive the user ID, the test meal kit ID, and the address information input on the input screen.

The memory 12 of the communication terminal 1 may store user information in which user IDs and address information are associated with each other. The operation unit 15 of the communication terminal 1 may receive the user ID and the test meal kit ID without receiving the address information, instead. The control unit 13 may read address information corresponding to the input user ID from the memory 12.

Next, in step S82, the control unit 23 generates a score of the user's sense of taste on the basis of first data while associating the score with the user.

In the third embodiment, too, at least one of the measurement tests relating to the sense of taste described in the first embodiment may be conducted in step S2 illustrated in FIG. 30. A process for conducting a taste resolution measurement test according to the third embodiment is the same as that according to the first embodiment, and description thereof is omitted.

In the third embodiment, too, as in the first modification of the first embodiment, a taste detection threshold measurement test may be conducted in addition to a taste resolution measurement test. In this case, the process for conducting a taste detection threshold measurement test in step S6 illustrated in FIG. 9 is performed after the process for conducting a taste resolution measurement test in step S2 illustrated in FIG. 30. A process for conducting a taste detection threshold measurement test according to the third embodiment is the same as that according to the first modification of the first embodiment, and description thereof is omitted.

In the third embodiment, too, as in the second modification of the first embodiment, a taste perception threshold measurement test may be conducted in addition to the taste resolution measurement test. In this case, the process for conducting a taste perception threshold measurement test in step S8 illustrated in FIG. 12 is performed after the process for conducting a taste resolution measurement test in step S2 illustrated in FIG. 30. A process for conducting a taste perception threshold measurement test according to the third embodiment is the same as that according to the second modification of the first embodiment, and description thereof is omitted.

In the third embodiment, too, as in the third modification of the first embodiment, a taste strength measurement test may be conducted in addition to a taste resolution measurement test. In this case, the process for conducting a taste strength measurement test in step S10 illustrated in FIG. 15 is performed after the process for conducting a taste resolution measurement test in step S2 illustrated in FIG. 30. A process for conducting a taste strength measurement test according to the third embodiment is the same as that according to the third modification of the first embodiment, and description thereof is omitted.

Furthermore, in the third embodiment, too, at least one of the taste resolution measurement test according to the first embodiment, the taste detection threshold measurement test according to the first modification of the first embodiment, the taste perception threshold measurement test according to the second modification of the first embodiment, the taste strength measurement test according to the third modification of the first embodiment, and the taste mixture measurement test according to the fourth modification of the first embodiment may be conducted.

Furthermore, the third embodiment of the present disclosure can be implemented using a method different from the measurement tests relating to the sense of taste described in the present disclosure, insofar as step S2 illustrated in FIG. 30 is a measurement test relating to the sense of taste with which residents around the current position of the communication terminal 1 can be identified.

Next, a process for searching for foods or restaurants according to the third embodiment will be described.

Figure 31:
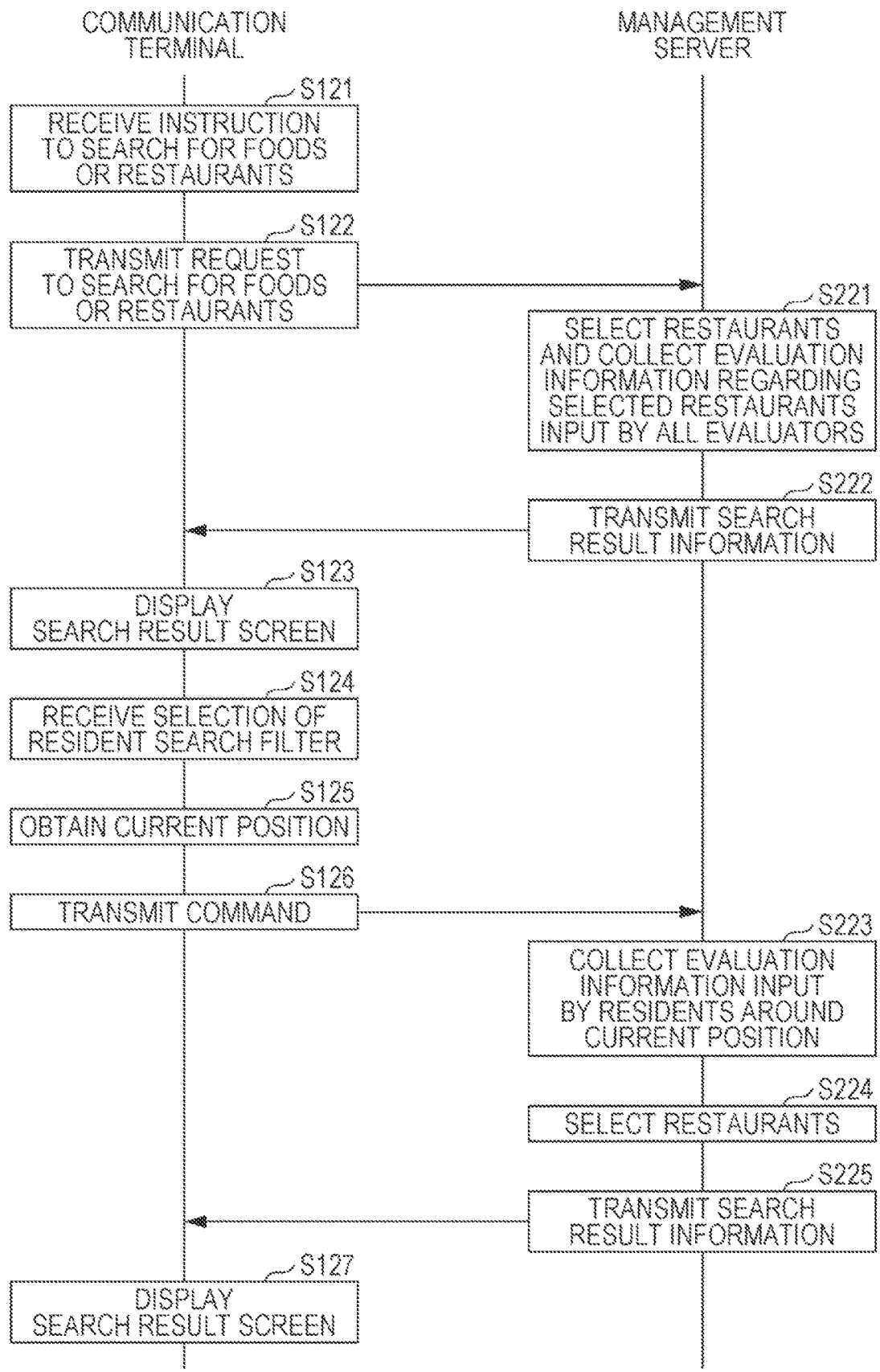
FIG. 31 is a sequence diagram illustrating an example of a process for searching for foods or restaurants according to the third embodiment of the present disclosure.

FIG. 31 is a sequence diagram illustrating an example of the process for searching for foods or restaurants according to the third embodiment of the present disclosure.

Steps S121 to S123 and steps S221 and 3222 illustrated in FIG. 31 are the same as steps S111 to S113 and steps S211 and S212 illustrated in FIG. 25, respectively, and description thereof is omitted.

Next, in step S124, the operation unit 15 receives selection of, among search filters, a resident search filter performed by the user. The resident search filter is used to filter foods or restaurants on the basis of results of evaluation of the foods or the restaurants performed by residents around the current position of the communication terminal 1. For example, the user selects the resident search filter by sound or text, or by using a graphical user interface (GUI) displayed on the display 14, which will be described later. The search filters may also include, for example, the search filter based on a type of food, the search filter based on averages of the amount of payment at restaurants, and the search filter based on opening hours, as well as the resident search filter.

Next, in step S125, a position measuring unit obtains the current position of the communication terminal 1. The communication terminal 1 includes the position measuring unit that measures the current position of the communication terminal 1. The position measuring unit is, for example, a global positioning system (GPS) device.

Next, in step S126, the communication unit 11 transmits, to the management server 2, a command indicating that the resident search filter has been selected. The command includes current position information indicating the current position of the communication terminal 1. The communication unit 21 of the management server 2 receives the command transmitted from the communication terminal 1.

Next, in step S223, the control unit 23 collects evaluation information input by residents around the current position of the communication terminal 1. The residents around the current position of the communication terminal 1 are, for example, persons residing within a radius of 10 km from the current position of the communication terminal 1 or in an area (e.g., a country, a prefecture, a city, a town, a village, etc.) including the current position of the communication terminal 1. The control unit 23 calculates an average of scores given by the residents around the current position of the communication terminal 1 to each of restaurants around the current position of the communication terminal 1.

Next, in step S224, the control unit 23 selects, among the restaurants around the current position of the communication terminal 1, foods and/or restaurants whose averages of scores given by the residents around the current position of the communication terminal 1 are higher than or equal to a certain value.

Next, in step S225, the communication unit 21 transmits, to the communication terminal 1, search result information including information regarding the selected foods and/or the selected restaurants. The communication unit 11 of the communication terminal 1 receives the search result information transmitted from the management server 2.

Next, in step S127, the display 14 displays a search result screen indicating results of the filtering based on the resident search filter. In the search result screen, only foods and/or restaurants found through the filtering based on the resident search filter are displayed. That is, among the foods and/or the restaurants around the current position of the user, only foods and/or restaurants whose averages of scores given by the residents around the current position of the user are higher than or equal to the certain value are displayed in the search result screen.

In the third embodiment, restaurants and foods highly rated by persons residing or living around the current position of the user are searched for. For example, areas where users reside or live are registered to the management server 2 in advance as user information with a granularity of countries, prefectures, cities, towns, or villages. The management server 2 manages address information regarding the users along with user IDs and evaluation information regarding restaurants or foods. For example, the resident search filter may be used to search for restaurants that serve foods highly rated by the residents around the current position of the communication terminal 1 or restaurants highly rated by the residents around the current position of the communication terminal 1.

Figure 32:
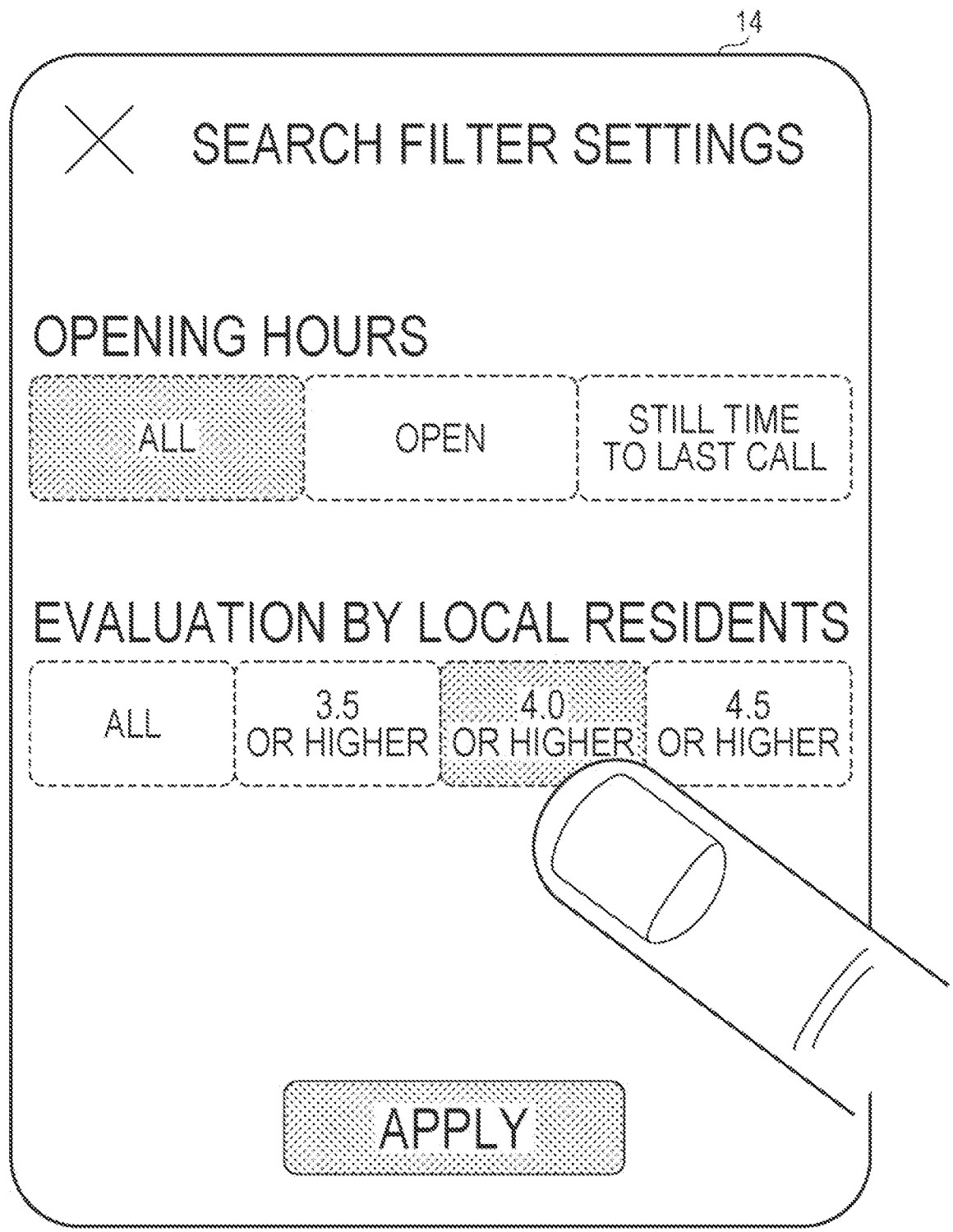
FIG. 32 is a diagram illustrating an example of a resident search filter displayed on the display of the communication terminal according to the third embodiment.

FIG. 32 is a diagram illustrating an example of the resident search filter displayed on the display 14 of the communication terminal 1 according to the third embodiment.

In the search filter screen illustrated in FIG. 32, other search filters that can be selected by the user are displayed. In the search filter screen illustrated in FIG. 32, the search filter for specifying opening hours and the resident search filter for filtering foods or restaurants on the basis of results of evaluation of the foods or the restaurants performed by residents (local residents) around the current position of the communication terminal 1.

If the user specifies the resident search filter when the management server 2 searches for restaurants near the user on a map, for example, the management server 2 extracts only foods and/or restaurants highly rated by residents around the current position of the communication terminal 1. The management server 2 may select restaurants that satisfy one of four conditions, namely "all"; "poorly rated", "average", and "highly rated", based on results of evaluation performed by the residents around the current position of the communication terminal 1.

Alternatively, as illustrated in FIG. 32, the management server 2 may select restaurants on the basis of scores (averages of scores given by the residents around the current position of the communication terminal 1) on a five-point scale. If the user selects "all", all restaurants evaluated by the residents around the current position of the communication terminal 1 are searched for. If the user selects "3.5 or higher", restaurants whose averages of scores (on a five-point scale) given by the residents around the current position of the communication terminal 1 are higher than or equal to 3.5 are searched for. If the user selects "4.0 or higher", restaurants whose averages of scores (on a five-point scale) given by the residents around the current position of the communication terminal 1 are higher than or equal to 4.0 are searched for. If the user selects "4.5 or higher", restaurants whose averages of scores (on a five-point scale) given by the residents around the current position of the communication terminal 1 are higher than or equal to 4.5 are searched for. The user then presses an "apply" button to apply the resident search filter and display a search result screen that reflects the resident search filter.

The resident search filter is effective when the user visits an unfamiliar area in a country where the user resides or a foreign country and desires to have a meal highly rated by local residents.

Although a resident search filter with which the user can set a condition relating to evaluation of foods or restaurants performed by residents around the current position of the communication terminal 1 is provided in the above description, the present disclosure is not particularly limited to this. For example, an ON/OFF button "restaurants popular among local residents" may be provided as the resident search filter, instead.

In addition, although the resident search filter according to the third embodiment is used to filter foods or restaurants on the basis of results of evaluation of the foods or the restaurants performed by residents around the current position of the communication terminal 1, the present disclosure is not particularly limited to this. The resident search filter may be used to filter foods or restaurants on the basis of results of evaluation of the foods or the restaurants performed by taste high scorers residing around the current position of the communication terminal 1, instead. That is, if an address indicated by address information is included in a certain area and a score of the user's sense of taste satisfies a certain condition for taste high scorers residing in the certain area, evaluation information indicating evaluation of a food or a restaurant performed by the user is included in results of evaluation of foods or restaurants performed by taste high scorers.

In this case, foods or restaurants evaluated by residents around the current position of the communication terminal 1 are not selected, but foods or restaurants evaluated by taste high scorers residing around the current position of the communication terminal 1 are selected. As a result, the management server 2 can find restaurants highly rated by persons whose taste sensitivity is high among residents around the current position of the communication terminal 1.

Alternatively, if an address indicated by address information is included in a certain area and taste characteristics indicated by a score of the user's sense of taste are similar to taste characteristics of residents of the certain area, evaluation information indicating evaluation of a food or a restaurant performed by the user may be included in results of evaluation of foods or restaurants performed by the residents of the certain area.

Alternatively, the resident search filter may be used to filter foods or restaurants on the basis of results of evaluation of the foods or the restaurants performed by other users who reside around the current position of the communication terminal 1 and whose taste characteristics are similar to those of the user. That is, foods or restaurants evaluated by residents around the current position of the communication terminal 1 are not selected, but foods or restaurants highly rated by other users who reside around the current position of the communication terminal 1 and whose taste characteristics are similar to those of the user are selected. As a result, the management server 2 can find restaurants highly rated by, among residents around the current position of the communication terminal 1, residents whose taste characteristics are similar to those of the user.

Next, a process for searching for foods or restaurants according to a first modification of the third embodiment will be described.

In the third embodiment, the resident search filter is used to filter foods or restaurants on the basis of results of evaluation of the foods or the restaurants performed by residents around the current position of the communication terminal 1, In the first modification of the third embodiment, on the other hand, the resident search filter is used to filter foods or restaurants on the basis of results of evaluation of the foods or the restaurants performed by residents of an area or a country where the user of the communication terminal 1 resides or lives. That is, in the first modification of the third embodiment, a certain area is an area where the user resides, a country where the user resides, or an area where the user lives.

Figure 33:
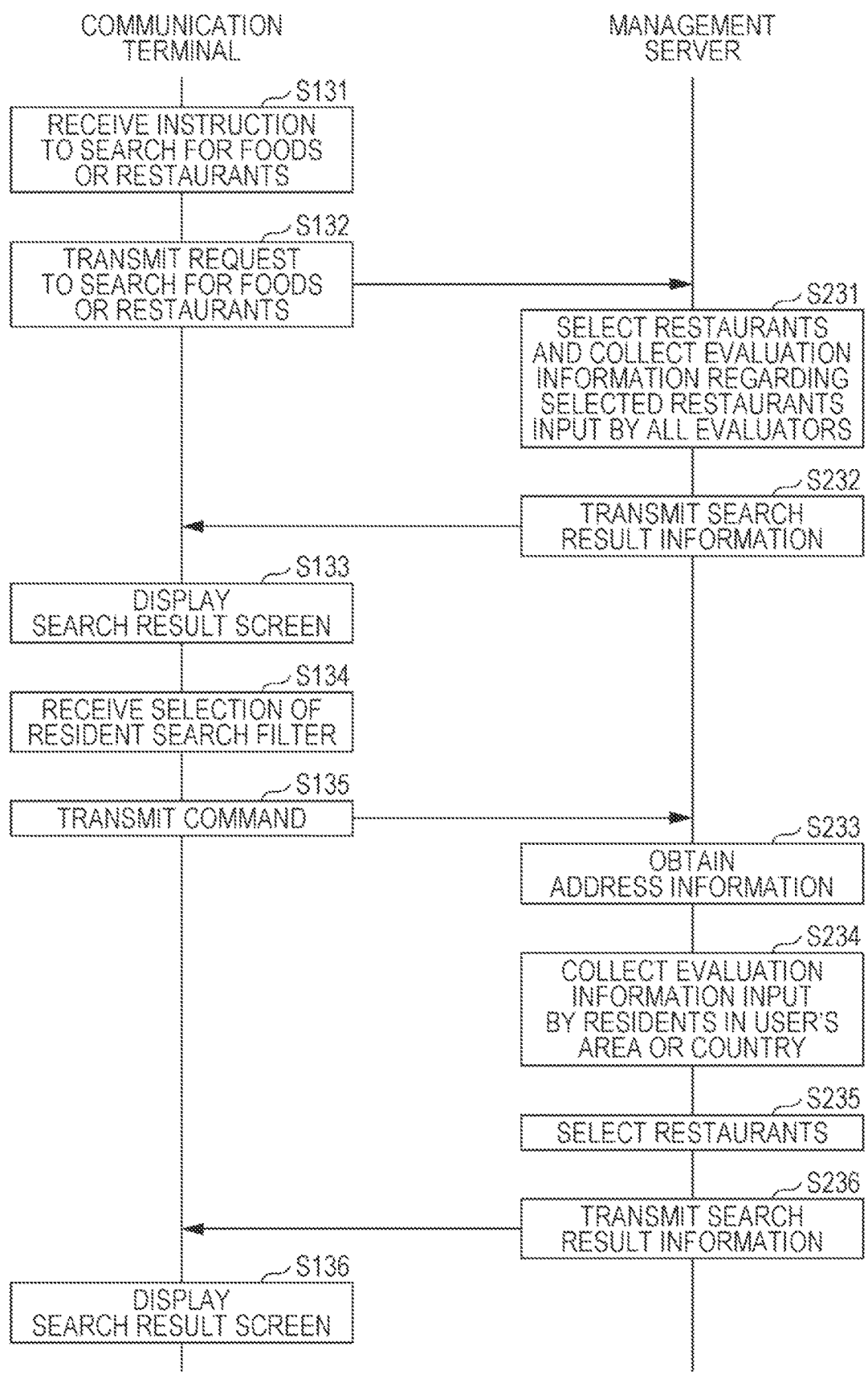
FIG. 33 is a sequence diagram illustrating an example of a process for searching foods or restaurants according to a first modification of the third embodiment of the present disclosure.

FIG. 33 is a sequence diagram illustrating an example of the process for searching foods or restaurants according to the first modification of the third embodiment of the present disclosure.

Steps S131 to S133 and steps S231 and 3232 illustrated in FIG. 33 are the same as steps S111 to S113 and steps S211 and 3212 illustrated in FIG. 25, respectively, and description thereof is omitted.

Next, in step S134, the operation unit 15 receives selection of, among search filters, the resident search filter performed by the user. The resident search filter is used to filter foods or restaurants on the basis of results of evaluation of the foods or the restaurants performed by residents in an area or a country where the user of the communication terminal 1 resides or lives. For example, the user selects the resident search filter by sound or text, or by using a GUI displayed on the display 14. The search filters may also include, for example, the search filter based on a type of food, the search filter based on averages of the amount of payment at restaurants, and the search filter based on opening hours, as well as the resident search filter.

Next, in step S135, the communication unit 11 transmits, to the management server 2, a command indicating that the resident search filter has been selected. The command includes the user ID of the user of the communication terminal 1. The communication unit 21 of the management server 2 receives the command transmitted from the communication terminal 1.

Next, in step S233, the control unit 23 obtains address information regarding the user of the communication terminal 1. The memory 22 stores user information in which user IDs and address information regarding users are associated with each other. The control unit 23 reads, from the memory 22, address information corresponding to the user ID included in the command.

Next, in step S234, the control unit 23 collects evaluation information input by the residents of the area or the country where the user of the communication terminal 1 resides or lives. The residents of the area where the user resides or lives are, for example, persons residing within a radius of 10 km from the user's address or in an area (e.g., a country, a prefecture, a city, a town, a village, etc.) including the user's address. The control unit 23 calculates an average of scores given by the residents of the area or the country where the user resides or lives to each of restaurants around the current position of the communication terminal 1.

Next, in step S235, the control unit 23 selects, among foods and/or restaurants that are search targets, foods and/or restaurants whose averages of scores given by the residents of the area or the country where the user resides or lives are higher than or equal to a certain value. The foods and/or the restaurants that are search targets may be, for example, foods served by restaurants included in a map displayed on the display 14 of the communication terminal 1 and/or the restaurants. Alternatively, the foods and/or the restaurants that are search targets may be foods of a type (e.g., Japanese food) specified by the user and/or restaurants that serve the foods.

Next, in step S236, the communication unit 21 transmits, to the communication terminal 1, search result information including information regarding the selected foods and/or the selected restaurants. The communication unit 11 of the communication terminal 1 receives the search result information transmitted from the management server 2.

Next, in step S136, the display 14 displays a search result screen indicating a result of the filtering based on the resident search filter. In the search result screen, only foods and/or restaurants found through the filtering based on the resident search filter are displayed. That is, among the foods and/or restaurants that are search targets, only foods and/or restaurants whose averages of scores given by the residents of the area or the country where the user resides or lives are higher than or equal to the certain value are displayed in the search result screen.

Due to differences in food culture, foods in a certain country or area might not taste good to people from another country or area. In the first modification of the third embodiment, even when the user visits a country or an area whose food culture is different from that of a country or an area where the user resides or lives, restaurants or foods highly rated by persons residing in the country or the area where the user resides or lives are searched for. This search filter is used, for example, when a Japanese user visits a foreign country and desires to find restaurants or foods around a current position of the user highly rated by Japanese people.

Figure 34:
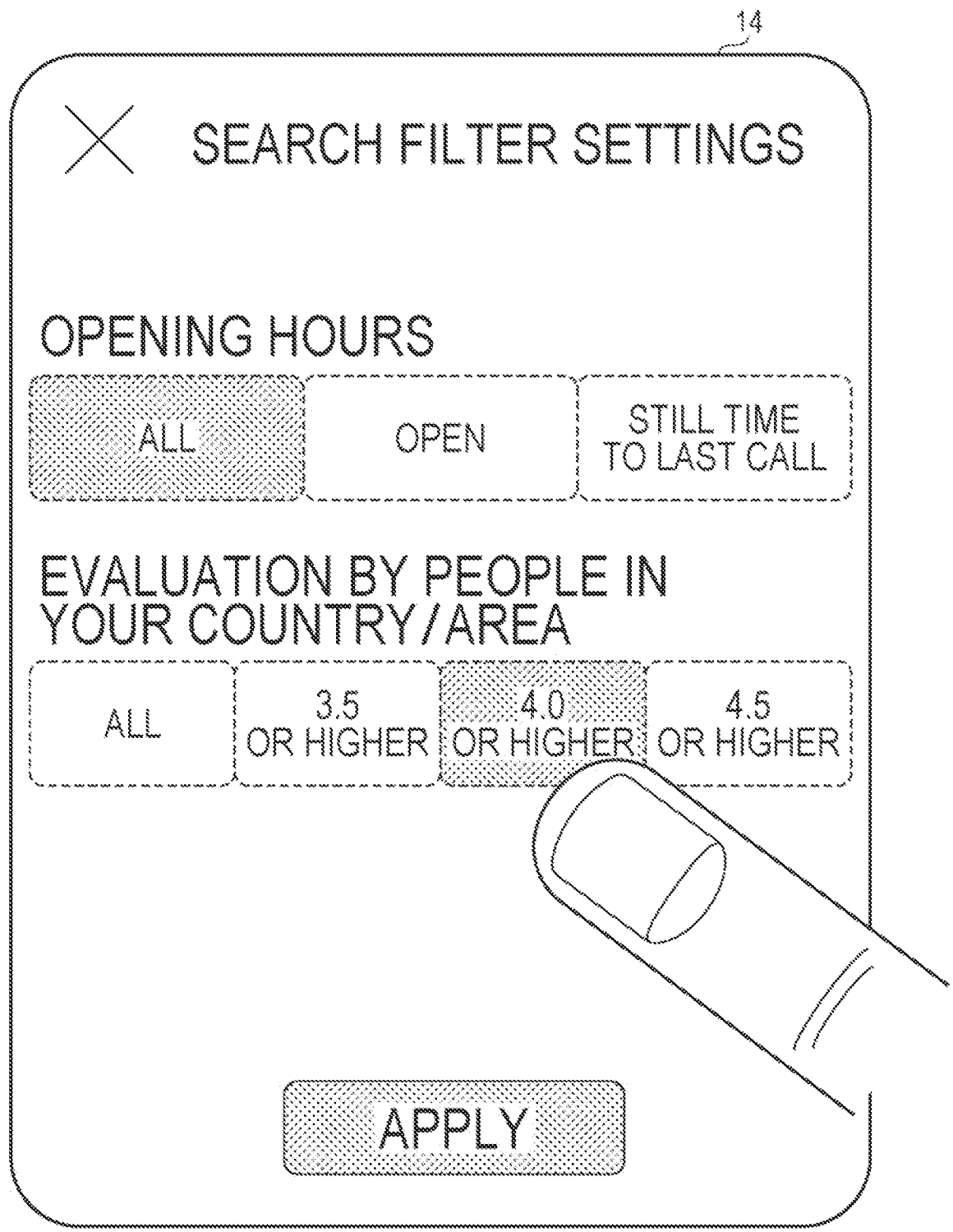
FIG. 34 is a diagram illustrating an example of a resident search filter displayed on the display of the communication terminal according to the first modification of the third embodiment.

FIG. 34 is a diagram illustrating an example of the resident search filter displayed on the display 14 of the communication terminal 1 according to the first modification of the third embodiment.

In a search filter screen illustrated in FIG. 34, search filters that can be selected by the user are displayed. In the search filter screen illustrated in FIG. 34, the search filter for specifying opening hours and the resident search filter used to filter foods or restaurants on the basis of results of evaluation of the foods or the restaurants performed by residents of an area or a country where the user resides or lives are displayed.

If the user specifies the resident search filter when the management server 2 searches for restaurants near the user on a map, for example, the management server 2 extracts only restaurants highly rated by the residents of the area or the country where the user resides or lives. Alternatively, the management server 2 may select foods and/or restaurants that satisfy one of four conditions, namely "all", "poorly rated", "average", and "highly rated", based on results of evaluation performed by the residents of the area or the country where the user resides or lives.

Alternatively, as illustrated in FIG. 34, the management server 2 may select foods and/or restaurants on the basis of scores (averages of scores given by the residents of the area or the country where the user resides or lives) on a five-point scale. If the user selects "all", all restaurants evaluated by the residents of the area or the country where the user resides or lives are searched for. If the user selects "3.5 or higher", restaurants whose averages of scores (on a five-point scale) given by the residents of the area or the country where the user resides or lives are higher than or equal to 3.5 are searched for. If the user selects "4.0 or higher", restaurants whose averages of scores (on a five-point scale) given by the residents of the area or the country where the user resides or lives are higher than or equal to 4.0 are searched for. If the user selects "4.5 or higher", restaurants whose averages of scores (on a five-point scale) given by the residents of the area or the country where the user resides or lives are higher than or equal to 4.5 are searched for. The user then presses an "apply" button to apply the resident search filter and display a search result screen that reflects the resident search filter.

The resident search filter is effective when the user visits an unfamiliar area in a country where the user resides or a foreign country and desires to have a meal highly rated by the residents of the area or the country where the user resides or lives.

Although a resident search filter with which a condition relating to evaluation of foods or restaurants performed by the residents of the country or the area where the user resides or lives is provided in the above description, the present disclosure is not particularly limited to this. For example, an ON/OFF button "restaurants popular among Japanese" may be provided as the resident search filter, instead.

Figure 35:
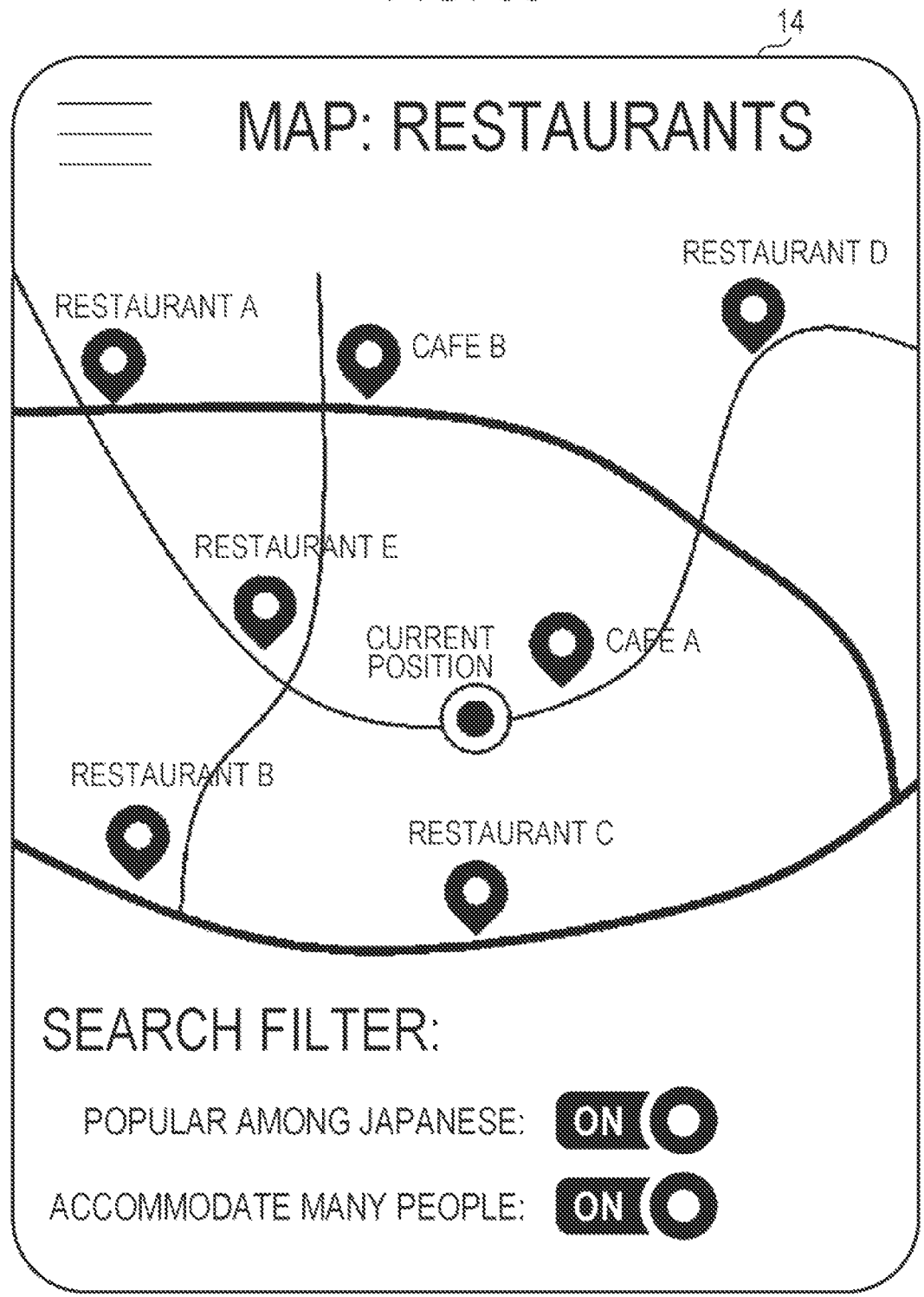
FIG. 35 is a diagram illustrating another example of a search result screen displayed on the display of the communication terminal according to the first modification of the third embodiment.

FIG. 35 is a diagram illustrating another example of the search result screen displayed on the display 14 of the communication terminal 1 according to the first modification of the third embodiment.

Although the resident search filter is displayed in a screen different from the search result screen in FIG. 34, the resident search filter illustrated in FIG. 35 is superimposed upon the search result screen.

As illustrated in FIG. 35, the display 14 may display a radio button for determining whether to apply the resident search filter at a bottom of the search result screen. If the user selects a radio button "Popular among Japanese", only foods and/or restaurants highly rated by Japanese people around the current position of the communication terminal 1 are displayed.

Although the resident search filter according to the first modification of the third embodiment is used to filter foods or restaurants on the basis of results of evaluation of the foods or the restaurants performed by the residents of the area or the country where the user of the communication terminal 1 resides or lives, the present disclosure is not particularly limited. The resident search filter may be used to filter foods or restaurants on the basis of results of evaluation of the foods or the restaurants performed by taste high scorers who reside in the area or the country where the user resides or lives, That is, if an address indicated by address information is included in a certain area and a score of the user's sense of taste satisfies a certain condition for taste high scorers who reside in the certain area, evaluation information indicating evaluation of a food or a restaurant performed by the user is included in results of evaluation of foods or restaurants performed by the taste high scorers.

In this case, foods or restaurants highly rated by the residents of the area or the country where the user of the communication terminal 1 resides or lives are not selected, but foods or restaurants highly rated by the taste high scorers who reside in the area or the country where the user of the communication terminal 1 resides or lives are selected. As a result, the management server 2 can find restaurants highly rated by persons whose taste sensitivity is high among the residents of the area or the country where the user resides or lives.

Alternatively, the resident search filter may be used to filter foods or restaurants on the basis of results of evaluation of the foods or the restaurants performed by other users who reside in the area or the country where the user of the communication terminal 1 resides or lives and whose taste characteristics are similar to those of the user. That is, foods or restaurants evaluated by the residents of the area or the country where the user of the communication terminal 1 resides or lives are not selected, but foods or restaurants highly rated by other users who reside in the area or the country where the user of the communication terminal 1 resides or lives and whose taste characteristics are similar to those of the user are selected. As a result, the management server 2 can find restaurants highly rated by, among the residents of the area or the country where the user resides or lives, residents whose taste characteristics are similar to those of the user.

Next, a process for searching for foods or restaurants according to a second modification of the third embodiment will be described.

In the third embodiment, the resident search filter is not automatically displayed while the user stays inside the area or the country (e.g., Japan) where the user resides. In the second modification of the third embodiment, on the other hand, when the user visits an area or a country different from the area or the country where the user resides, the resident search filter is automatically displayed or becomes selectable.

Figure 36:
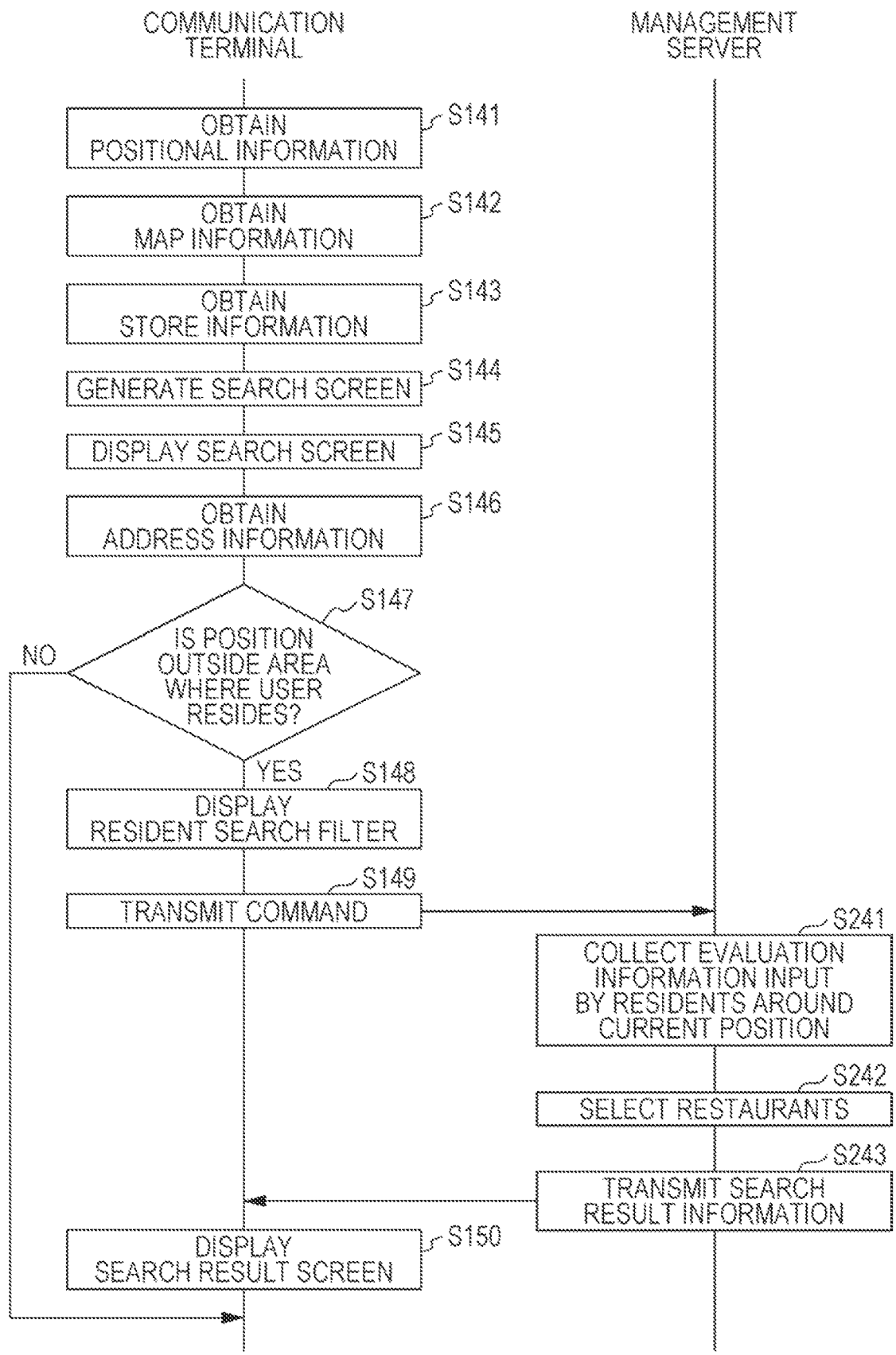
FIG. 36 is a sequence diagram illustrating an example of a process for searching for foods or restaurants according to a second modification of the third embodiment of the present disclosure.

FIG. 36 is a sequence diagram illustrating an example of the process for searching for foods or restaurants according to the second modification of the third embodiment of the present disclosure.

First, in step S141, the control unit 13 of the communication terminal 1 obtains positional information indicating a position of the communication terminal 1. The control unit 13 obtains the positional information from the position measuring unit (not illustrated) that measures the current position of the communication terminal 1.

Next, in step S142, the communication unit 11 obtains map information including the position of the communication terminal 1 from the management server 2 or a map server (not illustrated) connected over the network 3, or the control unit 13 obtains the map information from the memory 12 of the communication terminal 1. When obtaining map information including the position of the communication terminal 1 from the management server 2, the communication unit 11 requests the map information from the management server 2. In response to the request from the communication terminal 1, the management server 2 transmits the map information including the position of the communication terminal 1 to the communication terminal 1. Similarly, when obtaining map information including the position of the communication terminal 1 from the map server, the communication unit 11 requests the map information from the map server. In response to the request from the communication terminal 1, the map server transmits the map information including the position of the communication terminal 1 to the communication terminal 1. Similarly, when obtaining map information including the position of the communication terminal 1 from the memory 12, the control unit 13 reads the map information including the position of the communication terminal 1 from the memory 12 using the positional information including the position of the communication terminal 1.

Next, in step S143, the communication unit 11 obtains store information indicating restaurants to be displayed on the map information. The communication unit 11 requests, from the management server 2, the store information indicating restaurants to be displayed on the map information. In response to the request from the communication terminal 1, the management server 2 transmits, to the communication terminal 1, the store information indicating restaurants to be displayed on the map information.

Next, in step S144, the control unit 13 generates a search screen showing the restaurants indicated by the store information on a map indicated by the map information on the basis of the map information and the store information. The search screen is provided with, as one of search filters, a search filter for filtering foods or restaurants on the basis of results of evaluation of the foods or the restaurants performed by residents of an area including the position indicated by the map information.

Next, in step S145, the control unit 13 displays the generated search screen on the display 14.

Next, in step S146, the control unit 13 obtains address information indicating an area where the user of the communication terminal 1 resides. The address information is stored in the memory 12 in advance. The address information may be input by the user using the operation unit 15, instead.

Steps S141 to 3146 need not necessarily be performed in the above order.

Next, in step S147, the control unit 13 determines whether the position indicated by the positional information is outside the area where the user resides.

If determining that the position is outside the area where the user resides (YES in step S147), the control unit 13 displays, in step S148, the resident search filter (a search filter) on the display 14. The control unit 13 determines that the position indicated by the positional information is outside the area where the user of the communication terminal 1 resides if the position indicated by the positional information is not in a country where the user resides.

Steps S149 and S150 and steps S241 to S243 are the same as steps S126 and 3127 and steps S223 to S225 illustrated in FIG. 31, respectively, and description thereof is omitted.

If determining that the position is not outside the area where the user resides, that is, if determining that the position is inside the area where the user resides (NO in step S147), on the other hand, the control unit 13 does not display the resident search filter (a search filter) on the display 14.

Although the communication terminal 1 performs steps S141 to 3148 in the second modification of the third embodiment, the present disclosure is not particular limited to this. The management server 2 may perform step S141 to S148, instead. In this case, the control unit 23 of the management server 2 obtains positional information from the communication terminal 1 and map information and store information from the memory 22 and generates a search screen. The control unit 23 transmits the generated search screen to the communication terminal 1 to display the search screen on the display 14 of the communication terminal 1. The control unit 23 also obtains address information from the communication terminal 1 and determines whether the position indicated by the positional information is outside the area where the user resides. If determining that the position is outside the area where the user resides, the control unit 23 transmits an image of the resident search filter (a search filter) to the communication terminal 1 to display the resident search filter on the display 14 of the communication terminal 1. If determining that the position is not outside the area where the user resides, that is, if determining that the position is inside the area where the user resides, on the other hand, the control unit 23 does not display the resident search filter (a search filter) on the display 14 of the communication terminal 1.

In the first modification of the third embodiment, too, as in the second modification of the third embodiment, the control unit 13 may automatically display the resident search filter (a search filter) when the position of the communication terminal 1 is outside the area where the user resides.

According to the third embodiment, when an address indicated by address information is included in a certain area, evaluation information indicating evaluation of a food or a restaurant performed by the user is included in results of evaluation of the food or the restaurant performed by residents of the certain area, A food search screen is provided with, as one of search filters, a search filter for filtering foods or restaurants on the basis of results of evaluation of the foods or the restaurants performed by the residents of the certain area. As a result, foods or restaurants highly rated by the residents of the certain area can be presented to the user as search results.

In addition, foods or restaurants are filtered using the search filter on the basis of the results of the evaluation of the foods or the restaurants performed by the residents of the certain area, and first restaurants that serve foods found through the filtering based on the search filter or second restaurants found through the filtering based on the search filter are displayed on the display 14 of the communication terminal 1. Foods or restaurants highly rated by the residents of the certain area, therefore, can be presented to the user as search results.

When the user's address is included in the certain area, evaluation information indicating evaluation of a food or a restaurant performed by the user is included in the results of the evaluation of the foods or the restaurants performed by the residents of the certain area. Foods or restaurants, therefore, can be filtered on the basis of results of evaluation performed by a user whose address corresponds to a certain area.

Furthermore, when the position of the communication terminal 1 is outside the area where the user resides, the display 14 automatically displays the search filter for filtering foods or restaurants on the basis of the results of the evaluation of the foods or the restaurants performed by the residents of an area including a position indicated by map information. A search filter, therefore, can be displayed on a search screen without a special operation performed by the user.

Although map information and store information are obtained in advance in order to display a search screen in the description with reference to FIG. 36, the present disclosure is not limited to this. For example, a search screen that does not include map information and store information may be displayed, instead. In this case, the communication terminal 1 may obtain positional information (step S141), obtain address information (step S146), determine whether a position is outside the area where the user resides (step S147), determine, if a result of the determination is positive, that the resident search filter is to be displayed in a search screen (step S148) or if the result of the determination is negative, that the resident search filter is not to be displayed in a search screen, and display a search screen for specifying a condition for searching for foods or restaurants on the display 14 (step S145).

In the above description with reference to FIG. 36, the third embodiment is applied to the resident search filter. That is, the resident search filter is a search filter based on results of evaluation of foods or restaurants performed by residents around the current position of the communication terminal 1. The present disclosure, however, is not limited to this. For example, the first modification of the third embodiment may be applied, instead. In this case, the resident search filter is a search filter based on results of evaluation of foods or restaurants performed by other users residing in an area or a country where the user of the communication terminal 1 resides or lives. In this case, step S149 and the later steps illustrated in FIG. 36 are replaced by step S135 and the later steps illustrated in FIG. 33.

Fourth Embodiment

An information management system according to a fourth embodiment provides a food search screen. The food search screen is provided with, as one of search filters, a search filter for filtering foods or restaurants on the basis of results of evaluation of the foods or the restaurants performed by a second user whose taste characteristics are similar to taste characteristics of a first user.

Figure 37:
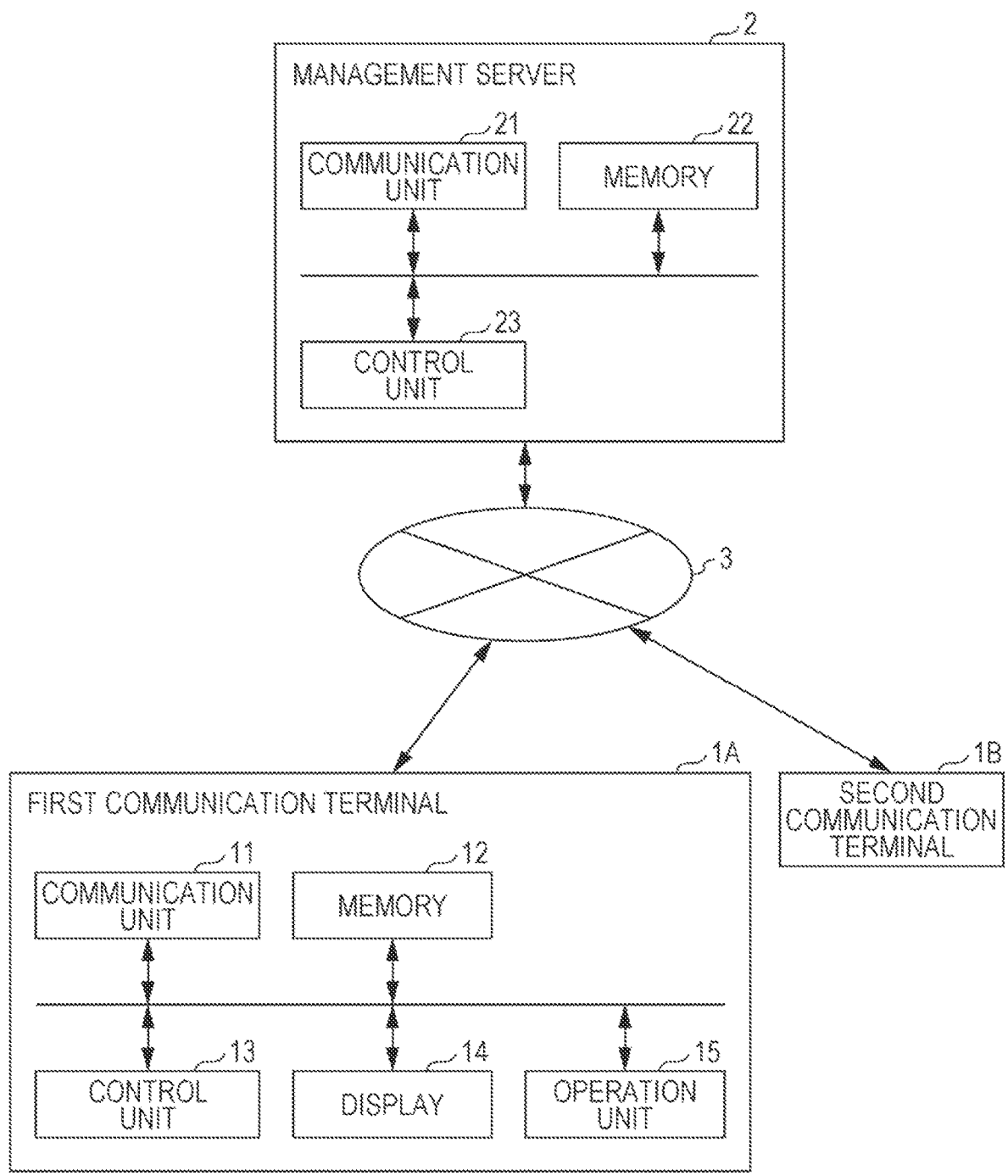
FIG. 37 is a diagram illustrating the configuration of an information management system according to a fourth embodiment of the present disclosure.

FIG. 37 is a diagram illustrating the configuration of the information management system according to the fourth embodiment of the present disclosure.

The information management system illustrated in FIG. 37 includes a first communication terminal 1A, a second communication terminal 1B, and the management server 2.

The configuration of the first communication terminal 1A and the second communication terminal 1B is the same as that of the communication terminal 1 illustrated in FIG. 1. The first user uses the first communication terminal 1A, and the second user, who is different from the first user, uses the second communication terminal 1B.

A display 14 of the first communication terminal 1A displays a food search screen. The food search screen is provided with, as one of search filters, a search filter for filtering foods or restaurants on the basis of results of evaluation of the foods or the restaurants performed by the second user, whose taste characteristics are similar to those of the first user.

An operation unit 15 of the first communication terminal 1A receives evaluation of a food or a restaurant performed by the first user. The operation unit 15 of the first communication terminal 1A receives selection of a search filter performed by the first user on the food search screen.

A communication unit 11 of the first communication terminal 1A transmits, to the management server 2, a command indicating that the search filter has been selected.

A communication unit 11 of the second communication terminal 1B transmits, to the management server 2, evaluation information indicating evaluation of a food or a restaurant performed by the second user.

The communication unit 21 of the management server 2 obtains, from the first communication terminal 1A over the network 3, first data indicating values input in a measurement test relating to the sense of taste of the first user of the first communication terminal 1A. The measurement test relating to the sense of taste is conducted to measure the first user's taste sensitivity to at least one taste.

The communication unit 21 of the management server 2 also obtains, from the second communication terminal 1B over the network 3, second data indicating values input in a measurement test relating to the sense of taste of the second user of the second communication terminal 1B. The measurement test relating to the sense of taste is conducted to measure the second user's taste sensitivity to at least one taste.

The measurement test relating to the sense of taste according to the fourth embodiment may be conducted in the same manner as that according to the first embodiment.

That is, the first and second users input, using the first and second communication terminals 1A and 1B, respectively, values in the taste resolution measurement test based on at least a first test meal group including test meals corresponding to levels indicating light to strong sweetness or a second test meal group including test meals corresponding to levels indicating light to strong saltiness. The communication unit 21 outputs, to the first and second communication terminals 1A and 1B, a first instruction for asking the first and second users to input an answer as to which of a first sweet test meal and a second sweet test meal, between which there is a first gap, which is two or more levels among the levels indicating light to strong sweetness, is sweeter among the test meals included in the first test meal group. The communication unit 21 obtains first and second data in response to the first instruction.

The communication unit 21 also outputs, to the first and second communication terminals 1A and 1B, a second instruction for asking the first and second users to input an answer as to which of a third sweet test meal and a fourth sweet test meal, between which there is a second gap, which is narrower than the first gap among the levels indicating light to strong sweetness, is sweeter among the test meals included in the first test meal group, in addition to the first and second sweet test meals. The communication unit 21 outputs the second instruction if it is determined that a response to the first instruction is correct. The communication unit 21 obtains first and second data in response to the second instruction.

Furthermore, the communication unit 21 outputs, to the first and second communication terminals 1A and 1B, a third instruction for asking the first and second users to input an answer as to which of a fifth sweet test meal and a sixth sweet test meal, between which there is a third gap, which is wider than the first gap among the levels indicating light to strong sweetness, is sweeter among the test meals included in the first test meal group, in addition to the first and second sweet test meals. The communication unit 21 outputs the third instruction if it is determined that a response to the first instruction is incorrect. The communication unit 21 obtains first and second data in response to the third instruction.

In the measurement test relating to the sense of taste according to the fourth embodiment, too, as in the first embodiment, a taste resolution measurement test may be conducted. That is, the communication unit 21 may, obtain first data indicating values input in the test for measuring the first user's taste resolution from the first communication terminal 1A over the network 3. The communication unit 21 may also obtain second data indicating values input in the test for measuring the second user's taste resolution from the second communication terminal 1B over the network 3, The control unit 23 may generate a first score of the first user's sense of taste on the basis of the first data. The control unit 23 may also generate a second score of the second user's sense of taste on the basis of the second data.

In the measurement test relating to the sense of taste according to the fourth embodiment, too, as in the first modification of the first embodiment, a taste resolution measurement test and/or a taste detection threshold measurement test may be conducted. That is, the communication unit 21 may obtain third data indicating values input in the test for measuring the first user's taste detection threshold from the first communication terminal 1A over the network 3. The communication unit 21 may also obtain fourth data indicating values input in the test for measuring the second user's taste detection threshold from the second communication terminal 1B over the network 3, The control unit 23 may generate the first score of the first user's sense of taste on the basis of the first data and/or the third data. The control unit 23 may also generate the second score of the second user's sense of taste on the basis of the second data and/or the fourth data.

The first and second users input, using the first and second communication terminals 1A and 1B, respectively, values in the taste detection threshold measurement test based on at least a first test meal group including test meals corresponding to levels indicating light to strong sweetness, a second test meal group including test meals corresponding to levels indicating light to strong saltiness, and a third test meal group including tasteless test meals. The communication unit 21 may output, to the first and second communication terminals 1A and 1B, a fourth instruction for asking the first and second users to sequentially input answers as to whether the test meals included in the first test meal group or the second test meal group are tasteless in order from levels indicating lighter tastes using the first, second, and third test meal groups. The communication unit 21 may obtain third and fourth data in response to the fourth instruction.

In the measurement test relating to the sense of taste according to the fourth embodiment, too, as in the second modification of the first embodiment, a taste resolution measurement test and/or a taste perception threshold measurement test may be conducted. That is, the communication unit 21 may obtain, from the first communication terminal 1A over the network 3, fifth data indicating values input in the test for measuring the first user's taste perception threshold. The communication unit 21 may also obtain, from the second communication terminal 1B over the network 3, sixth data indicating values input in the test for measuring the second user's taste perception threshold. The control unit 23 may generate the first score of the first user's sense of taste on the basis of the first data and/or the fifth data. The control unit 23 may generate the second score of the second user's sense of taste on the basis of the second data and/or the sixth data.

The first and second users input, using the first and second communication terminals 1A and 1B, respectively, values in the taste perception threshold measurement test based on at least a first test meal group including test meals corresponding to levels indicating light to strong sweetness and a second test meal group including tasteless test meals. The communication unit 21 may output, to the first and second communication terminals 1A and 1B, a fifth instruction for asking the first and second users to sequentially input answers as to whether the test meals included in the first test meal group are tasteless or sweet in order from levels indicating lighter tastes using the first and second test meal groups. The communication unit 21 may obtain fifth and sixth data in response to the fifth instruction.

In the measurement test relating to the sense of taste according to the fourth embodiment, too, as in the third modification of the first embodiment, a taste resolution measurement test and/or a taste strength measurement test may be conducted, That is, the communication unit 21 may obtain, from the first communication terminal 1A over the network 3, seventh data indicating values input in the test for measuring the first user's taste strength. The communication unit 21 may also obtain, from the second communication terminal 1B over the network 3, eighth data indicating values input in the test for measuring the second user's taste strength. The control unit 23 may generate the first score of the first user's sense of taste on the basis of the first data and/or the seventh data. The control unit 23 may also generate the second score of the second user's sense of taste on the basis of the second data and/or the eighth data.

The first and second users input, using the first and second communication terminals 1A and 1B, respectively, values in the taste strength measurement test based on at least a first test meal group including test meals corresponding to levels indicating light to strong sweetness. The communication unit 21 may output, to the first and second communication terminals 1A and 1B, a sixth instruction for asking the first and second users to input at least three of the test meals included in the first test meal group in descending order of the strength of taste using the first test meal group. The communication unit 21 may obtain seventh and eighth data in response to the sixth instruction.

The communication unit 21 obtains, from the second communication terminal 1B, evaluation information indicating evaluation of a food or a restaurant performed by the second user. The evaluation information indicating evaluation of a food or a restaurant performed by the second user is included in results of evaluation of foods or restaurants performed by the second user.

The communication unit 21 obtains, from the first communication terminal 1A over the network 3, a command indicating that a search filter has been selected.

The control unit 23 generates the first score of the first user's sense of taste on the basis of the first data while associating the first score with the first user. The control unit 23 generates the second score of the second user on the basis of the second data while associating the second score with the second user.

When the control unit 23 filters foods or restaurants using a search filter in response to a request from the first user, the control unit 23 filters foods or restaurants on the basis of the results of the evaluation performed by the second user if a first difference between the first score and the second score falls within a first range.

The first score is a score of the first user's taste sensitivity to at least one taste, and the second score is a score of the second user's taste sensitivity to the at least one taste. The at least one taste is at least one of sweetness, sourness, saltiness, bitterness, or umami.

The first score may be expressed by a first value indicating the first user's taste sensitivity to a first one of at least two of the five tastes, namely sweetness, sourness, saltiness, bitterness, and umami, and a second value indicating the first user's taste sensitivity to a second one of the at least two tastes. Similarly, the second score may be expressed by a third value indicating the second user's taste sensitivity to the first taste and a fourth value indicating the second user's taste sensitivity to the second taste. If a second difference between the first value and the third value and a third difference between the second value and the fourth value both fall within a second range, the control unit 23 may determine that the first difference between the first score and the second score falls within the first range.

Alternatively, the first score may be expressed as a first evaluation vector having two or more dimensions and including a first value indicating the first user's taste sensitivity to a first one of at least two of the five tastes, namely sweetness, sourness, saltiness, bitterness, and umami, and a second value indicating the first user's taste sensitivity to a second one of the at least two tastes. Similarly, the second score may be expressed as a second evaluation vector having two or more dimensions and including a third value indicating the second user's taste sensitivity to a first one of at least two of the five tastes, namely sweetness, sourness, saltiness, bitterness, and umami, and a fourth value indicating the second user's taste sensitivity to a second one of the at least two tastes. A degree of similarity between the first and second evaluation vectors may be calculated on the basis of an inner product of the vectors, cosine similarity, or the like and determined as a first degree of similarity. If the first degree of similarity is within a first similarity range, the control unit 23 may determine that the first difference between the first score and the second score falls within the first range.

The control unit 23 selects, on the basis of a command obtained by the communication unit 21, at least one food or one restaurant found through filtering based on a search filter. The control unit 23 selects first restaurants that serve the at least one food found through the filtering based on the search filter or at least one second restaurant found through the filtering based on the search filter.

The communication unit 21 outputs information indicating the at least one selected food or the at least one selected restaurant to the first communication terminal 1A over the network 3 in order to display the information on the display 14 of the first communication terminal 1A. The communication unit 21 outputs information indicating the first restaurants that serve the at least one selected food or the at least one second restaurant to the first communication terminal 1A over the network 3 in order to display the information on the display 14 of the first communication terminal 1A.

The filtering here refers to determining, as search targets for the first user, only foods or restaurants highly rated by the second user determined, since the first difference between the first score and the second score falls within the first range, to have taste characteristics similar to those of the first user.

Next, processes for evaluating the first user's sense of taste and the second user's sense of taste, respectively, according to the fourth embodiment of the present disclosure will be described.

Figure 38:
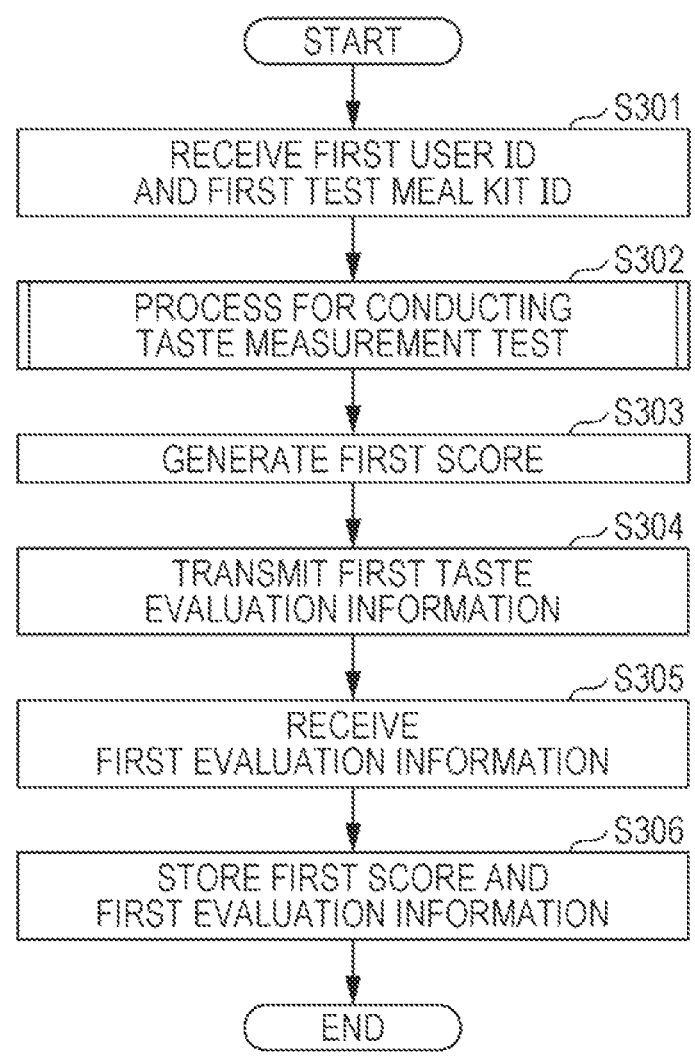
FIG. 38 is a flowchart illustrating a process for evaluating a first user's sense of taste performed by the management server according to the fourth embodiment of the present disclosure.

FIG. 38 is a flowchart illustrating the process for evaluating the first user's sense of taste performed by the management server 2 according to the fourth embodiment of the present disclosure.

First, in step S301, the communication unit 21 receives a first user ID and a first meal kit ID transmitted from the first communication terminal 1A. Here, the first communication terminal 1A receives the first test meal kit ID, which is printed on a test meal kit, and the first user ID input by the first user. The first communication terminal 1A displays an input screen provided by the management server 2 on a web browser and receives the first user ID and the first test meal kit ID input on the input screen. The first communication terminal 1A transmits the input first user ID and first test meal kit ID to the management server 2.

Next, in step S302, the control unit 23 performs a process for conducting a taste measurement test. In the process for conducting a taste measurement test, a taste measurement test for measuring the first user's sense of taste is generated, and first data indicating input values in the taste measurement test is obtained. Here, the taste measurement test may be conducted for at least one taste using at least one of the tests for measuring taste sensitivity described in the first embodiment, namely the taste resolution measurement test, the taste detection threshold measurement test, the taste perception threshold measurement test, the taste strength measurement test, and the taste mixture measurement test. Furthermore, a method different from the measurement tests relating to the sense of taste described in the present disclosure may be used, insofar as the method is a measurement test relating to the sense of taste with which taste characteristics can be measured.

Next, in step S303, the control unit 23 generates a first score of the first user's sense of taste on the basis of the first data while associating the first score with the first user.

Next, in step S304, the control unit 23 transmits first taste evaluation information indicating the generated first score to the first communication terminal 1A The communication unit 11 of the first communication terminal 1A receives the first taste evaluation information transmitted from the management server 2. The display 14 of the first communication terminal 1A then displays the first taste evaluation information received by the communication unit 11.

Next, in step S305, the communication unit 21 receives, from the first communication terminal 1A, first evaluation information indicating evaluation of a food or a restaurant performed by the first user. The food or the restaurant is evaluated, for example, on a five-point scale. The operation unit 15 of the first communication terminal 1A receives the evaluation of the food or the restaurant performed by the first user. The first user gives a score of 5 to 1, for example, to a food or a restaurant. A score of 5 is a highest rating, and a score of 1 is a lowest rating. The communication unit 11 of the first communication terminal 1A transmits the first evaluation information to the management server 2.

Next, in step S306, the control unit 23 stores the generated first score and the received first evaluation information in the memory 22 while associating the first score and the first evaluation information with the first user ID.

Figure 39:
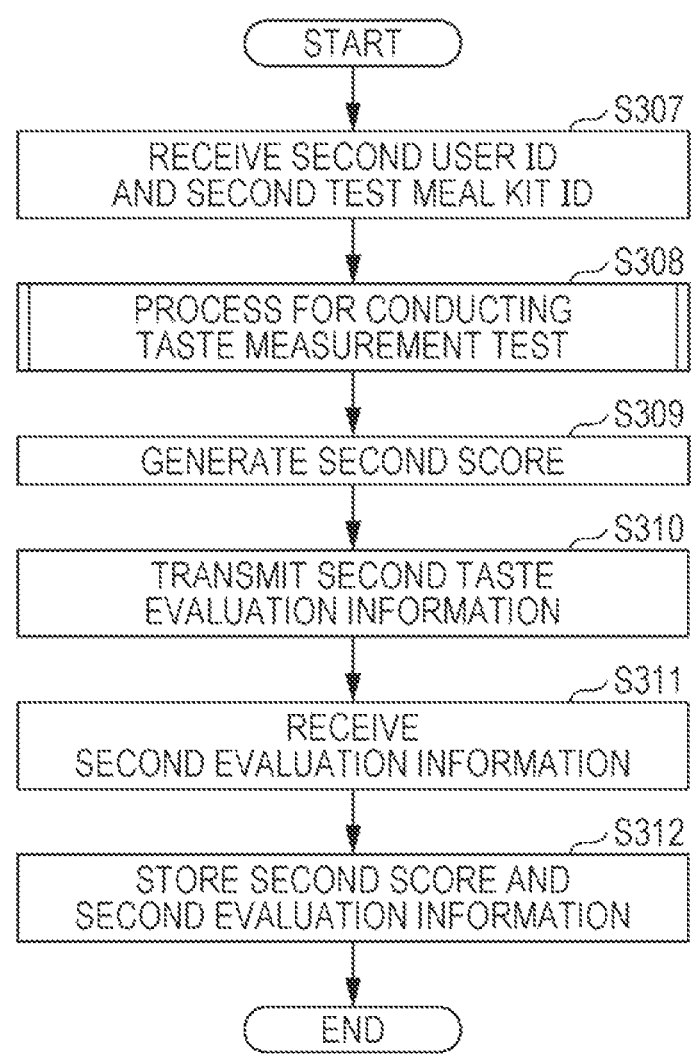
FIG. 39 is a flowchart illustrating a process for evaluating a second user's sense of taste performed by the management server according to the fourth embodiment of the present disclosure.

FIG. 39 is a flowchart illustrating the process for evaluating the second user's sense of taste performed by the management server 2 according to the fourth embodiment of the present disclosure.

First, in step S307, the communication unit 21 receives a second user ID and a second test meal kit ID transmitted from the second communication terminal 1B. Here, the second communication terminal 1B receives the second meal kit ID, which is printed on a test meal kit, and the second user ID input by the second user. The second communication terminal 1B displays an input screen provided by the management server 2 on a web browser and receives the second user ID and the second test meal kit ID input on the input screen. The second communication terminal 1B transmits the input second user ID and second test meal kit ID to the management server 2.

Next, in step S308, the control unit 23 performs a process for conducting a taste measurement test. In the process for conducting a taste measurement test, a taste measurement test for measuring the second user's sense of taste is generated, and second data indicating input values in the taste measurement test is obtained. Here, the taste measurement test may be conducted for at least one taste modality using at least one of the tests for measuring taste sensitivity described in the first embodiment, namely the taste resolution measurement test, the taste detection threshold measurement test, the taste perception threshold measurement test, the taste strength measurement test, and the taste mixture measurement test. Furthermore, a method different from the measurement tests relating to the sense of taste described in the present disclosure may be used, insofar as the method is a measurement test relating to the sense of taste with which taste characteristics can be measured.

Next, in step S309, the control unit 23 generates a second score of the second user's sense of taste on the basis of the second data while associating the second score with the first user.

Next, in step S310, the control unit 23 transmits second taste evaluation information indicating the generated second score to the second communication terminal 1B. The communication unit 11 of the second communication terminal 1B receives the second taste evaluation information transmitted from the management server 2. The display 14 of the second communication terminal 1B then displays the second taste evaluation information received by the communication unit 11.

Next, in step S311, the communication unit 21 receives, from the second communication terminal 1B, second evaluation information indicating evaluation of a food or a restaurant performed by the second user. The food or the restaurant is evaluated, for example, on a five-point scale. The operation unit 15 of the second communication terminal 1B receives the evaluation of the food or the restaurant performed by the second user. The second user gives a score of 5 to 1, for example, to a food or a restaurant. A score of 5 is a highest rating, and a score of 1 is a lowest rating. The communication unit 11 of the second communication terminal 1B transmits the second evaluation information to the management server 2.

Next, in step S312, the control unit 23 stores the generated second score and the received second evaluation information in the memory 22 while associating the second score and the second evaluation information with the second user ID.

In the taste measurement test according to the fourth embodiment, too, as in the first embodiment, the taste resolution measurement test in step S2 illustrated in FIG. 4 may be conducted in steps S302 and S308 illustrated in FIGS. 38 and 39, respectively. A process for conducting a taste resolution measurement test according to the fourth embodiment is the same as that according to the first embodiment, and description thereof is omitted.

In the taste measurement test according to the fourth embodiment, too, as in the first modification of the first embodiment, a taste resolution measurement test and/or a taste detection threshold measurement test may be conducted. In this case, in steps S302 and S308 illustrated in FIGS. 38 and 39, respectively, the process for conducting a taste resolution measurement test in step S2 illustrated in FIG. 4 and/or the process for conducting a taste detection threshold measurement test in step S6 illustrated in FIG. 9 are performed. A process for conducting a taste detection threshold measurement test according to the fourth embodiment is the same as that according to the first modification of the first embodiment, and description thereof is omitted.

In the taste measurement test according to the fourth embodiment, too, as in the second modification of the first embodiment, a taste resolution measurement test and/or a taste perception threshold measurement test may be conducted. In this case, in steps S302 and S308 illustrated in FIGS. 38 and 39, respectively, the process for conducting a taste resolution measurement test in step S2 illustrated in FIG. 4 and/or the process for conducting a taste perception threshold measurement test in step S8 illustrated in FIG. 12 are performed. A process for conducting a taste perception threshold measurement test according to the fourth embodiment is the same as that according to the second modification of the first embodiment, and description thereof is omitted.

In the test measurement test according to the fourth embodiment, too, as in the third modification of the first embodiment, a taste resolution measurement test and/or a taste strength measurement test may be conducted. In this case, in steps S302 and S308 illustrated in FIGS. 38 and 39, respectively, the process for conducting a taste resolution measurement test in step S2 illustrated in FIG. 4 and/or the process for conducting a taste strength measurement test in step S10 illustrated in FIG. 15 are performed. A process for conducting a taste strength measurement test according to the fourth embodiment is the same as that according to the third modification of the first embodiment, and description thereof is omitted.

In the taste measurement test according to the fourth embodiment, too, as in the fourth modification of the first embodiment, a taste mixture measurement test may be conducted. In this case, in step S302 and S308 illustrated in FIGS. 38 and 39, respectively, the process for conducting a taste mixture measurement test in step S2 illustrated in FIG. 4 is performed. A process for conducting a taste mixture measurement test according to the fourth embodiment is the same as that according to the fourth modification of the first embodiment, and description thereof is omitted.

Furthermore, in the taste measurement test according to the fourth embodiment, too, at least one of the taste resolution measurement test according to the first embodiment, the taste detection threshold measurement test according to the first modification of the first embodiment, the taste perception threshold measurement test according to the second modification of the first embodiment, the taste strength measurement test according to the third modification of the first embodiment, and the taste mixture measurement test according to the fourth modification of the first embodiment may be conducted.

In the process for evaluating the first user's sense of taste illustrated in FIG. 38, step S305, where first evaluation information is received, and step S306, where the received first evaluation information is stored in the memory 22, may be performed at different times. In the process for evaluating the second user's sense of taste illustrated in FIG. 39, step S311, where second evaluation information is received, and step S312, where the received second evaluation information is stored in the memory 22, may be performed at different times.

Next, a process for searching for foods or restaurants according to the fourth embodiment will be described.

Figure 40:
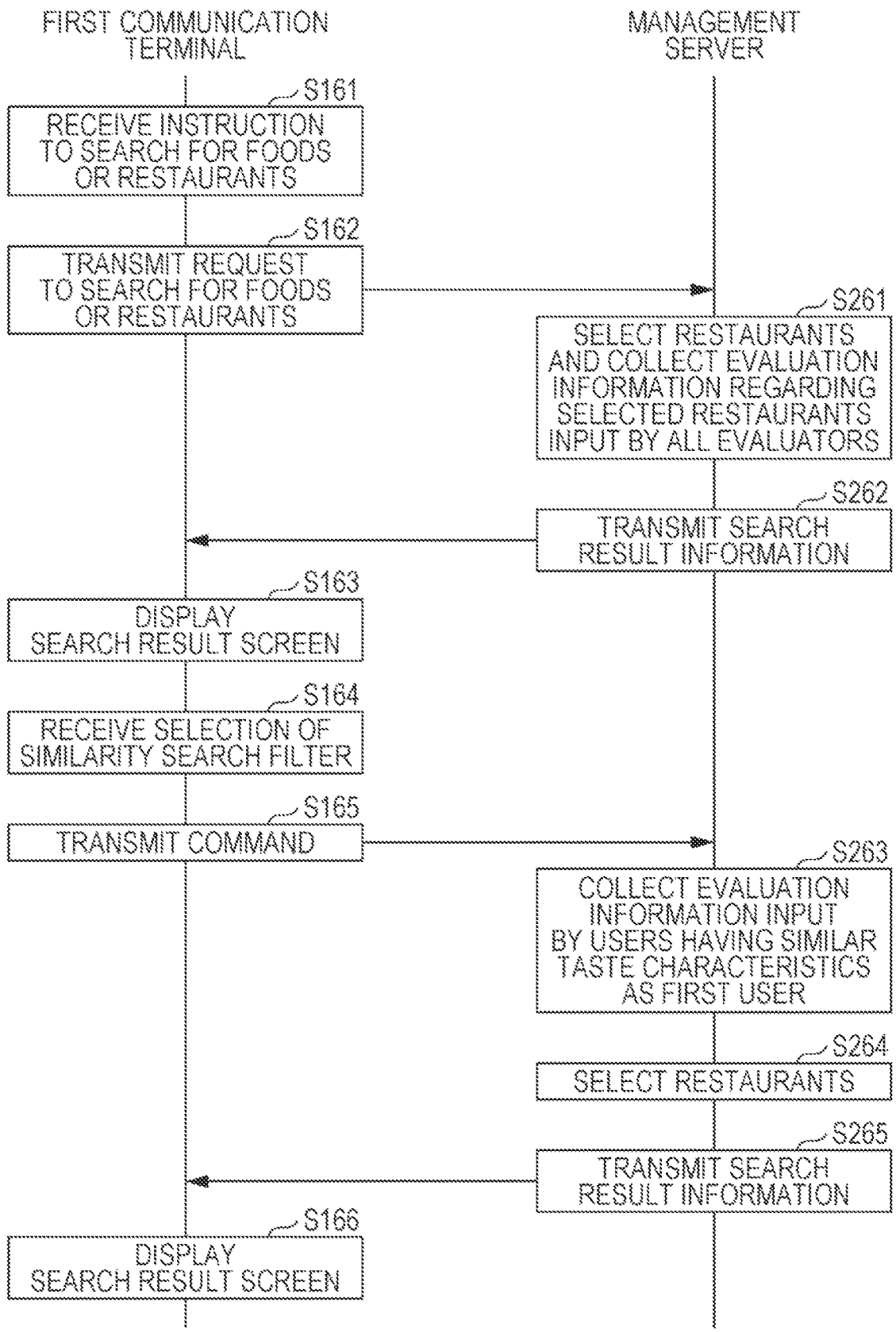
FIG. 40 is a sequence diagram illustrating a process for searching for foods or restaurants according to the fourth embodiment of the present disclosure.

FIG. 40 is a sequence diagram illustrating the process for searching for foods or restaurants according to the fourth embodiment of the present disclosure. FIG. 40 illustrates the process for searching for foods or restaurants performed between the first communication terminal 1A and the management server 2.

Steps S161 to S163 and steps S261 and S262 illustrated in FIG. 40 are the same as steps S111 to S113 and steps S211 and S212 illustrated in FIG. 25, respectively, and description thereof is omitted.

Next, in step S164, the operation unit 15 receives selection of, among search filters, a similarity search filter performed by the user. The similarity search filter is used to filter foods or restaurants on the basis of results of evaluation of the foods or the restaurants performed by other users whose taste characteristics are similar to those of the first user. The other users include the second user. For example, the first user selects the similarity search filter by sound or text, or by using a GUI displayed on the display 14 of the first communication terminal 1A, which will be described later. The search filters may also include, for example, the search filter based on a type of food, the search filter based on averages of the amount of payment at restaurants, and the search filter based on opening hours, as well as the similarity search filter.

Next, in step S165, the communication unit 11 transmits, to the management server 2, a command indicating that the similarity search filter has been selected. The communication unit 21 of the management server 2 receives the command transmitted from the first communication terminal 1A.

Next, in step S263, the control unit 23 collects evaluation information input by the other users whose taste characteristics are similar to those of the first user. The control unit 23 calculates an average of scores given by the other users whose taste characteristics are similar to those of the first user to each of foods and/or restaurants around a current position of the first communication terminal 1A.

Next, in step S264, the control unit 23 selects foods and/or restaurants whose averages of scores given by the other users whose taste characteristics are similar to those of the first user are higher than or equal to a certain value among the foods and/or the restaurants around the current position of the first communication terminal 1A.

Next, in step S265, the communication unit 21 transmits, to the first communication terminal 1A, search result information including information regarding the selected foods and/or the selected restaurants. The communication unit 11 of the first communication terminal 1A receives the search result information transmitted from the management server 2.

Next, in step S166, the display 14 displays a search result screen indicating a result of the filtering based on the similarity search filter. In the search result screen, only the foods and/or the restaurants found through the filtering based on the similarity search filter are displayed. That is, among the foods and/or the restaurants around a current position of the first user, only the foods and/or the restaurants whose averages of scores given by the other users whose taste characteristics are similar to those of the first user are higher than or equal to the certain value are displayed in the search result screen.

Although foods and/or restaurants around a current position of a user are searched for in the above description, the present disclosure is not limited to this. For example, foods served by restaurants included in a map displayed on the display 14 of the first communication terminal 1A and/or the restaurants may be searched for, instead. Alternatively, foods of a type (e.g., Japanese food) specified by the user and/or restaurants that serve the foods may be searched for.

Figure 41:
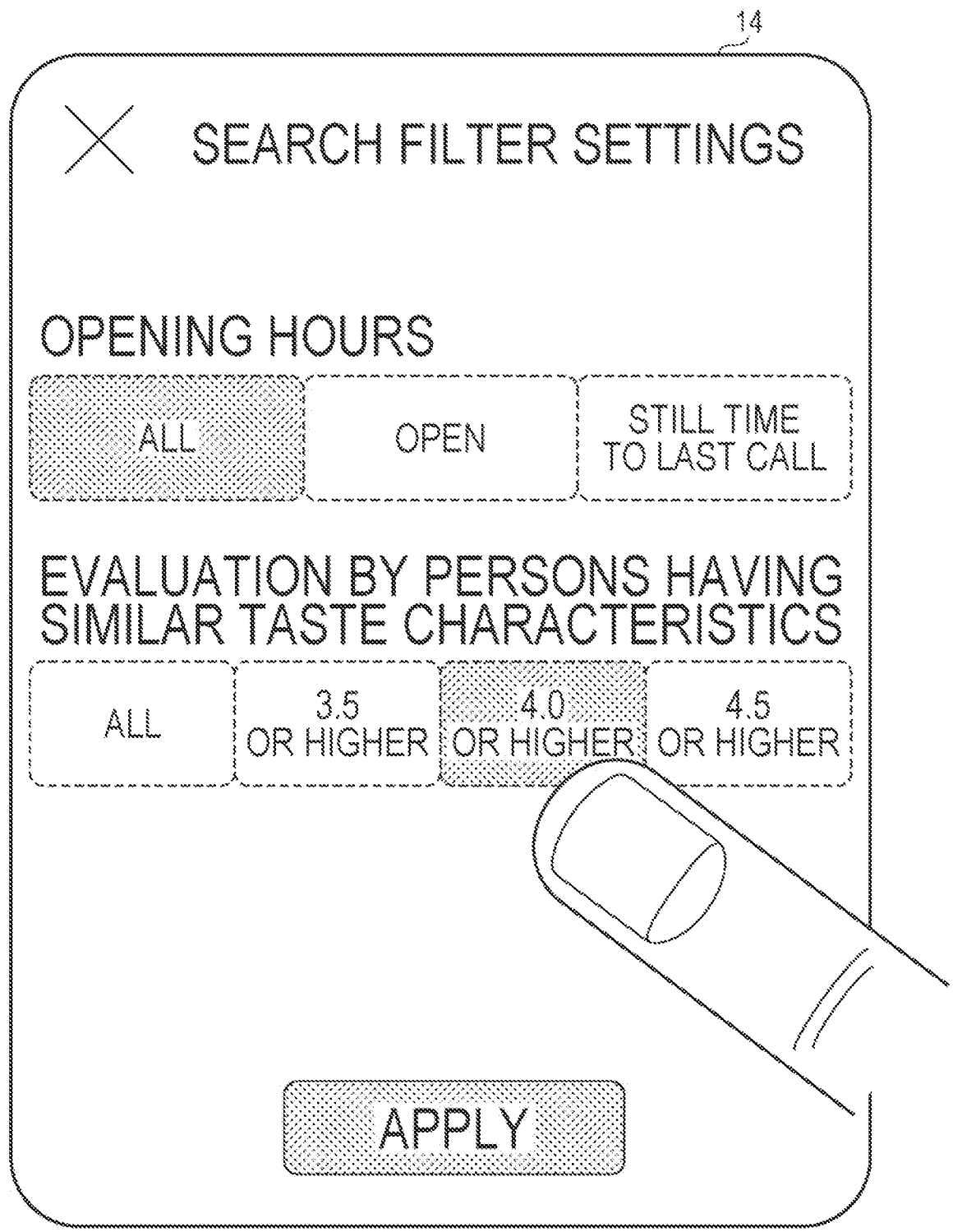
FIG. 41 is a diagram illustrating an example of a similarity search filter displayed on the display of a first communication terminal according to the fourth embodiment.

FIG. 41 is a diagram illustrating an example of the similarity search filter displayed on the display 14 of the first communication terminal 1A according to the fourth embodiment.

Other search filters that can be selected by the first user are displayed in the search filter screen illustrated in FIG. 41. In the search filter screen illustrated in FIG. 41, the search filter for specifying opening hours and the similarity search filter for filtering foods or restaurants on the basis of results of evaluation of the foods or the restaurants performed by the other users whose taste characteristics are similar to those of the first user are displayed.

If the user specifies the similarity search filter when the management server 2 searches for restaurants near the first user on a map, for example, the management server 2 extracts only restaurants highly rated by the other users whose taste characteristics are similar to those of the first user.

The management server 2 may select restaurants that satisfy one of four conditions, namely "all", "poorly rated", "average", and "highly rated", based on results of evaluation performed by the other users whose taste characteristics are similar to those of the first user.

Alternatively, as illustrated in FIG. 41, the management server 2 may select foods and/or restaurants on the basis of scores (averages of scores given by the other users whose taste characteristics are similar to those of the first user) on a five-point scale. If the user selects "all", all foods and/or restaurants evaluated by the other users whose taste characteristics are similar to those of the first user are searched for. If the user selects "3.5 or higher", foods and/or restaurants whose averages of scores (on a five-point scale) given by the other users whose taste characteristics are similar to those of the first user are higher than or equal to 3.5 are searched for. If the user selects "4.0 or higher", foods and/or restaurants whose averages of scores (on a five-point scale) given by the other users whose taste characteristics are similar to those of the first user are higher than or equal to 4.0 are searched for. If the user selects "4.5 or higher", foods and/or restaurants whose averages of scores (on a five-point scale) given by the other users whose taste characteristics are similar to those of the first user are higher than or equal to 4.5 are searched for. The user then presses an "apply" button to apply the similarity search filter and display a search result screen that reflects the similarity search filter.

The similarity search filter is used to find restaurants highly rated by the other users whose taste characteristics are similar to those of the first user. The management server 2 selects the restaurants highly rated by the other users whose taste characteristics are similar to those of the first user and presents the selected restaurants on the first communication terminal 1A. The first communication terminal 1A can respond to a search request given by the first user by displaying only the extracted foods and/or restaurants.

Each of the other users whose taste characteristics are similar to those of the first user may be a user whose score of taste sensitivity (e.g., a taste perception threshold) to at least one taste measured in a taste test is different from that of the first user's taste sensitivity by a certain value or smaller. Alternatively, each of the other users whose taste characteristics are similar to those of the first user may be a user whose taste score is different from that of the first user by a certain value or smaller. The taste characteristics may be expressed as a five-dimensional vector indicating taste scores of the five taste modalities, namely sweetness, saltiness, sourness, bitterness, and umami. When taste characteristics are expressed as a vector, a degree of similarity between taste characteristics can be easily determined using an inner product of vectors or cosine similarity.

According to the fourth embodiment, if the first difference between the first score of the first user's sense of taste and the second score of the second user's sense of taste falls within the first range when the first user filters foods or restaurants using a search filter, the foods or the restaurants are filtered on the basis of results of evaluation performed by the second user. Foods or restaurants highly rated by the second user, whose taste characteristics are similar to those of the first user, therefore, can be presented to the first user as search results.

In addition, foods or restaurants are filtered using a search filter on the basis of the results of the evaluation of the foods or the restaurants performed by the second user, whose taste characteristics are similar to those of the first user, and first restaurants that serve foods found through the filtering based on the search filter or second restaurants found through the filtering based on the search filter are displayed on the display 14 of the first communication terminal 1A. Foods or restaurants highly rated by the second user, whose taste characteristics are similar to the first user, therefore, can be presented to the first user as search results.

Furthermore, if the first difference between the first score and the second score falls within the first range, foods or restaurants are filtered on the basis of the results of the evaluation performed by the second user. Foods or restaurants, therefore, can be filtered on the basis of the results of the evaluation performed by the second user, whose taste characteristics are similar to those of the first user.

Although the management server 2 manages user information, map information, and store information in the first to fourth embodiment, the present disclosure is not particularly limited to this. The information management system may further include a server that manages user information, a server that manages map information, and a server that manages store information.

In each of the above embodiments, each of the components may be achieved by dedicated hardware or by executing a software program suitable therefor. Each of the components may be achieved by reading a software program stored in a storage medium such as a hard disk or a semiconductor memory using a program execution unit such as a CPU or a processor. The program may be stored in a storage medium and transported or transported over a network and then executed by another independent computer system, instead.

Some or all of functions of apparatuses according to the embodiments of the present disclosure are achieved by a large-scale integration (LSI) circuit, which is typically an integrated circuit. Each of the functions may be collectively achieved by a single chip, or some or all of the functions may be achieved by a single chip. An integrated circuit is not limited to an LSI circuit, and a dedicated circuit or a general-purpose processor may be used to achieve the functions, instead. A field-programmable gate array (FPGA), which can be programed after an LSI circuit is fabricated, or a reconfigurable processor, with which connections and settings of circuit cells inside an LSI circuit can be reconfigured, may be used, instead.

Alternatively, some or all of the functions of the apparatuses according to the embodiments of the present disclosure may be achieved by executing a program using a processor such as a CPU.

All the numbers used in the above description are examples for specifically describing the present disclosure, and the present disclosure is not limited to these numbers.

The order in which the steps are performed in each of the flowcharts is an example for specifically describing the present disclosure, and different order may be employed insofar as the same advantageous effects can be produced Some of the steps may be performed at the same time as (in parallel with) other steps.

The techniques in the present disclosure may be used to measure the user's sense of taste accurately and easily and collect information regarding the user's sense of taste and are effective as techniques for evaluating the user's sense of taste.

What is claimed is:

1. A method for providing information used in an information management system that provides a food search screen, the food search screen being provided with, as one of search filters, a search filter for filtering foods or restaurants on a basis of results of evaluation of the foods or the restaurants performed by a resident of a certain area, the method comprising:
   obtaining, over a network, address information indicating an address of a user of a communication terminal;
   obtaining, from the communication terminal, first data indicating a value input in a measurement test relating to the user's sense of taste, the measurement test relating to the user's sense of taste being conducted to measure the user's taste sensitivity;
   obtaining, from the communication terminal, evaluation information indicating evaluation of a food or a restaurant performed by the user;
   generating a score of the user's sense of taste on a basis of the address information and the first data and associating the score with the user and the address indicated by the address information; and
   including, if the address indicated by the address information is included in the certain area and if the score of the user's sense of taste satisfies a certain condition for taste high scorers residing in the certain area, the evaluation information indicating the evaluation of the food or the restaurant performed by the user in the results of the evaluation of the foods or the restaurants performed by the resident of the certain area.

2. The method according to claim 1,
   wherein the measurement test relating to the user's sense of taste is a test for measuring the user's taste resolution, and
   wherein the test for measuring the user's taste resolution is conducted to measure a smallest difference between levels of at least one taste perceived by the user.

3. The method according to claim 1,
   wherein the measurement test relating to the user's sense of taste is a test for measuring the user's taste detection, and
   wherein the test for measuring the user's taste detection is conducted to measure a lowest level at which the user tells a difference between absence of a certain taste and presence of the certain taste among a plurality of levels indicating from a small amount of the certain taste, including no taste to a large amount of the certain taste.

4. The method according to claim 1,
   wherein the measurement test relating to the user's sense of taste is a test for measuring the user's taste perception, and
   wherein the test for measuring the user's taste perception is conducted to measure a lowest level at which the user tells a difference between absence of at least one taste and presence of the at least one taste, among a plurality of levels indicating from a small amount of the at least one taste including no taste to a large amount of the at least one taste.

5. The method according to claim 1,
   wherein the measurement test relating to the user's sense of taste is a test for measuring the user's taste strength, and
   wherein the test for measuring the user's taste strength is conducted to measure whether the user correctly perceives three levels indicating from a small amount of the at least one taste to a large amount of at least one taste.

6. The method according to claim 2,
   wherein the at least one taste is at least one of sweetness, sourness, saltiness, bitterness, or umami.

7. A method for providing information used in an information management system that provides a food search screen, the food search screen being provided with, as one of search filters, a search filter for filtering foods or restaurants on a basis of results of evaluation of the foods or the restaurants performed by a resident of a certain area, the method comprising:
   obtaining, over a network, address information indicating an address of a user of a communication terminal;
   obtaining, from the communication terminal over the network, first data indicating a value input in a measurement test relating to the user's sense of taste, the measurement test relating to the user's sense of taste being conducted to measure the user's taste sensitivity;
   obtaining, from the communication terminal, evaluation information indicating evaluation of a food or a restaurant performed by the user;
   generating a score of the user's sense of taste on a basis of the address information and the first data and associating the score with the user and the address indicated by the address information; and
   including, if the address indicated by the address information is included in the certain area and if a taste characteristic indicated by the score of the user's sense of taste is similar to a taste characteristic of the resident of the certain area, the evaluation information indicating the evaluation of the food or the restaurant performed by the user in the results of the evaluation of the foods or the restaurants performed by the resident of the certain area.

8. A method for providing information used in an information management system that provides a food search screen, the food search screen being provided with, as one of search filters, a resident search filter specified for filtering foods or restaurants on a basis of results of evaluation of the foods or the restaurants performed by a resident of a certain area, the method comprising:
   obtaining, from a first communication terminal used by a first user over a network, a command indicating that the resident search filter has been selected;
   obtaining, over a network via a global positioning system provided on the first communication terminal, current position information indicating a current position of the first communication terminal, when the first user selects the resident search filter by turning on a button for activating the resident search filter without a first user's input of the current position, wherein the first communication terminal displays the button for activating the resident search filter;
   selecting, on a basis of the command and the current position information without an input of information relevant to the certain area when the resident search filter is selected among the search filters, at least one food found in the certain area including the current position through filtering based on the resident search filter or at least one restaurant found in the certain area including the current position through the filtering based on the resident search filter; and
   outputting, to the first communication terminal over the network, information indicating the at least one selected food or the at least one selected restaurant to display the information on a display of the first communication terminal.

9. The method according to claim 8, further comprising:
   obtaining, from a second communication terminal over the network, address information indicating an address of a second user of the second communication terminal;
   obtaining, from the second communication terminal, first data indicating a value input in a measurement test relating to the second user's sense of taste, the measurement test relating to the second user's sense of taste being conducted to measure the second user's taste sensitivity;
   obtaining, from the second communication terminal, evaluation information indicating evaluation of a food or a restaurant performed by the second user;
   generating a score of the second user's sense of taste on a basis of the address information and the first data and associating the score with the second user and the address indicated by the address information; and
   including, if the address indicated by the address information is included in the certain area and if the score of the second user's sense of taste satisfies a certain condition for taste high scorers residing in the certain area, the evaluation information indicating the evaluation of the food or the restaurant performed by the second user in the results of the evaluation of the foods or the restaurants performed by the resident of the certain area.

10. The method according to claim 8, further comprising:
   obtaining, from a second communication terminal over the network, address information indicating an address of a second user of the second communication terminal;
   obtaining, from the second communication terminal, first data indicating a value input in a measurement test relating to the second user's sense of taste, the measurement test relating to the second user's sense of taste being conducted to measure the second user's taste sensitivity;
   obtaining, from the second communication terminal, evaluation information indicating evaluation of a food or a restaurant performed by the second user;
   generating a score of the second user's sense of taste on a basis of the address information and the first data and associating the score with the second user and the address indicated by the address information; and
   including, if the address indicated by the address information is included in the certain area and if a taste characteristic indicated by the score of the second user's sense of taste is similar to a taste characteristic of the resident of the certain area, the evaluation information indicating the evaluation of the food or the restaurant performed by the second user in the results of the evaluation of the foods or the restaurants performed by the resident of the certain area.

11. The method according to claim 8, wherein
   the button is displayed on the display of the first communication terminal together with the information indicating the at least one selected food or the at least one selected restaurant.

12. The method according to claim 8, further comprising:
   obtaining, from the first communication terminal, a command to search for foods or restaurants satisfying a certain condition;
   selecting at least one food or at least one restaurant satisfying the certain condition based on evaluation information by all evaluators;
   outputting, to the first communication terminal over the network, the at least one food or the at least one restaurant selected based on the evaluation information by all evaluators so that the first communication terminal displays, on the display, the at least one food or the at least one restaurant together with the button for activating the resident search filter, wherein the command indicating that the resident search filter has been selected is obtained from the first communication terminal when the button is turned on.

13. A method for providing information used in an information management system that provides a food search screen, the food search screen being provided with, as one of search filters, a resident search filter specified for filtering foods or restaurants on a basis of results of evaluation of the foods or the restaurants performed by a certain evaluator, the method comprising:
obtaining, from a first communication terminal used by a first user over a network, a command indicating that the resident search filter has been selected;
obtaining an address information of the user of the first communication terminal in the information management system;
selecting, on a basis of the command and the address information of the user without an input of information relevant to a country or an area when the resident search filter is selected among the search filters, at least one food evaluated by the certain evaluator who resides in the country or the area including the address information of the user through filtering based on the resident search filter or at least one restaurant evaluated by the certain evaluator who resides in the country or the area including the address information of the user through the filtering based on the resident search filter; and
outputting, to the first communication terminal over the network, information indicating the at least one selected food or the at least one selected restaurant to display the information on a display of the first communication terminal;
wherein the country or the area where the certain evaluator resides is the same as a country or an area including the address information of the user and is not the same as a country or an area where the at least one selected food or the at least one selected restaurant exists, and wherein the at least one selected food or the at least one selected restaurant evaluated by the certain evaluator who resides in the country or area including the address information of the user is displayed in the food search screen, through the filtering based on the resident search filter.

14. A method for controlling a communication terminal that communicates with an information management system which provides a food search screen, a computer of the communication terminal being caused to perform processes comprising:
obtaining positional information indicating a position of the communication terminal;
obtaining, from the information management system, map information including the position of the communication terminal;
obtaining store information indicating a restaurant displayed on the map information;
generating, on a basis of the map information and the store information, a search screen showing the restaurant indicated by the store information on a map indicated by the map information, the search screen being provided with, as one of search filters, a search filter for filtering foods or restaurants on a basis of results of evaluation of the foods or the restaurants performed by a resident of an area including the position indicated by the map information;
displaying the search screen on a display of the communication terminal;
obtaining address information indicating an area where a user of the communication terminal resides; and
displaying, if the position indicated by the positional information is outside the area where the user resides, the search filter on the display.

15. The method according to claim 14, further comprising:
determining, if the position indicated by the positional information is outside a country where the user of the communication terminal resides, that the position indicated by the positional information is outside the area where the user resides.

16. The method according to claim 14, further comprising:
inhibiting, if the position indicated by the positional information is inside the area where the user of the communication terminal resides, the search filter from being displayed.

17. A communication terminal that executes the method according to claim 14.

18. A non-transitory computer-readable recording medium storing a program for causing the computer of the communication terminal to execute the method according to claim 14.

19. A method for providing information used in an information management system that provides a food search screen, the food search screen being provided with, as one of search filters, a resident search filter specified for filtering foods or restaurants on a basis of results of evaluation of the foods or the restaurants performed by a resident of a certain area, the method comprising:
obtaining, from a first communication terminal used by a first user over a network, a command indicating that the resident search filter has been selected;
obtaining, over a network, current position information indicating a current position of the first communication terminal;
selecting, on a basis of the command and the current position information without an input of information relevant to the certain area when the resident search filter is selected among the search filters, at least one food evaluated by the resident of the certain area including the current position and found in the certain area including the current position through filtering based on the resident search filter or at least one restaurant evaluated by the resident of the certain area including the current position and found in the certain area including the current position through filtering based on the resident search filter; and
outputting, to the first communication terminal over the network, information indicating the at least one selected food or the at least one selected restaurant to display the information on a display of the first communication terminal.

* * * * *